(12) United States Patent
Kishigami

(10) Patent No.: US 12,449,527 B2
(45) Date of Patent: Oct. 21, 2025

(54) RADAR DEVICE

(71) Applicant: Panasonic Intellectual Property Management Co., Ltd., Osaka (JP)

(72) Inventor: Takaaki Kishigami, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 494 days.

(21) Appl. No.: 17/774,118

(22) PCT Filed: Oct. 21, 2020

(86) PCT No.: PCT/JP2020/039545
§ 371 (c)(1),
(2) Date: May 3, 2022

(87) PCT Pub. No.: WO2021/100395
PCT Pub. Date: May 27, 2021

(65) Prior Publication Data
US 2023/0003870 A1    Jan. 5, 2023

(30) Foreign Application Priority Data
Nov. 18, 2019 (JP) ................. 2019-208153

(51) Int. Cl.
*G01S 13/58* (2006.01)
(52) U.S. Cl.
CPC .................. *G01S 13/58* (2013.01)
(58) Field of Classification Search
None
See application file for complete search history.

(56) References Cited

U.S. PATENT DOCUMENTS

| | | |
|---|---|---|
| 9,541,638 B2 | 1/2017 | Jansen et al. |
| 2017/0254879 A1 | 9/2017 | Tokieda et al. |
| 2018/0120427 A1 | 5/2018 | Cornic et al. |
| 2018/0259632 A1 | 9/2018 | Kishigami |

FOREIGN PATENT DOCUMENTS

| | | |
|---|---|---|
| EP | 3315994 A1 | 5/2018 |
| JP | 2016-050778 A | 4/2016 |
| JP | 2018-146443 A | 9/2018 |

OTHER PUBLICATIONS

English Translation of Japanese Notice of Reasons for Refusal dated Jul. 4, 2023, for the 1 corresponding Japanese Patent Application No. 2019-208153, 4 pages.

(Continued)

*Primary Examiner* — Whitney Moore
(74) *Attorney, Agent, or Firm* — Seed Intellectual Property Law Group LLP

(57) ABSTRACT

This radar device comprises a signal generation circuit for generating a baseband signal, a code generation circuit for generating a plurality of code sequences, a phase rotation circuit for applying phase rotation based on one of the code sequences from among the plurality of code sequences to the baseband signal and generating a plurality of code multiplexed transmission signals, and a plurality of transmission antennas for transmitting the plurality of transmission signals. The code length of the plurality of code sequences is greater than the code multiplexing number of the plurality of transmission signals.

14 Claims, 15 Drawing Sheets

(56) References Cited

OTHER PUBLICATIONS

English Translation of Chinese Office Action dated Nov. 13, 2024, for Chinese Patent Application No. 202080078719.0. (12 pages).
Cadzow, "Direction-of-Arrival Estimation Using Signal Subspace Modeling," *IEEE Transactions on Aerospace and Electronic Systems* 28(1):64-79, Jan. 1992.
International Search Report, mailed Jan. 19, 2021, for International Application No. PCT/JP2020/039545. (8 pages with English translation).
Kozawa et al., "Theoretical Analysis of Atmospheric Optical DS/SS with On-Off Orthogonal M-sequence Pairs," 2007 Sixth International Conference on Information, Communications & Signal Processing, Singapore, Dec. 10-13, 2007, pp. 1-5.
Kronauge et al., "Fast Two-Dimensional CFAR Procedure," *IEEE Transactions on Aerospace and Electronic Systems* 40(3):1817-1823, Jul. 2013.
Li et al., "MIMO Radar with Colocated Antennas," *IEEE Signal Processing Magazine* 24(5):106-114, Sep. 2007.
Winkler, "Novel Waveform Generation Principle for short-range FMCW-Radars," 2009 German Microwave Conference, Munich, Germany, Mar. 16-18, 2009, pp. 1-4.
English Translation of Japanese Notice of Reasons for Refusal dated Oct. 17, 2023, for 1 the corresponding Japanese Patent Application No. 2019-208153, 3 pages.

RADAR DEVICE

TECHNICAL FIELD

The present disclosure relates to a radar apparatus.

BACKGROUND ART

In recent years, a study of radar apparatuses using a short-wavelength radar transmission signal including a microwave or a millimeter wave that allows high resolution has been carried out. Further, it has been required to develop a radar apparatus which detects not only vehicles but also small objects such as pedestrians in a wide-angle range (for example, referred to as a wide-angle radar apparatus) in order to improve the outdoor safety.

Examples of the configuration of the radar apparatus having a wide-angle detection range include a configuration using a technique of receiving a reflected wave from a target (or target object) by an array antenna formed of a plurality of antennas (or also referred to as antenna elements), and estimating the direction of arrival of the reflected wave (or referred to as the angle of arrival) based on received phase differences with respect to element spacings (antenna spacings) (angle-of-arrival estimation technique, Direction of Arrival (DOA) estimation).

Examples of the angle-of-arrival estimation technique include a Fourier method (Fast Fourier Transform (FFT) method) and, as methods that allow high resolution, a Capon method, Multiple Signal Classification (MUSIC), and Estimation of Signal Parameters via Rotational Invariance Techniques (ESPRIT).

Further, there is a proposed radar apparatus, for example, having a configuration in which a plurality of antennas (array antenna) is provided on a reception side as well as on a transmission side, and beam scanning is performed through signal processing using transmission and reception array antennas (also referred to as Multiple Input Multiple Output (MIMO) radar) (for example, see Non-Patent Literature (hereinafter referred to as "NPL") 1).

CITATION LIST

Patent Literature

PTL 1
U.S. Pat. No. 9,541,638

Non Patent Literature

NPL 1
J. Li, and P. Stoica, "MIMO Radar with Colocated Antennas", Signal Processing Magazine, IEEE Vol. 24, Issue: 5, pp. 106-114, 2007
NPL 2
M. Kronauge, H. Rohling, "Fast two-dimensional CFAR procedure", IEEE Trans. Aerosp. Electron. Syst., 2013, 49, (3), pp. 1817-1823
NPL 3
Direction-of-arrival estimation using signal subspace modeling Cadzow, J. A.; Aerospace and Electronic Systems, IEEE Transactions on Volume: 28, Issue: 1 Publication Year: 1992, Page(s): 64-79
NPL 4
V. Winkler, "Novel Waveform Generation Principle for Short-Range FMCW-Radars", in Proc. German Microw. Conf., 2009, pp. 1-4
NPL 5
Y. Kozawa and H. Habuchi, "Theoretical Analysis of Atmospheric Optical DS/SS with On-Off Orthogonal M-sequence Pairs", Sixth International Conference on Information, Communications and Signal Processing (ICICS 2007), P0686 (December 2007)

SUMMARY OF INVENTION

However, methods for a radar apparatus (for example, MIMO radar) to detect a target have not been sufficiently studied.

One non-limiting and exemplary embodiment facilitates providing a radar apparatus that improves target object detection accuracy.

A radar apparatus according to an exemplary embodiment of the present disclosure includes: signal generation circuitry, which, in operation, generates a baseband signal; code generation circuitry, which, in operation, generates a plurality of code sequences; phase rotation circuitry, which, in operation, adds phase rotation based on one or some of the plurality of code sequences to the baseband signal and generates a plurality of transmission signals that has been code-multiplexed; and a plurality of transmission antennas that transmits the plurality of transmission signals, respectively. A code length of each of the plurality of code sequences is larger than a code multiplexing number with respect to the plurality of transmission signals.

It should be noted that general or specific embodiments may be implemented as a system, a method, an integrated circuit, a computer program, a storage medium, or any selective combination thereof.

According to an exemplary embodiment of the present disclosure, target detection accuracy of a radar apparatus can be improved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
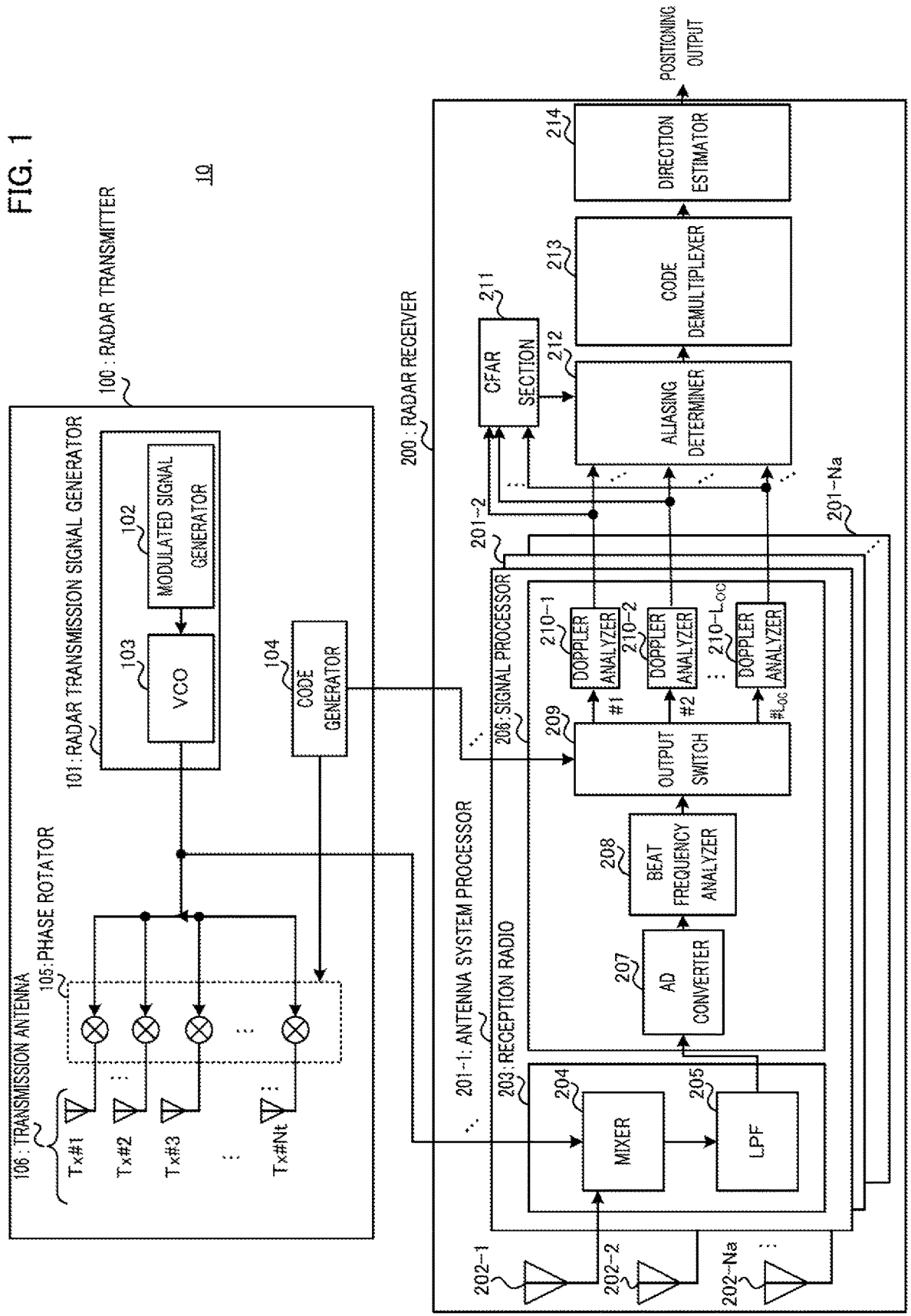
FIG. 1 is a block diagram illustrating a configuration example of a radar apparatus according to Embodiment 1.

A MIMO radar, for example, transmits signals (radar transmission waves) multiplexed by using time division, frequency division, or code division from a plurality of transmission antennas (or referred to as a transmission array antenna). Then, the MIMO radar, for example, receives signals (radar reflected waves) reflected by surrounding objects by using a plurality of reception antennas (or referred to as a reception array antenna) to demultiplex and receive a multiplexed transmission signal from each reception signal. With such processing, the MIMO radar is able to extract a propagation path response indicated by the product of the number of transmission antennas and the number of reception antennas and performs array signal processing by using these reception signals as a virtual reception array.

Further, in the MIMO radar, it is possible to virtually enlarge the antenna aperture and improve angular resolution by appropriately arranging element spacings in transmission and reception array antennas.

Hereinafter, as an example, attention will be paid to a MIMO radar using code multiplexing transmission which is one method of simultaneously multiplexing and transmitting transmission signals from a plurality of transmission antennas (for example, see Patent Literature (hereinafter referred to as "PTL") 1).

For example, the MIMO radar using code multiplexing transmission performs, for each repeated transmission of transmission signals (for example, chirp signals), code multiplexing transmission from a plurality of (for example, M) transmission antennas by repeatedly imparting phase modulation based on a code string (hereinafter also referred to as a code or a code sequence) different for each transmission antenna. Further, for example, the MIMO radar extracts distance information on code-multiplexed reception signals by subjecting signals received by using a plurality of (for example, N) reception antennas to detection processing.

Further, the MIMO radar performs, for example, Fourier transform processing of M velocity directions on distance information obtained for each repeated transmission of transmission signals. The MIMO radar demultiplexes a code-multiplexed reception signal by adding phase correction based on a detected velocity component to a result of the Fourier transform processing of M velocity directions and multiplying the result by an inversion code string that demultiplexes a code string assigned for each transmission antenna. With such a MIMO radar configuration, the MIMO radar can suppress mutual interference between code-multiplexed reception signals and demultiplex the code-multiplexed reception signals even in a case where the relative velocity between a target and the MIMO radar is not zero, for example.

In the MIMO radar configuration described above, however, velocity-direction Fourier transform processing of a plurality of (for example, M) divided velocity directions is performed. Accordingly, since the MIMO radar performs the velocity-direction Fourier transform processing at intervals of M transmission periods, the maximum Doppler frequency at which Doppler aliasing defined by the sampling theorem does not occur becomes 1 for number M of transmission antennas used for code multiplexing transmission (=1/M). In a case where a Doppler frequency component exceeding the maximal Doppler frequency at which Doppler aliasing defined by the sampling theorem does not occur is included, Doppler frequency cannot be determined and ambiguity occurs. Thus, a Doppler range in which a Doppler component can be detected without ambiguity is reduced to 1/M in comparison with that at the time of transmission without code multiplexing transmission (M=1 at the time of transmission with one antenna). Note that, the "Doppler range" corresponds to, in other words, a "relative velocity range of a target". Note that, the "Doppler range in which a Doppler component can be detected without ambiguity" is, in other words, a Doppler range in which a Doppler frequency can be determined without ambiguity, and is hereinafter referred to as "Doppler range detectable without ambiguity".

Accordingly, in an exemplary embodiment according to the present disclosure, a method of expanding a Doppler frequency range at which ambiguity does not occur in code multiplexing transmission will be described. For example, even in a case where a Doppler variation associated with movement of a target or the radar apparatus is included, a radar apparatus of an exemplary embodiment according to the present disclosure is capable of improving target detection accuracy in a wider Doppler frequency range by suppressing the occurrence of mutual interference between code-multiplexed signals and expanding a Doppler range detectable without ambiguity to a Doppler range equivalent to that at the time of transmission with one antenna.

Hereinafter, embodiments according to exemplary embodiments of the present disclosure will be described in detail with reference to the drawings. In the embodiments, the same constituent elements are denoted with the same reference signs, and descriptions thereof will be omitted because of redundancy.

Hereinafter, a configuration of a radar apparatus in which a transmission branch transmits different transmission signals multiplexed simultaneously from a plurality of transmission antennas and a reception branch performs reception processing by demultiplexing each of the transmission signals (in other words, a MIMO radar configuration) will be described.

Hereinafter, as an example, a configuration of a radar system (also referred to as, for example, chirp pulse transmission (fast chirp modulation)) using a frequency-modulated pulse wave, such as a chirp pulse, will be described. A modulation scheme is, however, not limited to frequency modulation. For example, an exemplary embodiment of the present disclosure is also applicable to a radar system using a pulse compression radar that phase-modulates or amplitude-modulates a pulse train and transmits the pulse train.

Further, a radar apparatus performs code multiplexing transmission of signals.

Embodiment 1

[Configuration of Radar Apparatus]

FIG. 1 is a block diagram illustrating a configuration example of radar apparatus 10 according to the present embodiment.

Radar apparatus 10 includes radar transmitter (transmission branch) 100 and radar receiver (reception branch) 200.

Radar transmitter 100 generates a radar signal (radar transmission signal) and transmits the radar transmission signal at a defined transmission period by using a transmission array antenna formed of a plurality of (for example, Nt) transmission antennas 106.

Radar receiver 200 receives a reflected wave signal, which is a radar transmission signal reflected by a target (target object (not illustrated)), by using a reception array antenna including a plurality of (for example, Na) reception antennas 202. Radar receiver 200 performs signal processing on the reflected wave signal received by each reception antenna 202, for example, detects the presence or absence of the target object or estimates the distance of arrival, Doppler frequency (in other words, relative velocity), and direction of arrival of the reflected wave signal, and outputs information on an estimated result (in other words, positioning information).

Note that, the target is an object to be detected by radar apparatus 10. Examples of the target include a vehicle (including a four-wheel vehicle and a two-wheel vehicle), a person, a block, and a curb.

[Configuration of Radar Transmitter 100]

Radar transmitter 100 includes radar transmission signal generator 101, code generator 104, phase rotator 105, and transmission antenna 106.

Radar transmission signal generator 101 generates a radar transmission signal (in other words, baseband signal). Radar transmission signal generator 101 includes, for example, modulated signal generator 102 and voltage controlled oscillator (VCO) 103. Hereinafter, components in radar transmission signal generator 101 will be described.

Figure 2:
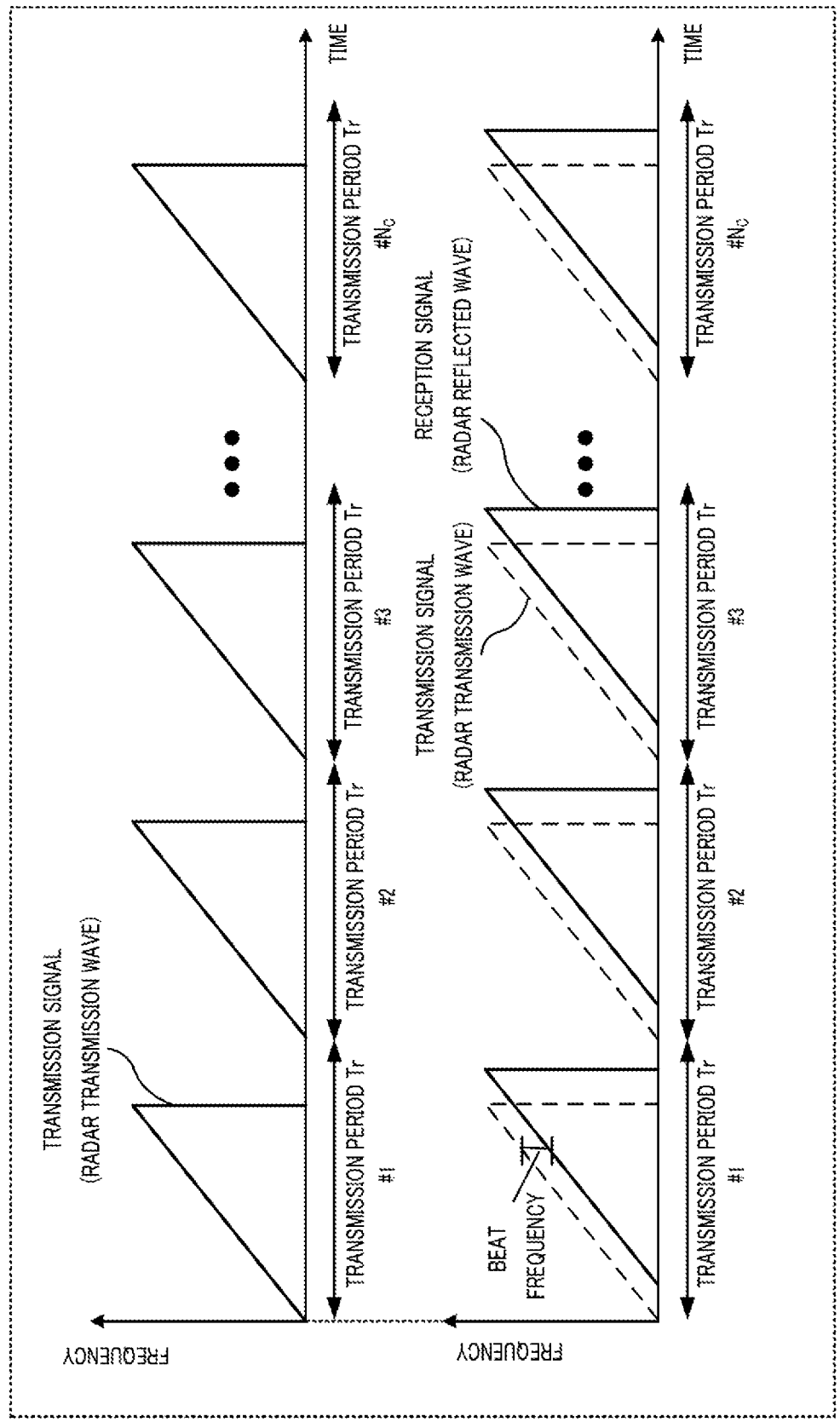
FIG. 2 illustrates examples of a transmission signal and a reflected wave signal in a case where a chirp pulse is used.

Modulated signal generator 102 is, for example, generates a sawtooth-shaped modulated signal (in other words, a modulated signal for VCO control) for each radar transmission period Tr as illustrated at the top in FIG. 2.

VCO 103 outputs a frequency-modulated signal (hereinafter referred to as a frequency chirp signal or a chirp signal, for example) to phase rotator 105 and radar receiver 200 (mixer 204 to be described later) based on a radar transmission signal (modulated signal) outputted from modulated signal generator 102.

Code generator 104 generates a code different for each of transmission antennas 106 that perform code multiplexing transmission. Code generator 104 outputs a phase rotation amount corresponding to the generated code to phase rotator 105. Further, code generator 104 outputs information on the generated code to radar receiver 200 (output switch 209 to be described later).

Phase rotator 105 applies a phase rotation amount inputted from code generator 104 to a chirp signal inputted from VCO 103, and outputs a signal after phase rotation to transmission antenna 106. For example, phase rotator 105 includes a phase shifter and a phase modulator, and the like (not illustrated). Output signals of phase rotator 105 are amplified to defined transmission power and radiated from each of transmission antennas 106 to space. In other words, radar transmission signals are code-multiplexed and transmitted from a plurality of transmission antennas 106 by application of the phase rotation amounts corresponding to the codes.

Next, an example of codes (for example, orthogonal codes) configured in radar apparatus 10 will be described.

Code generator 104, for example, generates a code different for each of transmission antennas 106 that perform code multiplexing transmission.

Hereinafter, for example, the number of transmission antennas 106 that perform code multiplexing transmission is "NT", and a code multiplexing number is "$N_{CM}$". In FIG. 1, $N_{CM}$=Nt.

Code generator 104 configures, as codes for code multiplexing transmission, $N_{CM}$ orthogonal codes among $N_{allcode}$ (hereinafter may also be referred to as $N_{allcode}$(Loc)) orthogonal codes included in code sequences (for example, orthogonal code sequences (or simply referred to as codes or orthogonal codes) in a mutually orthogonal relation) with code length (in other words, the number of code elements) Loc.

For example, code multiplexing number $N_{CM}$ is less than number $N_{allcode}$ of orthogonal codes, and $N_{CM}<N_{allcode}$. In other words, code length Loc of an orthogonal code is larger than code multiplexing number $N_{CM}$. For example, $N_{CM}$ orthogonal codes with code length Loc are represented by $Code_{ncm}=[OC_{ncm}(1), OC_{ncm}(2), \ldots, OC_{ncm}(Loc)]$. Here, "$OC_{ncm}(noc)$" represents the noc-th code element in ncm-th orthogonal code $Code_{ncm}$. Further, "ncm" represents the index of an orthogonal code used for code multiplexing, and ncm=1, ..., $N_{CM}$. Further, "noc" is the index of a code element, and noc=1, ..., Loc.

Here, of $N_{allcode}$ orthogonal codes with code length Loc, ($N_{allcode}-N_{CM}$) orthogonal codes are not used in code generator 104 (in other words, not used for code multiplexing transmission). Hereinafter, ($N_{allcode}-N_{CM}$) orthogonal codes not used in code generator 104 are referred to as "unused orthogonal codes". At least one of the unused orthogonal codes is, for example, used for Doppler frequency aliasing determination in aliasing determiner 212 of radar receiver 200 to be described later (an example will be described later).

By using unused orthogonal codes, radar apparatus 10 is capable of, for example, receiving signals code-multiplexed and transmitted from a plurality of transmission antennas 106, while inter-code interference is being suppressed and such that the signals are demultiplexed individually, and of expanding the range where Doppler frequencies are detectable (an example will be described later).

As described above, Ncm orthogonal codes generated by code generator 104 are, for example, mutually orthogonal codes (in other words, uncorrelated codes). For example, a Walsh-Hadamard code may be used for an orthogonal code sequence. The code length of a Walsh-Hadamard code is a power of two, and orthogonal codes with each code length include orthogonal codes equal in number to the code length. For example, a Walsh-Hadamard code with a code length of two, four, eight, or 16 includes two, four, eight, or 16 orthogonal codes.

Hereinafter, as an example, code length Loc of each of $N_{CM}$ orthogonal code sequences is configured so as to satisfy following equation 1.

[1]

$$Loc \geq 2^{ceil[log2(N_{CM}+1)]} \qquad \text{(Equation 1)}$$

Here, ceil[x] is an operator (ceiling function) that outputs the minimum integer larger than or equal to real number x. In the case of a Walsh-Hadamard code with code length Loc, the relation $N_{allcode}$(Loc)=Loc holds. For example, since a Walsh-Hadamard code with code length Loc=2, 4, 8, or 16 includes two, four, eight, or 16 orthogonal codes, $N_{allcode}$(2)=2, $N_{allcode}$(4)=4, $N_{allcode}$(8)=8, and $N_{allcode}$(16)=16 hold. Code generator 104 uses, for example, $N_{CM}$ orthogonal codes among $N_{allcode}$(Loc) orthogonal codes included in a Walsh-Hadamard code with code length Loc.

Here, the long code length will be described. For example, in a case where acceleration is included in the moving velocity of a target or a conventional radar apparatus, the longer the code length is, the more susceptible to inter-code interference the codes are. Further, the longer the code length is, candidates for a Doppler aliasing range at the time of Doppler aliasing determination to be described later increase. For this reason, in a case where there are targets of a plurality of Doppler frequencies over different aliasing ranges in the same distance index, the probability that Doppler frequency indexes detected in the different aliasing ranges will overlap increases, and the probability that the conventional radar apparatus will be difficult to appropriately determine aliasing may increase.

For this reason, radar apparatus 10 may use codes with a shorter code length from the viewpoint of the arithmetic amount of aliasing determination in aliasing determiner 212 of radar receiver 200 to be described later. As an example, radar apparatus 10 may use an orthogonal code sequence with the shortest code length among code lengths Loc that satisfy equation 1.

Note that, in a case where Walsh-Hadamard codes with code length Loc include, for example, a code [OC(1), OC(2), ..., OC(Loc−1), OC(Loc)] with code length Loc, the Walsh-Hadamard codes with code length Loc also include a code [OC(1), −OC(2), ..., OC(Loc−1), −OC(Loc)] with identical odd-numbered code elements and code-inverted even-numbered code elements.

Further, in a case where Walsh-Hadamard codes with code length Loc include, for example, a code [OC(1), OC(2), ..., OC(Loc−1), and OC(Loc)] with code length Loc, which is another code different from the Walsh-Hadamard codes with code length Loc, the code with code length Loc may be a code [OC(1), −OC(2), ..., OC(Loc−1), and OC(Loc)] with identical odd-numbered code elements and code-inverted even-numbered code elements or may be a code [−OC(1), OC(2), ..., OC(Loc−1), and OC(Loc)] with identical even-numbered code elements and code-inverted odd-numbered code elements.

In a case where the number ($N_{allcode}$-$N_{CM}$) of unused orthogonal codes is larger than or equal to two, radar apparatus 10 may, for example, select codes such that a set of codes in the above-described relation is not included in the unused orthogonal codes. For example, one code of a set of code in the above-described relation may be used for code multiplexing transmission, and the other code thereof may be included in unused orthogonal codes. By this unused orthogonal code selection, Doppler frequency aliasing determination accuracy in aliasing determiner 212 of radar receiver 200 to be described later can be improved (an example will be described later).

Hereinafter, an example of orthogonal codes in each code multiplexing number $N_{CM}$ will be described.

<Case of $N_{CM}$=2 or 3>

In a case where $N_{CM}$=2 or 3, for example, Walsh-Hadamard codes with code length Loc=4, 8, 16, 32, ... may be applied. In the case of these code lengths Loc, $N_{CM}$<$N_{allcode}$(Loc). Further, in a case where the code multiplexing number is $N_{CM}$=2 or 3, Walsh-Hadamard codes with a shorter code length (for example, Loc=4) among these code lengths Loc may also be used.

For example, a Walsh-Hadamard code with code length Loc is represented by $WH_{Loc}$(nwhc). Note that, nwhc represents a code index included in the Walsh-Hadamard code with code length Loc, and nwhc=1, ..., Loc. For example, Walsh-Hadamard codes with code length Loc=4 include orthogonal codes $WH_4(1)$=[1, 1, 1, 1], $WH_4(2)$=[1, −1, 1, −1], $WH_4(3)$=[1, 1, −1, −1], and $WH_4(4)$=[1, −1, −1, 1].

Here, among the Walsh-Hadamard codes with code length Loc=4, $WH_4(1)$=[1, 1, 1, 1] and $WH_4(2)$=[1, −1, 1, −1] are a set of codes in which the odd-numbered code elements are identical between the codes and the even-numbered code elements are code-inverted between the codes. Further, $WH_4(3)$=[1, 1, −1, −1] and $WH_4(4)$=[1, −1, −1, 1] are also a set of codes in the same relation to the set of $WH_4(1)$ and $WH_4(2)$.

For example, in a case where the number ($N_{allcode}$-$N_{CM}$) of unused orthogonal codes is larger than or equal to two, radar apparatus 10 may select codes such that a set of codes in such a relation is not included in the unused orthogonal codes.

For example, in a case where code multiplexing number Ncm is two, code generator 104 determines, as codes for code multiplexing transmission, two orthogonal codes among Walsh-Hadamard codes with code length Loc=4. In this case, the number ($N_{allcode}$-$N_{CM}$) of unused orthogonal codes is two.

For example, code generator 104 may select codes for code multiplexing transmission such that a set of codes $WH_4(1)$ and $WH_4(2)$ or a set of codes $WH_4(3)$ and $WH_4(4)$ is not included in unused orthogonal codes. For example, a combination of codes for code multiplexing transmission ($Code_1$ and $Code_2$) may be a combination of $Code_1$=$WH_4(1)$ (=[1, 1, 1, 1]) and $Code_2$=$WH_4(3)$ (=[1, 1, −1, −1]), a combination of $Code_1$=$WH_4(1)$ and $Code_2$=$WH_4(4)$, a combination of $Code_1$=$WH_4(2)$ and $Code_2$=$WH_4(3)$, or a combination of $Code_1$=$WH_4(2)$ and $Code_2$=$WH_4(4)$.

Further, for example, in a case where code multiplexing number Ncm is two, aliasing determiner 212 of radar receiver 200 uses, among $N_{allcode}$ (=4) Walsh-Hadamard codes with code length Loc=4, at least one of two (=$N_{allcode}$-$N_{CM}$) unused orthogonal codes, which are not used in code generator 104 (in other words, not used for code multiplexing transmission), for aliasing determination (an example will be described later).

Hereinafter, among $N_{allcode}$ orthogonal codes with code length Loc, unused orthogonal codes are represented by "$UnCode_{nuc}$=[$UOC_{nuc}(1)$, $UOC_{nuc}(2)$, ..., $UOC_{nuc}(Loc)$]". Note that, $UnCode_{nuc}$ represents the nuc-th unused orthogonal code. Further, nuc represents the index of an unused orthogonal code, and nuc=1, ..., ($N_{allcode}$-$N_{CM}$). Further, $UOC_{nuc}$(noc) represents the noc-th code element in the nuc-th unused orthogonal code $UnCode_{nuc}$. Further, noc represents the index of a code element, and noc=1, ..., Loc.

For example, in a case where the code multiplexing number is $N_{CM}$=two and codes for code multiplexing transmission, determined by code generator 104, are $Code_1$=$WH_4(1)$ (=[1, 1, 1, 1]) and $Code_2$=$WH_4(3)$ (=[1, 1, −1, −1]), the unused orthogonal codes are $UnCode_1$=$WH_4(2)$ (=[1, −1, 1, −1]) and $UnCode_2$=$WH_4(4)$ (=[1, −1, −1, 1]). Note that, a combination of unused orthogonal codes ($UnCode_1$ and $UnCode_2$) is not limited to a combination of $WH_4(2)$ and $WH_4(4)$ and may be a combination of other codes.

In the same manner, for example, in a case where code multiplexing number $N_{CM}$=three, code generator 104 determines, as codes for code multiplexing transmission, three orthogonal codes among Walsh-Hadamard codes with code length Loc=4. In this case, the number ($N_{allcode}$-$N_{CM}$) of unused orthogonal codes is one.

For example, code generator 104 may select $Code_1$=$WH_4(3)$=[1, 1, −1, −1], $Code_2$=$WH_4(4)$=[1, −1, −1, 1], and $Code_3$=$WH_4(2)$=[1, −1, 1, −1].

Further, aliasing determiner 212 of radar receiver 200 uses, among $N_{allcode}$ (=4) Walsh-Hadamard codes with code length Loc=4, one (=$N_{allcode}$-$N_{CM}$) unused orthogonal code for aliasing determination (an example will be described later). For example, in a case where the code multiplexing number is $N_{CM}$=three and codes for code multiplexing transmission, determined by code generator 104, are $Code_1$=$WH_4(3)$=[1, 1, −1, −1], $Code_2$=$WH_4(4)$=[1, −1, −1, 1], and $Code_3$=$WH_4(2)$=[1, −1, 1, −1], the unused orthogonal code is $UnCode_1$=$WH_4(1)$=[1, 1, 1, 1]. Note that, a combination of codes for code multiplexing transmission ($Code_1$, $Code_2$, and $Code_3$) and an unused orthogonal code ($UnCode_1$) is not limited thereto and may be another combination of codes.

<Case of $N_{CM}$=4, 5, 6, or 7>

In a case where $N_{CM}$=4, 5, 6, or 7, for example, Walsh-Hadamard codes with code length Loc=8, 16, 32, . . . may be applied. In the case of these code lengths Loc, $N_{CM}$<$N_{allcode}$(Loc). Further, in a case where the code multiplexing number is $N_{CM}$=4, 5, 6, or 7, Walsh-Hadamard codes with a shorter code length (for example, Loc=8) among these code lengths Loc may also be used.

For example, Walsh-Hadamard codes with code length Loc=8 include following eight orthogonal codes.

| | | | | | | | | |
|---|---|---|---|---|---|---|---|---|
| $WH_8(1)$ = [ 1 | 1 | 1 | 1 | 1 | 1 | 1 | 1], |
| $WH_8(2)$ = [ 1 | −1 | 1 | −1 | 1 | −1 | 1 | −1], |
| $WH_8(3)$ = [ 1 | 1 | −1 | −1 | 1 | 1 | −1 | −1], |
| $WH_8(4)$ = [ 1 | −1 | −1 | 1 | 1 | −1 | −1 | 1], |
| $WH_8(5)$ = [ 1 | 1 | 1 | 1 | −1 | −1 | −1 | −1], |
| $WH_8(6)$ = [ 1 | −1 | 1 | −1 | −1 | 1 | −1 | 1], |
| $WH_8(7)$ = [ 1 | 1 | −1 | −1 | −1 | −1 | 1 | 1], |
| $WH_8(8)$ = [ 1 | −1 | −1 | 1 | −1 | 1 | 1 | −1], |

Here, among the Walsh-Hadamard codes with code length Loc=8, $WH_8(1)$ and $WH_8(2)$ are a set of codes in which the odd-numbered code elements are identical between the codes and the even-numbered code elements are code-inverted between the codes. Further, in the same manner, each of a set of $WH_8(3)$ and $WH_8(4)$, a set of $WH_8(5)$ and $WH_8(6)$, and a set of $WH_8(7)$ and $WH_8(8)$ is also a set of codes in the same relation to the set of $WH_8(1)$ and $WH_8(2)$.

For example, in a case where the number ($N_{allcode}$-$N_{CM}$) of unused orthogonal codes is larger than or equal to two, code generator 104 may select, as an example of selecting codes such that a set of codes in such a relation is not included in the unused orthogonal codes, codes for code multiplexing transmission such that a set of codes $WH_8(1)$ and $WH_8(2)$, a set of codes $WH_8(3)$ and $WH_8(4)$, a set of codes $WH_8(5)$ and $WH_8(6)$, or a set of codes $WH_8(7)$ and $WH_8(8)$ is not included in the unused orthogonal codes.

For example, in a case where code multiplexing number $N_{CM}$=4, code generator 104 determines, as codes for code multiplexing transmission, four orthogonal codes among Walsh-Hadamard codes with code length Loc=8. In this case, the number ($N_{allcode}$-$N_{CM}$) of unused orthogonal codes is four.

For example, in code generator 104, the combination of codes for code multiplexing transmission ($Code_1$, $Code_2$, $Code_3$, and $Code_4$) may be a combination of $Code_1$=$WH_8(1)$, $Code_2$=$WH_8(3)$, $Code_3$=$WH_8(5)$, and $Code_4$=$WH_8(7)$, or a combination of $Code_1$=$WH_8(1)$, $Code_2$=$WH_8(4)$, $Code_3$=$WH_8(5)$, and $Code_4$=$WH_8(8)$. Note that, the combination of codes for code multiplexing transmission ($Code_1$, $Code_2$, $Code_3$, and $Code_4$) is not limited thereto.

Further, in a case where code multiplexing number $N_{CM}$=4, for example, aliasing determiner 212 of radar receiver 200 uses, among $N_{allcode}$=8 Walsh-Hadamard codes with code length Loc=8, one, some or all of four (=$N_{allcode}$-$N_{CM}$) unused orthogonal codes, which is/are not used by code generator 104, for aliasing determination (an example will be described later).

For example, in a case where code multiplexing number $N_{CM}$=4 and codes for code multiplexing transmission, determined by code generator 104, are $Code_1$=$WH_8(1)$, $Code_2$=$WH_8(3)$, $Code_3$=$WH_8(5)$, and $Code_4$=$WH_8(7)$, unused orthogonal codes are $UnCode_1$=$WH_8(2)$, $UnCode_2$=$WH_8(4)$, $UnCode_3$=$WH_8(6)$, and $UnCode_4$=$WH_8(8)$. Alternatively, for example, in a case where code multiplexing number $N_{CM}$=4 and codes for code multiplexing transmission, determined by code generator 104, are $Code_1$=$WH_8(1)$, $Code_2$=$WH_8(4)$, $Code_3$=$WH_8(5)$, and $Code_4$=$WH_8(8)$, unused orthogonal codes are $UnCode_1$=$WH_8(2)$, $UnCode_2$=$WH_8(3)$, $UnCode_3$=$WH_8(6)$, and $UnCode_4$=$WH_8(7)$.

In the same manner, for example, in a case where code multiplexing number $N_{CM}$=5, code generator 104 determines, as codes for code multiplexing transmission, five orthogonal codes among Walsh-Hadamard codes with code length Loc=8. In this case, the number ($N_{allcode}$-$N_{CM}$) of unused orthogonal codes is three.

For example, in code generator 104, the combination of codes for code multiplexing transmission ($Code_1$, $Code_2$, $Code_3$, $Code_4$, and $Code_5$) may be a combination of $Code_1$=$WH_8(1)$, $Code_2$=$WH_8(3)$, $Code_3$=$WH_8(5)$, $Code_4$=$WH_8(7)$, and $Code_5$=$WH_8(8)$, or a combination of $Code_1$=$WH_8(1)$, $Code_2$=$WH_8(4)$, $Code_3$=$WH_8(5)$, $Code_4$=$WH_8(7)$, and $Code_5$=$WH_8(8)$. Note that, the combination of codes for code multiplexing transmission ($Code_1$, $Code_2$, $Code_3$, $Code_4$, and $Code_5$) is not limited thereto.

In a case where code multiplexing number $N_{CM}$=5, for example, aliasing determiner 212 of radar receiver 200 uses, among $N_{allcode}$=8 Walsh-Hadamard codes with code length Loc=8, one, some or all of three (=$N_{allcode}$-$N_{CM}$) unused orthogonal codes, which is/are not used by code generator 104, for aliasing determination (an example will be described later).

For example, in a case where code multiplexing number $N_{CM}$=5 and codes for code multiplexing transmission, determined by code generator 104, are $Code_1$=$WH_8(1)$, $Code_2$=$WH_8(3)$, $Code_3$=$WH_8(5)$, $Code_4$=$WH_8(7)$, and $Code_5$=$WH_8(8)$, unused orthogonal codes are $UnCode_1$=$WH_8(2)$, $UnCode_2$=$WH_8(4)$, and $UnCode_3$=$WH_8(6)$. Alternatively, for example, in a case where code multiplexing number $N_{CM}$=5 and codes for code multiplexing transmission, determined by code generator 104, are $Code_1$=$WH_8(1)$, $Code_2$=$WH_8(4)$, $Code_3$=$WH_8(5)$, $Code_4$=$WH_8(7)$, and $Code_5$=$WH_8(8)$, unused orthogonal codes are $UnCode_1$=$WH_8(2)$, $UnCode_2$=$WH_8(3)$, and $UnCode_3$=$WH_8(6)$.

In the same manner, for example, in a case where code multiplexing number $N_{CM}$=6, code generator 104 determines, as codes for code multiplexing transmission, six orthogonal codes among Walsh-Hadamard codes with code length Loc=8. In this case, the number ($N_{allcode}$-$N_{CM}$) of unused orthogonal codes is two.

For example, in code generator 104, the combination of codes for code multiplexing transmission ($Code_1$, $Code_2$, $Code_3$, $Code_4$, $Code_5$, and $Code_6$) may be, for example, $Code_1$=$WH_8(1)$, $Code_2$=$WH_8(2)$, $Code_3$=$WH_8(3)$, $Code_4$=$WH_8(4)$, $Code_5$=$WH_8(5)$, and $Code_6$=$WH_8(8)$. Note that, the combination of codes for code multiplexing transmission ($Code_1$, $Code_2$, $Code_3$, $Code_4$, $Code_5$, and $Code_6$) is not limited thereto.

Further, in a case where code multiplexing number $N_{CM}=6$, for example, aliasing determiner 212 of radar receiver 200 uses, among $N_{allcode}=8$ Walsh-Hadamard codes with code length Loc=8, one or all of two (=$N_{allcode}-N_{CM}$) unused orthogonal codes, which is/are not used by code generator 104, for aliasing determination (an example will be described later).

For example, in a case where the code multiplexing number is $N_{CM}=6$ and codes for code multiplexing transmission, determined by code generator 104, are $Code_1=WH_8(1)$, $Code_2=WH_8(2)$, $Code_3=WH_8(3)$, $Code_4=WH_8(4)$, $Code_5=WH_8(5)$, and $Code_6=WH_8(8)$, unused orthogonal codes are $UnCode_1=WH_8(6)$ and $UnCode_2=WH_8(7)$.

In the same manner, for example, in a case where code multiplexing number $N_{CM}=7$, code generator 104 determines, as codes for code multiplexing transmission, seven orthogonal codes among Walsh-Hadamard codes with code length Loc=8. In this case, the number ($N_{allcode}-N_{CM}$) of unused orthogonal codes is one.

For example, code generator 104 may select $Code_1=WH_8(1)$, $Code_2=WH_8(2)$, $Code_3=WH_8(3)$, $Code_4=WH_8(4)$, $Code_5=WH_8(5)$, $Code_6=WH_8(6)$, and $Code_7=WH_8(7)$ as codes for code multiplexing transmission. Note that, the combination of codes for code multiplexing transmission is not limited thereto.

Further, aliasing determiner 212 of radar receiver 200 uses, among $N_{allcode}=8$ Walsh-Hadamard codes with code length Loc=8, one (=$N_{allcode}-N_{CM}$) unused orthogonal code, which is not used by code generator 104, for aliasing determination (an example will be described later).

For example, in a case where code multiplexing number $N_{CM}=7$ and codes for code multiplexing transmission, determined by code generator 104, are $Code_1=WH_8(1)$, $Code_2=WH_8(2)$, $Code_3=WH_8(3)$, $Code_4=WH_8(4)$, $Code_5=WH_8(5)$, $Code_6=WH_8(6)$, and $Code_7=WH_8(7)$, an unused orthogonal code is $UnCode_1=WH(8)$.

The cases of code multiplexing number $N_{CM}=4$, 5, 6, or 7 have been described above.

Note that, also in a case where code multiplexing number $N_{CM}=8$ or more, radar apparatus 10 may determine codes for code multiplexing transmission and unused orthogonal codes in the same manner as in the cases of code multiplexing number $N_{CM}=2$ to 7.

For example, code generator 104 may select, as codes for code multiplexing transmission, $N_{CM}$ orthogonal codes among Walsh-Hadamard codes with code length Loc indicated by equation 2.

[2]

$$Loc \geq 2^{ceil[log2(NCM+1)]}$$ (Equation 2)

In this case, $N_{CM} < Loc = N_{allcode}(Loc)$.

Further, aliasing determiner 212 of radar receiver 200 may use ($N_{allcode}-N_{CM}$) unused orthogonal codes among $N_{allcode}$ (=Loc) Walsh-Hadamard codes with code length Loc for aliasing determination (an example will be described later). Further, in a case where the number ($N_{allcode}-N_{CM}$) of unused orthogonal codes is larger than or equal to two, code generator 104 may, for example, select codes for code multiplexing transmission among Walsh-Hadamard codes with code length Loc such that a set of codes, in which either the odd-numbered code elements are identical between the codes and even-numbered code elements are code-inverted between the codes, or the even-numbered code elements are identical between the codes and the odd-numbered code elements are code-inverted between the codes, is not included in the unused orthogonal codes.

In other words, among Walsh-Hadamard codes with code length Loc, one of a set of codes, in which either the odd-numbered code elements are identical between the codes and even-numbered code elements are code-inverted between the codes, or the even-numbered code elements are identical between the codes and the odd-numbered code elements are code-inverted between the codes, may be included in the unused orthogonal codes, and the other of the set of codes may not be included in the unused orthogonal codes.

Note that, the elements forming the orthogonal code sequence are not limited to real numbers, but complex values may also be included.

Further, the code may also be another orthogonal code different from the Walsh-Hadamard code. For example, the code may be an orthogonal M-sequence code or a pseudo-orthogonal code.

An example of orthogonal codes in each code multiplexing number Ncm has been described above.

Next, an example of a phase rotation amount based on a code for code multiplexing transmission generated by code generator 104 will be described.

Radar apparatus 10, for example, performs code multiplexing transmission using orthogonal codes different from each other, for transmission antennas Tx #1 to Tx #$N_T$ that perform code multiplexing transmission. Code generator 104, for example, configures phase rotation amount $\psi_{ncm}(m)$ based on orthogonal code $Code_{ncm}$ to be applied to ncm-th transmission antenna Tx #ncm at m-th transmission period Tr and outputs phase rotation amount $\psi_{ncm}(m)$ to phase rotator 105. Here, ncm=1, . . . , $N_{CM}$.

For example, as phase rotation amount $\psi_{ncm}(m)$, code generator 104 cyclically applies phase amounts corresponding to Loc code elements $OC_{ncm}(1)$, . . . , $OC_{ncm}(Loc)$ of orthogonal code $Code_{ncm}$ for each duration of transmission periods, the number of which corresponds to code length Loc as indicated by following equation 3.

[3]

$$\psi_{ncm}(m)=angle[OC_{ncm}(OC\_INDEX)]$$ (Equation 3)

Here, angle(x) is an operator that outputs the radian phase of real number x, and angle(1)=0, angle(−1)=π, angle(j)=π/2, and angle(−j)=−π/2. j is an imaginary unit. Further, OC_INDEX is an orthogonal code element index that designates an element of orthogonal code sequence $Code_{ncm}$ and cyclically varies in the range from one to Loc as in following equation 4 for each transmission period (Tr).

[4]

$$OC\_INDEX=mod(m-1,Loc)+1$$ (Equation 4)

Here, mod (x, y) is a modulus operator and is a function that outputs a remainder after x is divided by y. m=1, . . . , Nc. Nc is a predetermined number of transmission periods that radar apparatus 10 uses for radar positioning (hereinafter referred to as "radar transmission signal transmission number"). Further, radar apparatus 10, for example, performs transmission in radar transmission signal transmission number Nc that is an integer multiple (for example, Ncode multiple) of Loc. For example, Nc=Loc×Ncode.

Further, code generator 104 outputs orthogonal code element index OC_INDEX to output switch 209 of radar receiver 200 for each transmission period (Tr).

Phase rotator 105 includes, for example, phase shifters or phase modulators corresponding to $N_T$ transmission antennas 106, respectively. Phase rotator 105, for example, applies phase rotation amount $\psi_{ncm}(m)$ inputted from code generator 104 to each chirp signal inputted from radar transmission signal generator 101 for each transmission period Tr.

For example, phase rotator 105 applies phase rotation amount $\psi_{ncm}(m)$ based on orthogonal code $Code_{ncm}$ to be applied to ncm-th transmission antenna Tx #ncm, to each chirp signal inputted from radar transmission signal generator 101 for each transmission period Tr. Here, ncm=1, ..., $N_{CM}$, and m=1, ..., Nc.

The output from phase rotator 105 to $N_T$ transmission antennas 106 is amplified to predetermined transmission power, for example, and then radiated into space from $N_T$ transmission antennas 106 (for example, transmission array antenna).

As an example, a case where code multiplexing transmission is performed with number $N_T$ of transmission antennas=3 and code multiplexing number $N_{CM}$=3 will be described. Note that, number $N_T$ of transmission antennas and code multiplexing number Ncm are not limited these values.

For example, phase rotation amounts $\psi_1(m)$, $\psi_2(m)$, and $\psi_3(m)$ are outputted from code generator 104 to phase rotator 105 at each m-th transmission period Tr.

First (ncm=1) phase rotator 105 (in other words, a phase shifter corresponding to first transmission antenna 106 (for example, Tx #1)) applies phase rotation to each chirp signal, which is generated by radar transmission signal generator 101 for each transmission period Tr, for each transmission period Tr as indicated by following equation 5.

[5]

$$\exp[j\psi_1(1)]cp(t), \exp[j\psi_1(2)]cp(t), \exp[j\psi_1(3)]cp(t), \ldots, \exp[j\psi_1(Nc)]cp(t) \quad \text{(Equation 5)}$$

The output of first phase rotator 105 is transmitted from transmission antenna Tx #1. Here, cp(t) represents the chirp signal for each m-th transmission period Tr.

In the same manner, second (ncm=2) phase rotator 105 applies phase rotation to each chirp signal, which is generated by radar transmission signal generator 101 for each transmission period Tr, for each transmission period Tr as indicated by following equation 6.

[6]

$$\exp[j\psi_2(1)]cp(t), \exp[j\psi_2(2)]cp(t), \exp[j\psi_2(3)]cp(t), \ldots, \exp[j\psi_2(Nc)]cp(t) \quad \text{(Equation 6)}$$

The output of second phase rotator 105 is transmitted from transmission antenna Tx #2.

In the same manner, third (ncm=3) phase rotator 105 applies phase rotation to each chirp signal, which is generated by radar transmission signal generator 101 for each transmission period Tr, for each transmission period Tr as indicated by following equation 7.

[7]

$$\exp[j\psi_3(1)]cp(t), \exp[j\psi_3(2)]cp(t), \exp[j\psi_3(3)]cp(t), \ldots, \exp[j\psi_3(Nc)]cp(t) \quad \text{(Equation 7)}$$

The output of third phase rotator 105 is transmitted from second transmission antenna Tx #3.

Note that, in a case where radar apparatus 10 continuously performs radar positioning, radar apparatus 10 may variably configure a code used for orthogonal code $Code_{ncm}$ for each radar positioning (for example, for each of Nc transmission periods (Nc×Tr)).

Further, radar apparatus 10 may, for example, variably configure transmission antenna 106 that transmits the outputs of $N_T$ phase rotators 105 (in other words, transmission antennas 106 corresponding to each output of phase rotators 105). For example, association of a plurality of transmission antennas 106 with code sequences for code multiplexing transmission may vary for each radar positioning by radar apparatus 10. In a case where radar apparatus 10, for example, receives a signal under the influence of interference from another radar, which differs for each transmission antenna 106, the code-multiplexed signal outputted from transmission antennas 106 varies for each radar positioning, and the effect of randomizing the influence of interference can be obtained.

A configuration example of radar transmitter 100 has been described above.

[Configuration of Radar Receiver 200]

In FIG. 1, radar receiver 200 includes Na reception antennas 202 (for example, also represented by Rx #1 to Rx #Na) to form an array antenna. Further, radar receiver 200 includes Na antenna system processors 201-1 to 201-Na, constant false alarm rate (CFAR) section 211, aliasing determiner 212, code demultiplexer 213, and direction estimator 214.

Each reception antenna 202 receives a reflected wave signal that is a radar transmission signal reflected by a target, and outputs, as a reception signal, the received reflected wave signal to corresponding antenna system processor 201.

Each antenna system processor 201 includes reception radio 203 and signal processor 206.

Reception radio 203 includes mixer 204 and low pass filter (LPF) 205. Mixer 204 mixes a received reflected wave signal with a chirp signal that is a transmission signal inputted from radar transmission signal generator 101. LPF 205 outputs a beat signal that is a frequency in accordance with a delay time of a reflected wave signal by performing LPF processing on an output signal of mixer 204. For example, as illustrated in the lower row of FIG. 2, the difference frequency between the frequency of a transmission chirp signal (transmission frequency-modulated wave) and the frequency of a reception chirp signal (reception frequency-modulated wave) is obtained as the beat frequency.

Signal processor 206 of each antenna system processor 201-z (where z=any one of 1 to Na) includes AD converter 207, beat frequency analyzer 208, output switch 209, and Doppler analyzer 210.

In signal processor 206, AD converter 207 converts a signal (for example, a beat signal) outputted from LPF 205 into discretely sampled data.

Beat frequency analyzer 208 performs FFT processing on $N_{data}$ pieces of discretely sampled data obtained in a predetermined time range (range gate) for each transmission period Tr. Thus, signal processor 206 outputs a frequency spectrum in which a peak appears at a beat frequency in accordance with a delay time of a reflected wave signal (radar reflected wave). Note that, as the FFT processing, beat frequency analyzer 208 may perform multiplication by a window function coefficient such as a Han window or a Hamming window, for example. Note that, radar apparatus 10 can suppress side lobes that appear around a beat frequency peak by using the window function coefficient. Further, in a case where the number of $N_{data}$ pieces of discretely sampled data is not a power of two, beat frequency analyzer 208 may, for example, include zero-padded data to obtain the FFT size of a power of two to perform FFT processing.

Here, a beat frequency response outputted from beat frequency analyzer 208 in z-th signal processor 206, obtained through the m-th chirp pulse transmission, is represented by $RFT_z(f_b, m)$. Here, fb represents the beat frequency index and corresponds to the index (bin number) of FFT. For example, $f_b=0, \ldots, N_{data}/2$, $z=0, \ldots, N_a$, and $m=1, \ldots, N_C$. As beat frequency index fb decreases, beat frequency index $f_b$ indicates a beat frequency of which a delay time of a reflected wave signal is smaller (in other words, a distance to a target object is closer).

Further, beat frequency index fb may be converted into distance information R(fb) by using following equation 8.

[8]
$$R(f_b) = \frac{C_0}{2B_w} f_b$$
(Equation 8)

Accordingly, hereinafter, beat frequency index fb is also referred to as "distance index $f_b$".

Here, $B_w$ represents a frequency modulated bandwidth within a range gate in a chirp signal, and $C_0$ represents the velocity of light.

Output switch 209 selectively switches and outputs the output of beat frequency analyzer 208 for each transmission period to the OC_INDEX-th Doppler analyzer 210 among Loc Doppler analyzers 210 based on orthogonal code element index OC_INDEX outputted from code generator 104. In other words, output switch 209 selects the OC_INDEX-th Doppler analyzer 210 at m-th transmission period Tr.

Signal processor 206 includes Loc Doppler analyzers 210-1 to 210-Loc. For example, data is inputted into noc-th Doppler analyzer 210 by output switch 209 for each of Loc transmission periods (Loc×Tr). For this reason, noc-th Doppler analyzer 210 performs Doppler analysis for each distance index fb by using data of Ncode transmission periods (for example, beat frequency response $RFT_z(f_b, m)$ outputted from beat frequency analyzer 208) among Nc transmission periods. Here, noc is the index of a code element, and noc=1, . . . , Loc.

For example, in a case where Ncode is the value of a power of two, FFT processing may be applied in Doppler analysis. In this case, the FFT size is Ncode, and the maximum Doppler frequency at which no aliasing occurs and which is derived from the sampling theorem is ±1/(2Loc×Tr). Further, the Doppler frequency interval of Doppler frequency index $f_s$ is 1/(Ncode×Loc×Tr), and the range of Doppler frequency index $f_s$ is $f_s=-\text{Ncode}/2, \ldots, 0, \ldots, \text{Ncode}/2-1$.

For example, output $VFT_z^{noc}(f_b, f_s)$ of Doppler analyzer 210 of z-th signal processor 206 is indicated by following equation 9.

[9]
(Equation 9)
$$VFT_z^{noc}(f_b, f_s) = \sum_{s=0}^{N_{code}-1} RFT_z(f_b, L_{OC} \times s + noc)\exp\left[-j\frac{2\pi s f_s}{N_{code}}\right]$$

where j is an imaginary unit, and z=1 to Na.

Further, in a case where Ncode is not a power of two, for example, zero-padded data may be included to obtain power-of-two pieces of data size (FFT size) to perform FFT processing. For example, in a case where the FFT size in Doppler analyzer 210 when zero-padded data is included is $N_{codewzero}$, output $VFT_z^{noc}(f_b, f_s)$ of Doppler analyzer 210 in z-th signal processor 206 is indicated by following equation 10.

[10]
(Equation 10)
$$VFT_z^{noc}(f_b, f_s) = \sum_{s=0}^{N_{codewzero}-1} RFT_z(f_b, L_{OC} \times s + noc)\exp\left[-j\frac{2\pi s f_s}{N_{codewzero}}\right]$$

Here, noc is the index of a code element, and noc=1, . . . , Loc. The FFT size is $N_{codewzero}$, and the maximum Doppler frequency at which no aliasing occurs and which is derived from the sampling theorem is ±1/(2Loc×Tr). Further, the Doppler frequency interval of Doppler frequency index $f_s$ is 1/($N_{codewzero}$×Loc×Tr), and the range of Doppler frequency index $f_s$ is $f_s=-N_{codewzero}/2, \ldots, 0, \ldots, N_{codewzero}/2-1$.

Hereinafter, a case where Ncode is the value of a power of two will be described as an example. Note that, in a case whwre zero padding is used in Doppler analyzer 210, the same applies and the same effect can be obtained by replacing Ncode with $N_{codewzero}$ in the following description.

Further, at the time of FFT processing, Doppler analyzer 210 may perform multiplication by a window function coefficient such as a Han window or a Hamming window, for example. Radar apparatus 10 can suppress side lobes that appear around a beat frequency peak by applying a window function.

The processing in each component of signal processor 206 has been described above.

In FIG. 1, CFAR section 211 performs CFAR processing (in other words, adaptive threshold determination) by using the outputs of Loc Doppler analyzers 210 of each of the first to Na-th signal processors 206 and extracts distance indexes $f_{b\_cfar}$ and Doppler frequency indexes $f_{s\_cfar}$ that give a peak signal.

CFAR section 211, for example, perform power addition of outputs $VFT_z^{noc}(f_b, f_s)$ of Doppler analyzers 210 of each of the first to Na-th signal processors 206 as indicated by following equation 11 and performs two-dimensional CFAR processing with the distance axis and the Doppler frequency axis (which corresponds to the relative velocity) or CFAR processing combined with one-dimensional CFAR processing.

[11]
(Equation 11)
$$PowerFT(f_b, f_s) = \sum_{z=1}^{N_a} \sum_{noc=1}^{L_{oc}} |VFT_z^{noc}(f_b, f_s)|^2$$

Processing disclosed in, for example, NPL 2 may be applied as the two-dimensional CFAR processing or the CFAR processing combined with the one-dimensional CFAR processing.

CFAR section 211 adaptively configures a threshold value, and outputs distance indexes $f_{b\_cfar}$, Doppler frequency indexes $f_{s\_cfar}$, and received power information PowerFT($f_{b\_cfar}$, $f_{s\_cfar}$), which provide received power larger than the threshold value, to aliasing determiner 212.

Next, an operation example of aliasing determiner 212 illustrated in FIG. 1 will be described.

Aliasing determiner 212, for example, performs aliasing determination on Doppler components $VFT_z^{noc}(f_{b\_cfar}, f_{s\_cfar})$, which are the outputs of Doppler analyzer 210, based on distance indexes $f_{b\_cfar}$ and Doppler frequency indexes $f_{s\_cfar}$ extracted in CFAR section 211. Here, z=1, . . . , Na, and noc=1, . . . , Loc.

Aliasing determiner 212, for example, performs Doppler aliasing determination processing on the assumption that the Doppler range of a target is ±1/(2×Tr).

Here, for example, in a case where Ncode is the value of a power of two, Doppler analyzers 210 apply FFT processing to each code element so that each Doppler analyzer 210 performs FFT processing by using an output from beat frequency analyzer 208 at a period of (Loc×Tr). For this reason, a Doppler range in which no aliasing occurs by the sampling theorem in Doppler analyzers 210 is ±1/(2Loc×Tr).

Thus, the Doppler range of a target assumed in aliasing determiner 212 is wider than the Doppler range in which no aliasing occurs in Doppler analyzers 210. For example, aliasing determiner 212 performs aliasing determination processing by assumption up to Doppler range ±1/(2×Tr) that is Loc times Doppler range ±1/(2Loc×Tr) in which no aliasing occurs in Doppler analyzers 210.

Hereinafter, an example of aliasing determination processing in aliasing determiner 212 will be described.

Here, as an example, a case where code multiplexing number $N_{CM}$=three and code generator 104 uses three orthogonal codes $Code_1$=WH$_4$(3)=[1, 1, −1, −1], $Code_2$=WH$_4$(4)=[1, −1, −1, 1], and $Code_3$=WH$_4$(2)=[1, −1, 1, −1] among Walsh-Hadamard codes with code length Loc=4 will be described.

For example, aliasing determiner 212 uses, among $N_{allcode}$ (=4) Walsh-Hadamard codes with code length Loc=4, one (=$N_{allcode}$-$N_{CM}$) unused orthogonal code for aliasing determination. For example, in a case where the code multiplexing number is $N_{CM}$=three and codes for code multiplexing transmission, determined by code generator 104, are $Code_1$=WH$_4$(3)=[1, 1, −1, −1], $Code_2$=WH$_4$(4)=[1, −1, −1, 1], and $Code_3$=WH$_4$(2)=[1, −1, 1, −1], the unused orthogonal code is $UnCode_1$=WH$_4$(1)=[1, 1, 1, 1].

For example, in a case where radar apparatus 10 performs code multiplexing transmission by using orthogonal codes with code length Loc=4, Doppler analyzers 210 apply FFT processing to each code element as described above so that each Doppler analyzer 210 performs FFT processing by using an output from beat frequency analyzer 208 at a period of (Loc×Tr)=(4×Tr). Thus, a Doppler range in which no aliasing occurs by the sampling theorem in Doppler analyzers 210 is ±1/(2 Loc×Tr)=±1/(8×Tr).

Aliasing determiner 212 performs aliasing determination in a range that is larger by a factor of code length Loc of an orthogonal code sequence than a Doppler analysis range (Doppler range) in Doppler analyzers 210. For example, aliasing determiner 212 performs aliasing determination processing by assuming Doppler range=±1/(2×Tr) that is four (=Loc) times the Doppler range ±1/(8×Tr) in which no aliasing occurs in Doppler analyzers 210.

Figure 3:
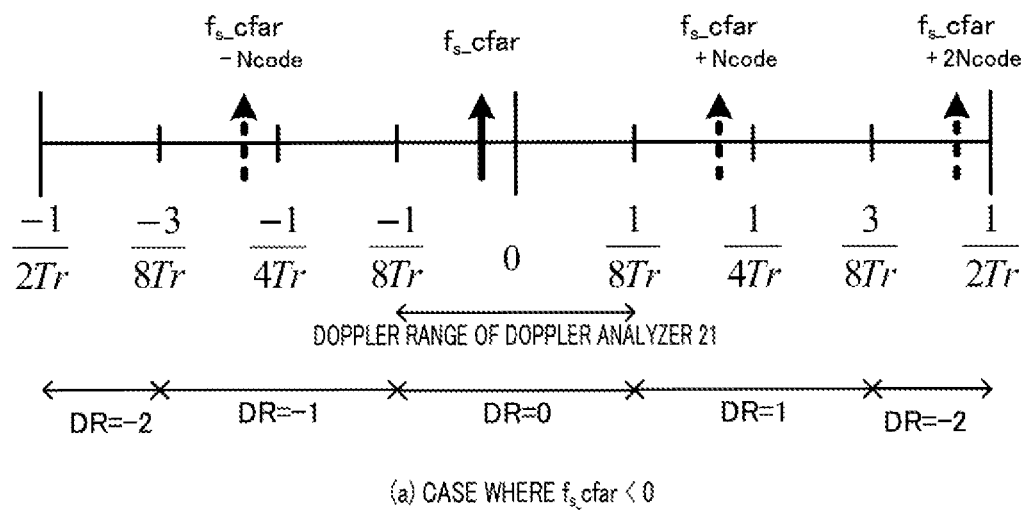
FIG. 3 illustrates an example of a Doppler shift amount according to Embodiment 1.
Figure 3:
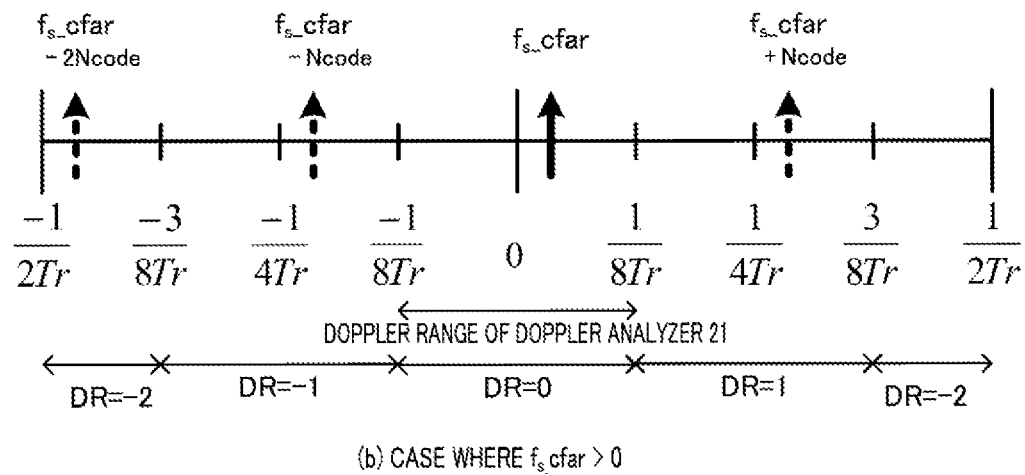

Here, Doppler components $VFT_z^{noc}(f_{b\_cfar}, f_{s\_cfar})$ that are the outputs of Doppler analyzers 210 corresponding to distance indexes $f_{b\_cfar}$ and Doppler frequency indexes $f_{s\_cfar}$ extracted in CFAR section 211 may include, for example, Doppler components including aliasing as illustrated in (a) and (b) of FIG. 3 in the Doppler range of ±1/(2×Tr).

For example, as illustrated in (a) of FIG. 3, in a case where $f_{s\_cfar}$<0, four (=Loc) Doppler components of $f_{s\_cfar}$−Ncode, $f_{s\_cfar}$, $f_{s\_cfar}$+Ncode, and $f_{s\_cfar}$+2Ncode are possible in the Doppler range ±1/(2×Tr).

Further, for example, as illustrated in (b) of FIG. 3, in a case where $f_{s\_cfar}$>0, four (=Loc) Doppler components of $f_{s\_cfar}$−2Ncode, $f_{s\_cfar}$−Ncode, $f_{s\_cfar}$, and $f_{s\_cfar}$+Ncode are possible in the Doppler range ±1/(2×Tr).

Aliasing determiner 212, for example, performs code demultiplexing processing in the Doppler range ±1/(2×Tr) as illustrated in FIG. 3 by using an unused orthogonal code. For example, aliasing determiner 212 may correct, for the unused orthogonal code, a phase change in four (=Loc) Doppler components including aliasing as illustrated in FIG. 3.

Then, aliasing determiner 212 determines whether each Doppler component is aliasing based on the received power of Doppler components code-demultiplexed based on the unused orthogonal code. For example, aliasing determiner 212 detects, among Doppler components including aliasing, a Doppler component with the minimum received power, and determines the detected Doppler component as a true Doppler component. In other words, aliasing determiner 212 determines, among the Doppler components including aliasing, Doppler components with other received power different from the minimum received power as false Doppler components.

This aliasing determination processing makes it possible to reduce ambiguity of a Doppler range including aliasing. Further, this aliasing determination processing makes it possible to expand the range in which the Doppler frequency can be detected without ambiguity to a range larger than or equal to −1/(2Tr) and less than 1/(2Tr) in comparison with a Doppler range in Doppler analyzer 210.

As a result, when code demultiplexing is performed based on an unused orthogonal code, for example, a phase change in a true Doppler component is properly corrected, and the orthogonality between the orthogonal codes for code multiplexing transmission and the unused orthogonal code is maintained. Thus, the unused orthogonal code and the code multiplexing transmission signals are uncorrelated, and the received power becomes approximately a noise level.

On the other hand, for example, a phase change in a false Doppler component is erroneously corrected, and the orthogonality between the orthogonal codes for code multiplexing transmission and the unused orthogonal code is not maintained. Thus, a correlation component (interference component) between the unused orthogonal code and the code-multiplexed transmission signals occurs, and, for example, a received power larger than a noise level may be detected.

Thus, as described above, aliasing determiner 212 can determine, among Doppler components code-demultiplexed by using an unused orthogonal code, a Doppler component with the minimum received power as a true Doppler component, and can determine the other Doppler components with received power different from the minimum received power as false Doppler components.

For example, aliasing determiner 212 corrects a phase change in a Doppler component including aliasing based on the output of Doppler analyzer 210 in each antenna system processor 201, and calculates received power DeMulUn-$Code_{nuc}(f_{b\_cfar}, f_{s\_cfar}, DR)$ after code demultiplexing using unused orthogonal code $UnCode_{nuc}$ in accordance with following equation 12.

[12]

$$DeMulUnCode_{nuc}(f_{b\_cfar}, f_{s\_cfar}, DR) =$$
$$Code_{nuc})^* \cdot \{\beta(DR) \otimes \alpha(f_{s\_cfar}) \otimes VFTALL_z(f_{b\_cfar}, f_{s\_cfar})\}^T|^2$$

(Equation 12)

In equation 12, the sum of the received powers after code demultiplexing using unused orthogonal code $UnCode_{nuc}$ is calculated with respect to the outputs of Doppler analyzers 210 in all of antenna system processors 201, which makes it possible to increase aliasing determination accuracy even in a case where the reception signal level is low. However, instead of equation 12, the received power after code demultiplexing using the unused orthogonal code may be calculated with respect to the outputs of Doppler analyzers 210 in one or some of antenna system processors 201. Even in this case, it is possible to reduce the arithmetic processing amount while maintaining aliasing determination accuracy in a range in which the reception signal level is sufficiently high, for example.

Note that, in equation 12, nuc=1, . . . , $N_{allcode}$–$N_{CM}$. Further, DR is the index indicating a Doppler aliasing range and, for example, takes an integer value in a range of DR=ceil[–Loc/2], ceil[–Loc/2]+1, . . . , 0, . . . , ceil[Loc/2]–1.

Further, in equation 12,

[13]

operator "$\otimes$", indicates the product between elements of vectors having the same number of elements. For example, for the n-th order vectors A=[$a_1$, . . . , $a_n$] and B=[$b_1$, . . . , $b_n$], the products between the elements is indicated by following equation 13.

[14]

$$A \otimes B = [a_1, \ldots, a_n] \otimes [b_1, \ldots, b_n] = [a_1 b_1, \ldots, a_n b_n] \quad \text{(Equation 13)}$$

Further, in equation 12,

[15]

operator "·"

indicates a vector inner product operator. Further, in equation 12, character superscript T indicates vector transposition, and character superscript*(asterisk) indicates a complex conjugate operator.

In equation 12, $\alpha(f_{s\_cfar})$ represents a "Doppler phase correction vector". For example, in a case where Doppler frequency index $f_{s\_cfar}$ extracted in CFAR section 211 falls within an output range (in other words, a Doppler range) of Doppler analyzer 210, in which no Doppler aliasing is included, Doppler phase correction vector $\alpha(f_{s\_cfar})$ corrects Doppler phase rotation due to a time difference in Doppler analysis among Loc Doppler analyzers 210.

For example, Doppler phase correction vector $\alpha(f_{s\_cfar})$ is indicated as in following equation 14.

[16]

$$\alpha(f_{s\_cfar}) = [1, \exp[-j\frac{2\pi f_{s\_cfar}}{N_{code}} \frac{1}{Loc}],$$
$$\exp[-j\frac{2\pi f_{s\_cfar}}{N_{code}} \frac{2}{Loc}], \ldots, \exp[-j\frac{2\pi f_{s\_cfar}}{N_{code}} \frac{Loc-1}{Loc}]]$$

(Equation 14)

Doppler phase correction vector $\alpha(f_{s\_cfar})$ indicated by equation 14 is, for example, a vector whose element is a Doppler phase correction coefficient for correcting phase rotation in a Doppler component of Doppler frequency index $f_{s\_cfar}$, which occurs due to each time delay of Tr, 2Tr, . . . , (Loc–1)Tr in output $VFT_z^2(f_{b\_cfar}, f_{s\_cfar})$ of second Doppler analyzer 210 to $VFT_z^{Loc}(f_{b\_cfar}, f_{s\_cfar})$ of the Loc-th Doppler analyzer by using a Doppler analysis time of output $VFT_z^1(f_{b\_cfar}, f_{s\_cfar})$ of first Doppler analyzer 210 as a reference.

Further, in equation 12, $\beta(DR)$ represents an "aliasing phase correction vector". For example, aliasing phase correction vector $\beta(DR)$ corrects, among Doppler phase rotations due to a time difference in Doppler analysis among Loc Doppler analyzers 210, Doppler phase rotation of an integer multiple of $2\pi$ in view of a case where there is Doppler aliasing.

For example, aliasing phase correction vector $\beta(DR)$ is indicated by following equation 15.

[17]

$$\beta(DR) = [1, \exp\left(-j2\pi DR \frac{1}{Loc}\right),$$
$$\exp\left(-j2\pi DR \frac{2}{Loc}\right), \ldots, \exp\left(-j2\pi DR \frac{Loc-1}{Loc}\right)]$$

(Equation 15)

For example, in a case where Loc=4, DR takes an integer value of –2, –1, 0, 1, and aliasing phase correction vector $\beta(DR)$ is indicated by equations 16, 17, 18, and 19.

[18]

$$\beta(-2) = [1, -1, 1, -1]$$ (Equation 16)

[19]

$$\beta(-1) = \left[1, \exp\left(j\frac{\pi}{2}\right), \exp(j\pi), \exp\left[j\pi\frac{3}{2}\right]\right]$$ (Equation 17)

[20]

$$\beta(0) = [1, 1, 1, 1]$$ (Equation 18)

[21]

$$\beta(1) = \left[1, \exp\left(-j\frac{\pi}{2}\right), \exp(-j\pi), \exp\left[-j\pi\frac{3}{2}\right]\right]$$ (Equation 19)

For example, in a case where Loc=4, the Doppler range (for example, –⅛Tr to +⅛Tr) in which Doppler components of Doppler frequency indexes $f_{s\_cfar}$, which are the outputs of Doppler analyzers 210, are detected corresponds to DR=0 in (a) and (b) of FIG. 3. Further, Doppler phase rotation of integer multiples of $2\pi$ (for example, $\beta(1)$, $\beta(-1)$, and $\beta(-2)$) for Doppler frequency index $f_{s\_cfar}$ for DR=0 allows calculation of Doppler components in the Doppler range (for example, ⅛Tr to ⅜Tr) corresponding to DR=1, Doppler components in the Doppler range (for example, –⅜Tr to –⅛Tr) corresponding to DR=–1, and Doppler components in the Doppler range (for example, –½Tr to –⅜Tr and ⅜Tr to ½Tr) corresponding to DR=–2.

Further, in equation 12, $VFTALL_z(f_{b\_cfar}, f_{s\_cfar})$, for example, indicates components $VFT_z^{noc}(f_{b\_cfar}, f_{s\_cfar})$ (where noc=1, . . . , Loc) corresponding to distance index $f_{b\_cfar}$ and Doppler frequency index $f_{s\_cfar}$ extracted in CFAR section 211 among outputs $VFT_z^{noc}(f_b, f_s)$ of Loc Doppler analyzers 210 in z-th antenna system processor 201 in vector form as in following equation 20.

[22]

$$\text{VFTALL}_z(f_{b\_cfar}, f_{s\_cfar}) = [\text{VFT}_z^1(f_{b\_cfar}, f_{s\_cfar}), \text{VFT}_z^2(f_{b\_cfar}, f_{s\_cfar}), \ldots, \text{VFT}_z^{Loc}(f_{b\_cfar}, f_{s\_cfar})] \quad \text{(Equation 20)}$$

For example, aliasing determiner 212 calculates each received power $\text{DeMulUnCode}_{nuc}(f_{b\_cfar}, f_{s\_cfar}, DR)$ after code demultiplexing using unused orthogonal code $\text{UnCode}_{nuc}$, in which a phase change in Doppler components including aliasing is corrected, in the ranges $DR = \text{ceil}[-Loc/2], \text{ceil}[-Loc/2]+1, \ldots, 0, \ldots, \text{ceil}[Loc/2]-1$ in accordance with equation 12.

Then, aliasing determiner 212 detects DR of which received power $\text{DeMulUnCode}_{nuc}(f_{b\_cfar}, f_{s\_cfar}, DR)$ is minimum among the ranges of DR. Hereinafter, among the ranges of DR, DR of which received power $\text{DeMulUnCode}_{nuc}(f_{b\_cfar}, f_{s\_cfar}, DR)$ is minimum is represented by "$DR_{min}$" as indicated by following equation 21.

[23]

$$DR_{min} = \left\{ \arg DR \,\middle|\, \min_{DR=\text{ceil}[-Loc/2], \ldots, \text{ceil}[Loc/2]-1} \text{DeMulUnCode}_{nuc}(f_{b\_cfar}, f_{s\_cfar}, DR) \right\} \quad \text{(Equation 21)}$$

Hereinafter, the reason why Doppler aliasing determination is possible through the above-described aliasing determination processing will be described.

A radar transmission signal component transmitted from ncm-th transmission antenna 106 (for example, Tx #ncm) and included in $\text{VFTALL}_z(f_{b\_cfar}, f_{s\_cfar})$ indicated by equation 20 is, for example, indicated by following equation 22 when noise components are ignored.

[24]

$$\beta(DR_{true})^* \otimes \alpha(f_{s\_cfar})^* \otimes \gamma_{z,ncm} \text{Code}_{ncm} \quad \text{(Equation 22)}$$

Here, $\gamma_{z,ncm}$ represents the complex reflection coefficient in a case where a signal that is a radar transmission signal transmitted from ncm-th transmission antenna 106 and reflected by a target is received by z-th antenna system processor 201. Further, $DR_{true}$ represents the index indicating a true Doppler aliasing range. $DR_{true}$ is an index value in the range of $\text{ceil}[-Loc/2], \text{ceil}[-Loc/2]+1, \ldots, 0, \ldots, \text{ceil}[Loc/2]-1$. Hereinafter, it will be indicated that determination can be made such that $DR_{min} = DR_{ture}$.

Sum $\text{PowDeMul}(nuc, DR, DR_{true})$ of received powers after code demultiplexing using unused orthogonal code $\text{UnCode}_{nuc}$ for radar transmission signal components transmitted from first to Ncm-th transmission antennas 106 is indicated by following equation 23.

[25]

$$\begin{aligned}
\text{PowDeMul}(nuc, DR, DR_{true}) &= \sum_{ncm=1}^{N_{CM}} |\text{UnCode}_{nuc}^* \cdot \\
&\quad \{\beta(DR) \otimes \alpha(f_{s\_cfar}) \otimes \beta(DR_{true})^* \otimes \\
&\quad \alpha(f_{x\_cfar})^* \otimes \gamma_{z,ncm} \text{Code}_{ncm}\}^T|^2 \\
&= \sum_{ncm=1}^{N_{CM}} |\gamma_{z,ncm} \text{UnCode}_{nuc}^* \cdot \{\beta(DR) \otimes \\
&\quad \beta(DR_{true})^* \otimes \text{Code}_{ncm}\}^T|^2 \\
&= \sum_{ncm=1}^{N_{CM}} |\gamma_{z,ncm} \{\beta(DR) \otimes \beta(DR_{true})^* \otimes \\
&\quad \text{UnCode}_{nuc}^*\} \cdot \{\text{Code}_{ncm}\}^T|^2
\end{aligned} \quad \text{(Equation 23)}$$

Note that, $\text{PowDeMul}(nuc, DR, DR_{true})$ indicated by equation 23 corresponds to the evaluation value of the term

[26]

$$|\{\text{UnCode}_{nuc}\}^* \cdot \{\beta(DR) \otimes \alpha(f_{s\_cfar}) \otimes \text{VFTALL}_z(f_{b\_cfar}, f_{s\_cfar})\}^2|^2$$

in equation 12.

In equation 23, in a case where $DR=DR_{true}$, the correlation value between unused orthogonal code $UnCode_{nuc}$ and orthogonal code $Code_{ncm}$ for code multiplexing transmission is zero (for example, $UnCode_{nuc}* \bullet \{Code_{ncm}\}^T = 0$) so that PowDeMul(nuc, DR, $DR_{true}$)=0.

On the other hand, in equation 23, in a case where $DR \ne DR_{true}$, PowDeMul(nuc, DR, $DR_{true}$) depending on the correlation value between

[27]

$$\beta(DR) \otimes \beta(DR_{true})* \otimes UnCode_{nuc}*$$

and orthogonal code $Code_{ncm}$ for code multiplexing transmission is outputted. Here, in a case where PowDeMul(nuc, DR, $DR_{true}$) is not zero for every $UnCode_{nuc}$, the power of PowDeMul(nuc, $DR_{true}$, $DR_{true}$) is minimum when, for example, following equation 24 is satisfied and $DR=DR_{true}$, and aliasing determiner 212 can detect $DR_{true}$ (=$DR_{min}$).

[28]

$$\sum_{nuc=1}^{N_{allcode}-N_{CM}} PowDeMul(nuc, DR, DR_{true}) > 0 \qquad \text{(Equation 24)}$$

In other words, aliasing determiner 212 can perform Doppler aliasing determination in accordance with equation 12.

For example, to satisfy equation 24, the term

[29]

$$\beta(DR)* \otimes \beta(DR_{true}) \otimes UnCode_{nuc}$$

may not coincide with another unused orthogonal code $UnCode_{nuc2}$. Here, $nuc2 \ne nuc$.

Accordingly, in a case where the number of unused orthogonal codes is one, equation 24 is satisfied. Further, in a case where the number of unused orthogonal codes is multiple, for example, code generator 104 may select codes for code multiplexing transmission such that the term

[30]

$$\beta(DR) \otimes \beta(DR_{true}) \otimes UnCode_{nuc}$$

does not coincide with another unused orthogonal code.

Here, in a case where a code, such as a Walsh-Hadamard code and an orthogonal M-sequence code, is used, orthogonal codes with code length Loc may include a set of codes in which the odd-numbered code elements are identical between the codes and the even-numbered code elements are code-inverted between the codes.

On the other hand, $\beta(0)=[1, 1, \ldots, 1]$, and $\beta(-Loc/2)=[1, -1, 1, -1, \ldots, 1, -1]$ so that the term

[31]

$$\beta(0)* \otimes \beta(-Loc/2) \otimes UnCode_{nuc}$$

is converted into a code in which the odd-numbered code elements of $UnCode_{nuc}$ are identical and the even-numbered code elements of $UnCode_{nuc}$ are code-inverted.

Accordingly, in a case where the number ($N_{allcode} - N_{CM}$) of unused orthogonal codes is larger than or equal to two, for example, code generator 104 may select, among orthogonal codes with code length Loc, codes for code multiplexing transmission or unused orthogonal codes such that a set of codes, in which either the odd-numbered code elements are identical between the codes and even-numbered code elements are code-inverted between the codes, or the even-numbered code elements are identical between the codes and the odd-numbered code elements are code-inverted between the codes, is not included in the unused orthogonal codes.

For example, Walsh-Hadamard codes with code length Loc=4 include $WH_4(1)=[1, 1, 1, 1]$ and $WH_4(2)=[1, -1, 1, -1]$, and

[32]

$$\beta(0)* \otimes \beta(-Loc/2) \otimes WH_4(1) = WH_4(2)$$

or

[33]

$$\beta(0)* \otimes \beta(-Loc/2) \otimes WH_4(2) = WH_4(1).$$

For this reason, for example, code generator 104 may select codes for code multiplexing transmission or unused orthogonal codes such that a set of $WH_4(1)$ and $WH_4(2)$ is not included in a plurality of unused orthogonal codes. Since $WH_4(3)=[1, 1, -1, -1]$ and $WH_4(4)=[1, -1, -1, 1]$ are also in the same relation, code generator 104 may, for example, select codes for code multiplexing transmission or unused orthogonal codes such that a set of $WH_4(3)$ and $WH_4(4)$ is not included in the unused orthogonal codes.

Note that, in a case where the number of unused orthogonal codes $UnCode_{nuc}$ is multiple, received power $DeMulUnCodeAll(f_{b\_cfar}, f_{s\_cfar}, DR)$ after code demultiplexing using every unused orthogonal code may be used as indicated by following equation 25 instead of received power $DeMulUnCode_{nuc}(f_{b\_cfar}, f_{s\_cfar}, DR)$.

[34]

$$DeMulUnCodeAll(f_{b\_cfar}, f_{s\_cfar}, DR) = \sum_{nun=1}^{N_{allcode}-N_{CM}} DeMulUnCode_{nun}(f_{b\_cfar}, f_{s\_cfar}, DR) \qquad \text{(Equation 25)}$$

By obtaining received power after code demultiplexing using every unused orthogonal code, aliasing determiner 212 can improve aliasing determination accuracy even in a case where the reception signal level is low.

For example, aliasing determiner 212 calculates $DeMulUnCodeAll(f_{b\_cfar}, f_{s\_cfar}, DR)$ in each range of DR=ceil[−Loc/2], ceil[−Loc/2]+1, . . . , 0, . . . , ceil[Loc/2]−1 and detects DR of which received power $DeMulUnCodeAll(f_{b\_cfar}, f_{s\_cfar}, DR)$ is minimum (in other words, $DR_{min}$). In a case where equation 25 is used, DR that provides the minimum received power in a DR range is represented by "$DR_{min}$" as indicated by following equation 26 hereinafter.

[35]

$$DR_{min} = \left\{ \arg DR \Big|_{DR=ceil[-Loc/2], \ldots, ceil[Loc/2]-1} \min \; DeMulUnCodeAll(f_{b\_cfar}, f_{s\_cfar}, DR) \right\} \qquad \text{(Equation 26)}$$

Further, aliasing determiner 212 may, for example, perform processing of determining (in other words, measuring) the probability of aliasing determination by comparing minimum received power $DeMulUnCode_{nuc}(f_{b\_cfar}, f_{s\_cfar}, DR_{min})$ after code demultiplexing using unused orthogonal code $UnCode_{nuc}$ with received power. In this case, aliasing determiner 212 may, for example, determine the probability of aliasing determination in accordance with following equations 27 and 28.

[36]

$$DeMulUnCode_{nuc}(f_{b\_cfar}, f_{s\_cfar}, DR_{min}) < Threshold_{DR} \times PowerFT(f_{b\_cfar}, f_{s\_cfar}) \quad \text{(Equation 27)}$$

[37]

$$DeMulUnCode_{nuc}(f_{b\_cfar}, f_{s\_cfar}, DR_{min}) \geq Threshold_{DR} \times PowerFT(f_{b\_cfar}, f_{s\_cfar}) \quad \text{(Equation 28)}$$

For example, in a case where minimum received power $DeMulUnCode_{nuc}(f_{b\_cfar}, f_{s\_cfar}, DR_{min})$ after code demultiplexing using unused orthogonal code $UnCode_{nuc}$ is lower than a value obtained by multiplying received power value $PowerFT(f_{b\_cfar}, f_{s\_cfar})$ of distance index $f_{b\_cfar}$ and Doppler frequency index $f_{s\_cfar}$ extracted in CFAR section 211 by predetermined value $Threshold_{DR}$ (for example, equation 27), aliasing determiner 212 determines that aliasing determination is sufficiently probable. In this case, radar apparatus 10, for example, performs subsequent processing (for example, code demultiplexing processing).

On the other hand, for example, in a case where minimum received power $DeMulUnCode_{nuc}(f_{b\_cfar}, f_{s\_cfar}, DR_{min})$ after code demultiplexing using unused orthogonal code $UnCode_{nuc}$ is larger than or equal to the value obtained by multiplying received power value $PowerFT(f_{b\_cfar}, f_{s\_cfar})$ by $Threshold_{DR}$ (for example, equation 28), aliasing determiner 212 determines that aliasing determination accuracy is not sufficient (for example, noise component). In this case, radar apparatus 10, for example, may omit to perform subsequent processing (for example, code demultiplexing processing).

Such processing makes it possible to reduce a determination error in aliasing determination in aliasing determiner 212 and to remove a noise component. Note that, predetermined value $Threshold_{DR}$ may be configured in the range of from zero to less than one, for example. As an example, in consideration of the fact that noise components are included, $Threshold_{DR}$ may be configured in the range of approximately from 0.1 to 0.5.

Note that, in a case where the number of unused orthogonal codes $UnCode_{nuc}$ is multiple, aliasing determiner 212 may perform processing of determining (in other words, measuring) the probability of aliasing determination by comparing $DeMulUnCodeAll(f_{b\_cfar}, f_{s\_cfar}, DR)$, which is used instead of received power $DeMulUnCode_{nuc}(f_{b\_cfar}, f_{s\_cfar}, DR)$, with received power. In this case, aliasing determiner 212 may, for example, determine the probability of aliasing determination by using $DeMulUnCodeAll(f_{b\_cfar}, f_{s\_cfar}, DR)$ instead of $DeMulUnCode_{nuc}(f_{b\_cfar}, f_{s\_cfar}, DR)$ in equations 27 and 28. By obtaining received power after code demultiplexing using every unused orthogonal code, aliasing determiner 212 can improve the accuracy of the probability of aliasing determination even in a case where the reception signal level is low.

Note that, a calculation equation for received power $DeMulUnCode_{nuc}(f_{b\_cfar}, f_{s\_cfar}, DR)$ after code demultiplexing using unused orthogonal code $UnCode_{nuc}$ may be, for example, following equation 29 instead of equation 12.

[38]

$$DeMulUnCode_{nuc}(f_{b\_cfar}, f_{s\_cfar}, DR) = \sum_{z=1}^{Na} |(\beta(DR) \otimes UnCode_{nuc})^* \cdot \{\alpha(f_{s\_cfar}) \otimes VFTALL_z(f_{b\_cfar}, f_{s\_cfar})\}^T|^2 \quad \text{(Equation 29)}$$

In equation 29, the term

[39]

$$\beta(DR) \otimes UnCode_{nuc}$$

does not depend on the index of Doppler component (Doppler frequency index) $f_s$ so that it is possible to reduce the arithmetic amount in aliasing determiner 212, for example, by pre-tabulation.

An operation example of aliasing determiner 212 has been described above.

Next, an operation example of code demultiplexer 213 will be described.

Code demultiplexer 213 performs demultiplexing processing of a code-multiplexed signal based on a result of aliasing determination in aliasing determiner 212 and codes for code multiplexing transmission.

For example, code demultiplexer 213 performs code demultiplexing processing on Doppler components $VFTALL_z(f_{b\_cfar}, f_{s\_cfar})$ that are the outputs of Doppler analyzers 210 corresponding to distance index $f_{b\_cfar}$ and Doppler frequency index $f_{s\_cfar}$ extracted in CFAR section 211 based on aliasing phase correction vector $\beta(DR_{min})$ using $DR_{min}$ that is a result of aliasing determination in aliasing determiner 212 as in following equation 30.

[40]

$$DeMul_z^{ncm}(f_{b\_cfar}, f_{s\_cfar}) = (Code(m)^* \cdot \{\beta(DR_{min}) \otimes \alpha(f_{s\_cfar}) \otimes VFTALL_z(f_{b\_cfar}, f_{s\_cfar})\}^T \quad \text{(Equation 30)}$$

Since aliasing determiner 212 can determine an index that is a true Doppler aliasing range in the Doppler range of from larger than or equal to $-1/(2Tr)$ to less than $1/(2Tr)$ (in other words, can determine the index such that $DR_{min} = DR_{true}$), code demultiplexer 213 can set the correlation value between orthogonal codes used for code multiplexing to be zero in the Doppler range of from larger than or equal to $-1/(2Tr)$ to less than $1/(2Tr)$, thereby enabling demultiplexing processing in which interference between code-multiplexed signals is suppressed.

Here, $DeMul_z^{ncm}(f_{b\_cfar}, f_{s\_cfar})$ is an output (for example, a code demultiplexing result) in which a code-multiplexed signal is code demultiplexed by using orthogonal code $Code_{ncm}$ for the outputs of distance index $f_{b\_cfar}$ and Doppler frequency index $f_{s\_cfar}$ of Doppler analyzer 210 in z-th antenna system processor 201. Note that, $z=1, \ldots, Na$, and $ncm=1, \ldots, N_{CM}$.

Note that, code demultiplexer 213 may use following equation 31 instead of equation 30.

[41]

$$DeMul_z^{ncm}(f_{b\_cfar}, f_{s\_cfar}) = (\beta(DR_{min}) \otimes Code_{ncm})^* \cdot \{\alpha(f_{s\_cfar}) \otimes VFTALL_z(f_{b\_cfar}, f_{s\_cfar})\}^T \quad \text{(Equation 31)}$$

In equation 31, the term

[42]

$$\beta(DR) \otimes Code_{ncm}$$

(where $DR=DR_{min}$ in equation 31) does not depend on index (for example, Doppler frequency index) $f_s$ of a Doppler component so that it is possible to reduce the arithmetic amount in code demultiplexer 213, for example, by pretabulation.

Through the code demultiplexing processing as described above, radar apparatus 10 can obtain a signal separated from a signal code-multiplexed and transmitted by orthogonal code $Code_{ncm}$ applied to ncm-th transmission antenna Tx #ncm based on a result of aliasing determination on the assumption up to the Doppler range $±1/(2×Tr)$ that is Loc times the Doppler range $±1/(2Loc×Tr)$, in which no aliasing in Doppler analyzer 210 occurs, in aliasing determiner 212.

Further, radar apparatus 10, for example, performs Doppler phase correction including Doppler aliasing (for example, processing based on aliasing phase correction vector $β(DR_{min})$) on the output of Doppler analyzer 210 for each code element during code demultiplexing processing. For this reason, mutual interference between code-multiplexed signals can be, for example, reduced to approximately a noise level. In other words, radar apparatus 10 can reduce inter-code interference and suppress the effect on deterioration of detection performance of radar apparatus 10.

Figure 4:
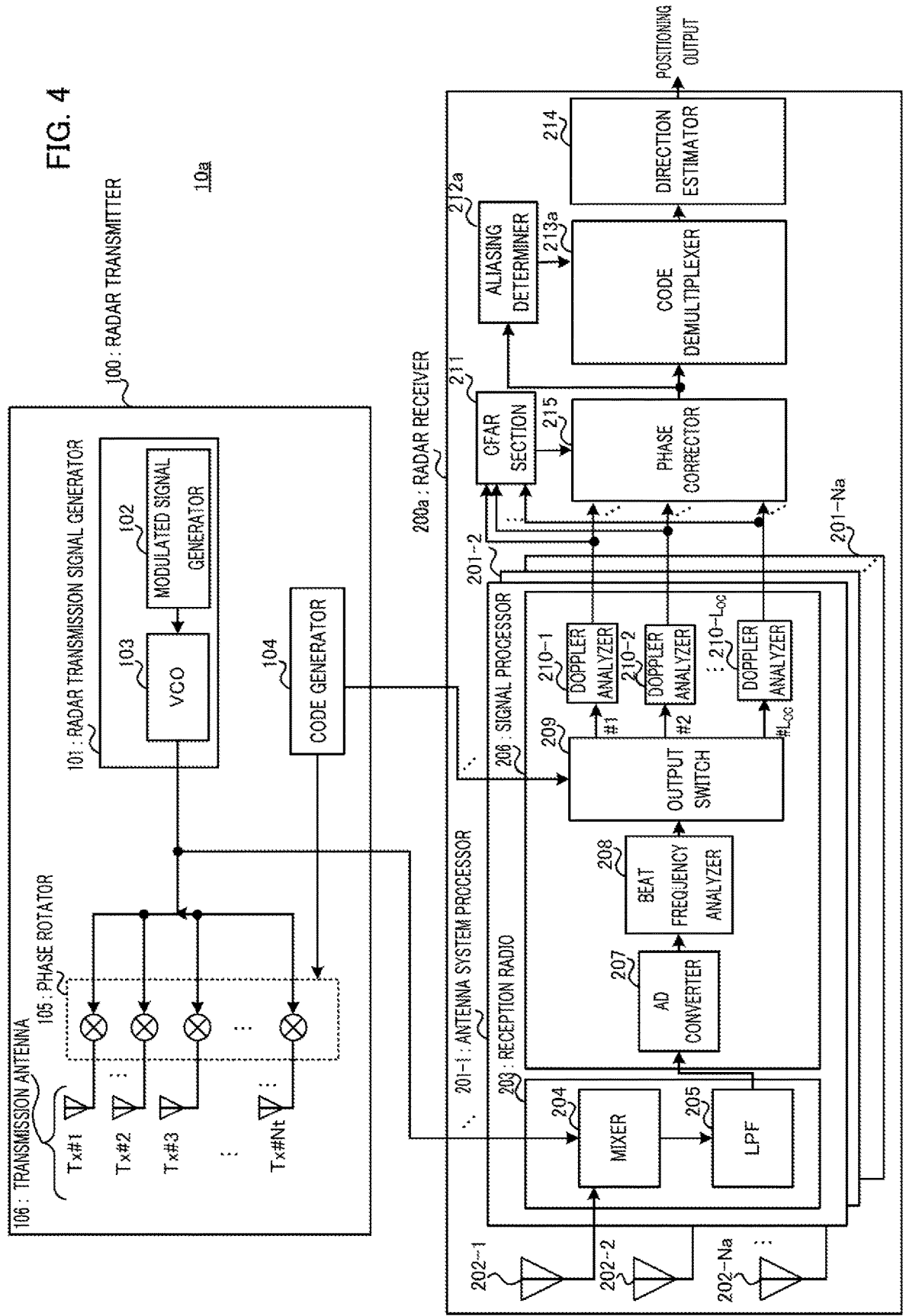
FIG. 4 is a block diagram illustrating a configuration example of the radar apparatus according to Embodiment 1.

FIG. 4 illustrates another configuration example of radar apparatus 10. In the configuration of radar apparatus 10 illustrated in FIG. 1, the term

[43]

$$α(f_{s\_cfar}) \otimes VFTALL_z(f_{b\_cfar}, f_{s\_cfar})$$

is commonly used in aliasing determiner 212 and code demultiplexer 213 as indicated in equations 12, 29, 30, and 31. In this regard, radar apparatus 10a illustrated in FIG. 4, for example, includes phase corrector 215 and may output, to aliasing determiner 212a and code demultiplexer 213a, output

[44]

$$α(f_{s\_cfar}) \otimes VFTALL_z(f_{b\_cfar}, f_{s\_cfar})$$

obtained by multiplying Doppler component $VFTALL_z(f_{b\_cfar}, f_{s\_cfar})$ by Doppler phase correction vector $α(f_{s\_cfar})$. Aliasing determiner 212a and code demultiplexer 213a need not calculate the term

[45]

$$α(f_{s\_cfar}) \otimes VFTALL_z(f_{b\_cfar}, f_{s\_cfar})$$

and it is possible to reduce redundant arithmetic processing of the term in radar apparatus 10a.

An operation example of code demultiplexer 213 has been described above.

In FIG. 1, direction estimator 214 performs target direction estimation processing based on code demultiplexing result $DeMul_z^{ncm}(f_{b\_cfar}, f_{s\_cfar})$ for the outputs of Doppler analyzer 210 corresponding to distance index $f_{b\_cfar}$ and Doppler frequency index $f_{s\_cfar}$ inputted from code demultiplexer 213.

For example, direction estimator 214 generates virtual reception array correlation vector $h(f_{b\_cfar}, f_{s\_cfar})$ indicated by equation 32 and performs direction estimation processing.

Virtual reception array correlation vector $h(f_{b\_cfar}, f_{s\_cfar})$ includes $N_T×Na$ elements which are the product of number $N_T$ of transmission antennas and number Na of reception antennas. Virtual reception array correlation vector $h(f_{b\_cfar}, f_{s\_cfar})$ is used for processing of performing direction estimation based on the phase difference between reception antennas 202 on a reflected wave signal from a target. Here, $z=1, \ldots, Na$.

[46]

$$h(f_{b\_cfar}, f_{s\_comp\_cfar}) = \begin{bmatrix} DeMUL_1^1(f_{b\_cfar}, f_{s\_cfar}) \\ DeMUL_2^1(f_{b\_cfar}, f_{s\_cfar}) \\ \vdots \\ DeMUL_{Na}^1(f_{b\_cfar}, f_{s\_cfar}) \\ DeMUL_1^2(f_{b\_cfar}, f_{s\_cfar}) \\ DeMUL_2^2(f_{b\_cfar}, f_{s\_cfar}) \\ \vdots \\ DeMUL_{Na}^2(f_{b\_cfar}, f_{s\_cfar}) \\ \vdots \\ DeMUL_1^{NCM}(f_{b\_cfar}, f_{s\_cfar}) \\ DeMUL_2^{NCM}(f_{b\_cfar}, f_{s\_cfar}) \\ \vdots \\ DeMUL_{Na}^{NCM}(f_{b\_cfar}, f_{s\_cfar}) \end{bmatrix}$$ (Equation 32)

For example, direction estimator 214 calculates a spatial profile, with azimuth direction $θ$ in direction estimation evaluation function value $P_H(θ, f_{b\_cfar}, f_{s\_cfar})$ being variable within a defined angular range. Direction estimator 214 extracts a predetermined number of local maximum peaks in the calculated spatial profile in descending order and outputs the azimuth direction of each local maximum peak as a direction-of-arrival estimation value (for example, positioning output).

Note that, there are various methods for direction estimation evaluation function value $P_H(θ, f_{b\_cfar}, f_{s\_cfar})$ depending on direction-of-arrival estimation algorithms. For example, an estimation method using an array antenna disclosed in NPL 3 may be used.

For example, in a case where $N_T×Na$ virtual reception arrays are linearly disposed at equal intervals $d_H$, a beamformer method can be indicated as in following equations 33 and 34.

[47]

$$P_H(θ_u, f_{b\_cfar}, f_{s\_cfar}) = |a^H(θ_u)D_{cal}h(f_{b\_cfar}, f_{s\_cfar})|^2;$$ (Equation 33)

[48]

$$a(θ_u) = \begin{bmatrix} 1 \\ \exp\{-j2πd_H \sin θ_u/λ\} \\ \vdots \\ \exp\{-j2π(N_tN_a-1)d_H \sin θ_u/λ\} \end{bmatrix}.$$ (Equation 34)

In addition, techniques such as Capon and MUSIC are also applicable in the same manner.

Here, character superscript H is a Hermitian transpose operator. Further, $a(θ_u)$ represents the direction vector of a virtual reception array with respect to an arrival wave in azimuth direction $θ_u$.

Further, azimuth direction $θ_u$ is a vector obtained by changing $θ_{min}$ to $θ_{max}$ within the azimuth range, in which the direction-of-arrival estimation is performed, at azimuth interval $D_{Step}$. For example, $θ_u$ may be configured as follows.

$$θ_u = θ_{min} + uD_{Step}, u=0, \ldots, NU$$

$$NU = floor[(θ_{max} - θ_{min})/D_{Step}],$$

where floor(x) is a function that returns the maximum integer value that does not exceed real number x.

Further, in equation 33, $D_{cal}$ is a ($N_T \times Na$)-th order matrix including an array correction coefficient for correcting phase deviations and amplitude deviations between transmission array antennas and between reception array antennas and a coefficient for reducing the influence of inter-element coupling between antennas. In a case where the coupling between antennas in the virtual reception array can be ignored, $D_{cal}$ becomes a diagonal matrix and includes, as diagonal components, the array correction coefficient for correcting phase deviations and amplitude deviations between transmission array antennas and between reception array antennas.

For example, direction estimator 214 may output a direction estimation result and may further output, as a positioning result, distance information, which is based on distance index $f_{b\_cfar}$, and Doppler velocity information of a target, which is based on Doppler frequency index $f_{b\_cfar}$ of the target and determination result $DR_{min}$ in aliasing determiner 212.

For example, direction estimator 214 may calculate, based on Doppler frequency index $f_{s\_cfar}$ and $DR_{min}$ that is a determination result in aliasing determiner 212, Doppler frequency index $f_{es\_cfar}$ in accordance with equation 35.

[49]

$$f_{es\_cfar} = f_{s\_cfar} + DR_{min} \times \text{Ncode} \quad \text{(Equation 35)}.$$

Doppler frequency index $f_{es\_cfar}$ corresponds, for example, to the Doppler index in a case where the FFT size of Doppler analyzer 210 is extended to Loc×Ncode. Hereinafter, $f_{es\_cfar}$ is referred to as "extended Doppler frequency index".

Note that, the Doppler range is assumed to be up to $\pm 1/(2 \times Tr)$, and the range of extended Doppler frequency index $f_{es\_cfar}$ corresponding to the above Doppler range is $-\text{Loc} \times \text{Ncode}/2 \le f_{es\_cfar} < \text{Loc} \times \text{Ncode}/2$. Accordingly, as a result of calculation of equation 35, $f_{es\_cfar} + \text{Loc} \times \text{Ncode}$ is $f_{es\_cfar}$ in a case where $f_{es\_cfar} < -\text{Loc} \times \text{Ncode}/2$, and further $f_{es\_cfar} - \text{Loc} \times \text{Ncode}$ is $f_{es\_cfar}$ in a case where $f_{es\_cfar} \ge \text{Loc} \times \text{Ncode}/2$.

Further, the Doppler frequency information may be converted into a relative velocity component and outputted. Doppler frequency index $f_{es\_cfar}$ may be converted into relative velocity component $v_d(f_{es\_cfar})$ by using following equation 36.

[50]

$$v_d(f_{es\_cfar}) = \frac{\lambda}{2} f_{es\_cfar} \Delta_f \quad \text{(Equation 36)}$$

where $\lambda$ is the wavelength of a carrier frequency of an RF signal outputted from a transmission radio (not illustrated), and further $\Delta_f$ is the Doppler frequency interval in FFT processing in Doppler analyzer 210. For example, in the present embodiment, $\Delta_f = 1/\{\text{Loc} \times \text{Ncode} \times Tr\}$.

Figure 5:
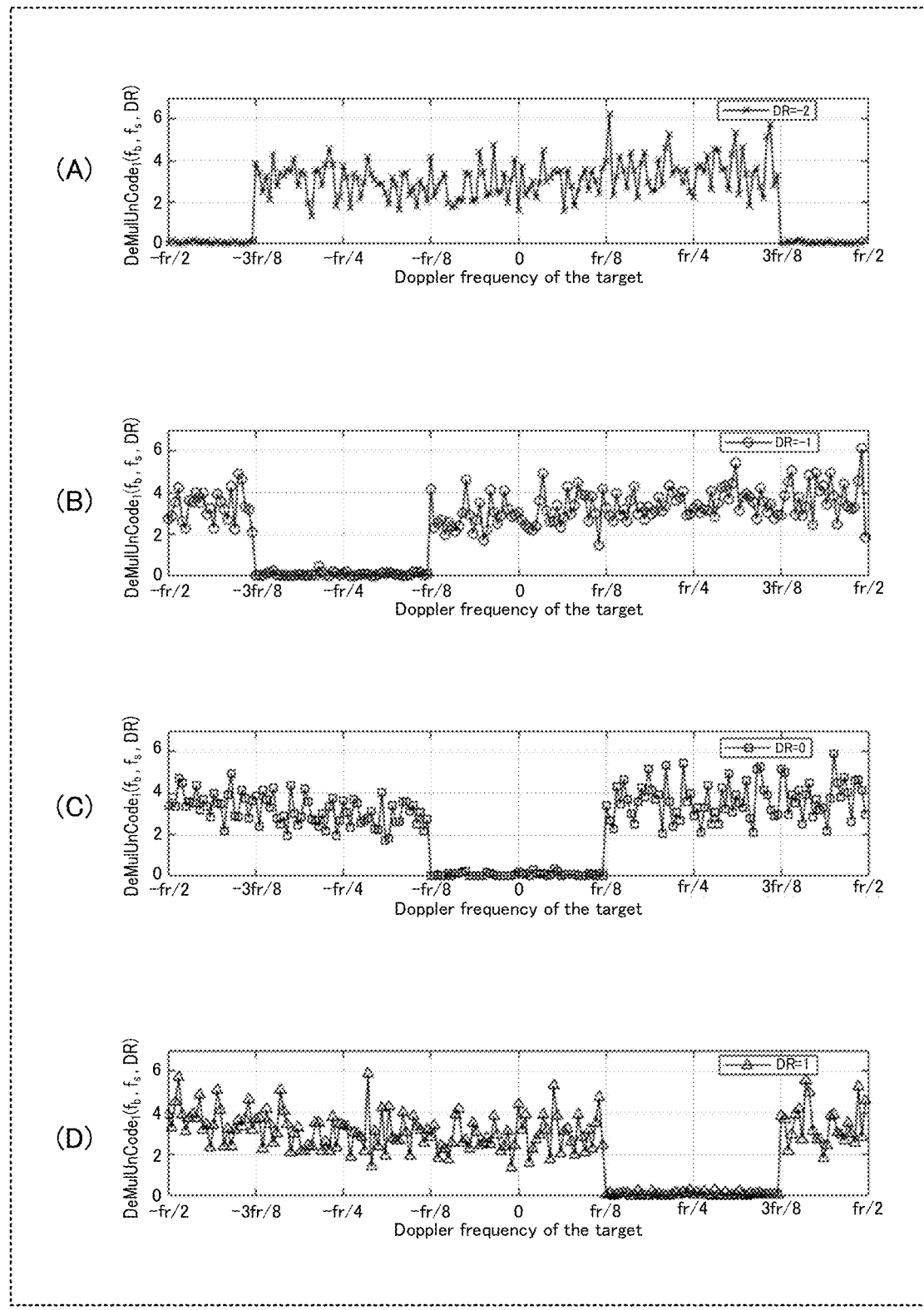
FIG. 5 illustrates an example of computer simulation results of aliasing determination processing.
Figure 6:
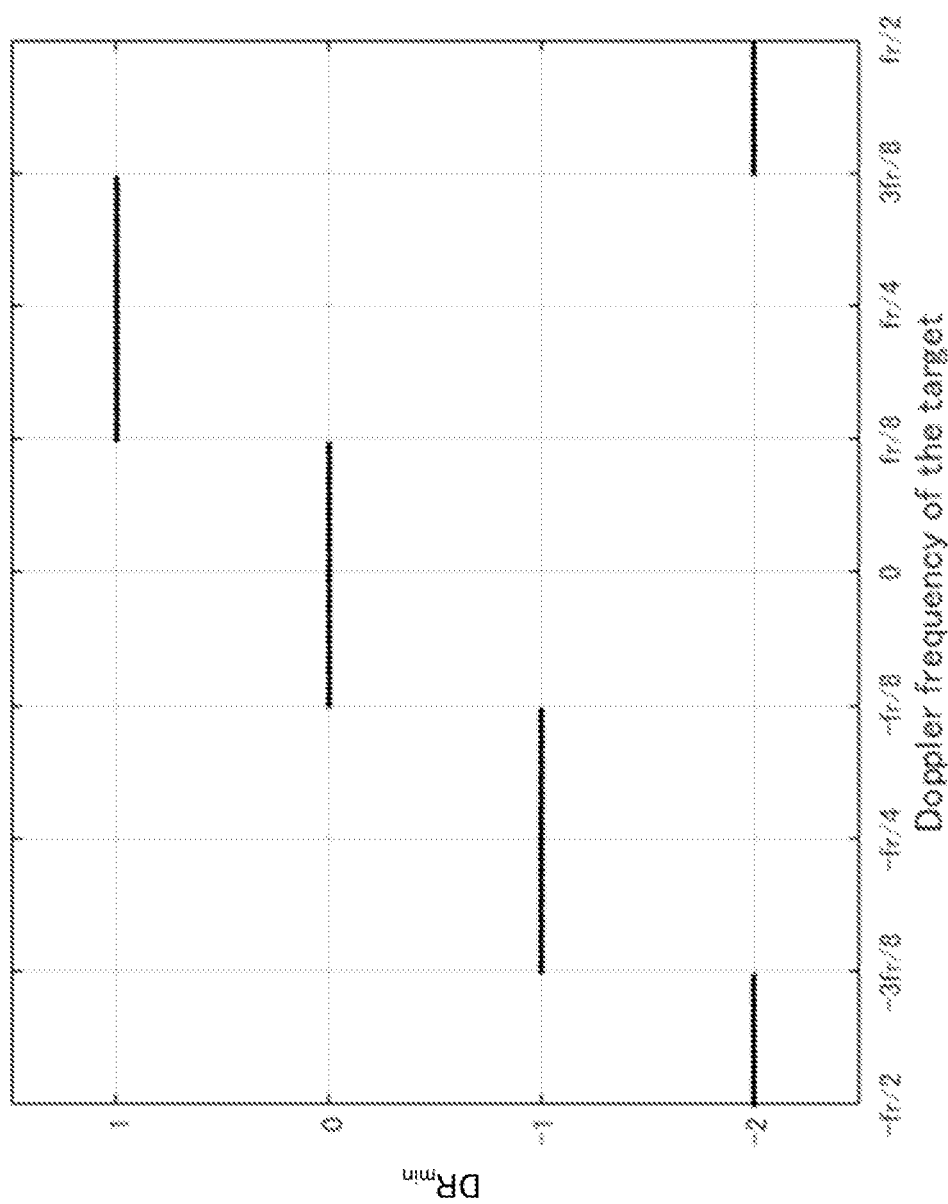
FIG. 6 illustrates an example of computer simulation results of aliasing determination processing.

(A), (B), (C), and (D) of FIG. 5, and FIG. 6 illustrate examples of computer simulation results of aliasing determination processing of aliasing determiner 212.

In (A), (B), (C), and (D) of FIG. 5, as examples, the code multiplexing number is $N_{CM}=3$, code length Loc=4, and codes for code multiplexing transmission, determined by code generator 104, are $\text{Code}_1 = WH_4(3) = [1, 1, -1, -1]$, $\text{Code}_2 = WH_4(4) = [1, -1, -1, 1]$, and $\text{Code}_3 = WH_4(2) = [1, -1, 1, -1]$, and an unused orthogonal code is $\text{UnCode}_1 = WH_4(1) = [1, 1, 1, 1]$.

(A), (B), (C), and (D) of FIG. 5 indicate, for example, a result of calculation, in aliasing determiner 212, of received power $\text{DeMulUnCode}_1 (f_b, f_{s\_cfar}, DR)$ after code demultiplexing using unused orthogonal code $\text{UnCode}_1$ for a target with distance index fb and Doppler frequency index $f_{s\_cfar}$ extracted in CFAR section 211.

Note that, (A) of FIG. 5 illustrates an example in which a calculation result of $\text{DeMulUnCode}_1 (f_b, f_{s\_cfar}, DR)$ in a case where DR=−2 is plotted, (B) of FIG. 5 illustrates an example in which a calculation result of $\text{DeMulUnCode}_1 (f_b, f_{s\_cfar}, DR)$ in a case where DR=−1 is plotted, (C) of FIG. 5 illustrates an example in which a calculation result of $\text{DeMulUnCode}_1 (f_b, f_{s\_cfar}, DR)$ in a case where DR=0 is plotted, and (D) of FIG. 5 illustrates an example in which a calculation result of $\text{DeMulUnCode}_1 (f_b, f_{s\_cfar}, DR)$ in a case where DR=1 is plotted.

Further, each $\text{DeMulUnCode}_1 (f_b, f_{s\_cfar}, DR)$ in (A), (B), (C), and (D) of FIG. 5 is calculated by varying target Doppler frequency ftarget in the range from larger than or equal to −fr/2 to less than fr/2.

In (A), (B), (C), and (D) of FIG. 5, target Doppler frequency ftarget is indicated as the horizontal axis, and $\text{DeMulUnCode}_1 (f_b, f_{s\_cfar}, DR)$ in the case of Doppler frequency ftarget of the target indicated on the horizontal axis is plotted on the vertical axis. Note that, for example, fr=1/Tr.

FIG. 6 illustrates, for example, an example in which, based on the detection results indicated in (A), (B), (C), and (D) of FIG. 5, DR in which received power $\text{DeMulUnCode}_1 (f_b, f_{s\_cfar}, DR)$ when target Doppler frequency ftarget indicated on the horizontal axis is varied in the range from larger than or equal to −fr/2 to less than fr/2 is minimum, that is, $DR_{min}$, is plotted as the vertical axis.

According to (A), (B), (C), and (D) of FIG. 5, and FIG. 6, $DR_{min}=0$ in a case where the Doppler frequency range of the target is −fr/8≤ftarget<fr/8, $DR_{min}=1$ in a case where the Doppler frequency range of the target is fr/8≤ftarget<3fr/8, $DR_{min}=-1$ in a case where the Doppler frequency range of the target is −3fr/8≤ftarget<−fr/8, and $DR_{min}=-2$ in a case where the Doppler frequency range of the target is −fr/2≤ftarget<−3fr/8 and 3r/8≤ftarget<fr/2, which matches, for example, the description with reference to (a) in FIG. 3 or (b) in FIG. 3 described above, and it can be understood based on the result of $DR_{min}$ illustrated in FIG. 6 that Doppler ranges in accordance with target Doppler frequency range ftarget can be correctly detected.

Figure 7:
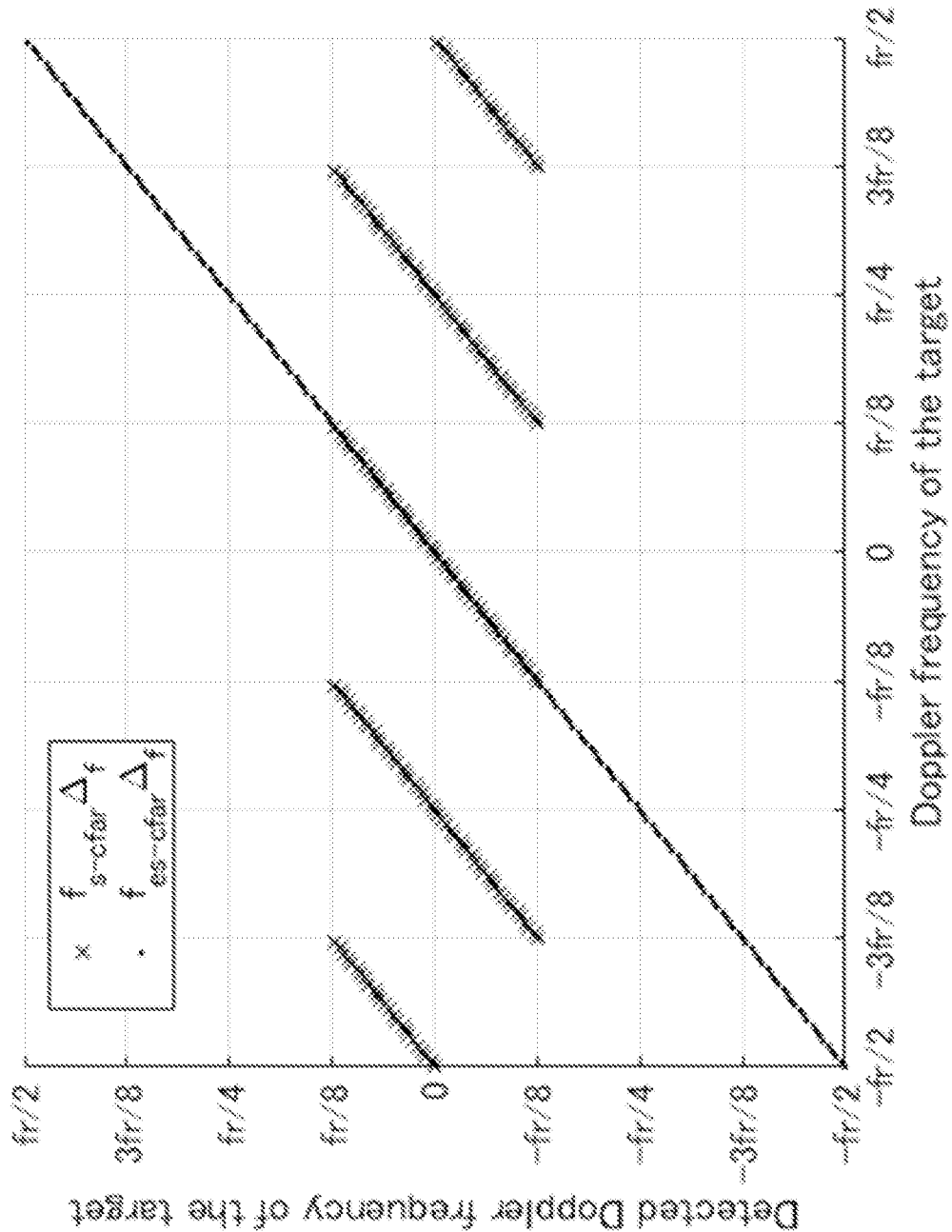
FIG. 7 illustrates an example of calculation results of an extended Doppler frequency index.

Further, FIG. 7 illustrates an example in which, based on the result of FIG. 6, calculation results of extended Doppler frequency index $f_{es\_cfar}$ by direction estimator 214 in accordance with equation 35 and based on Doppler frequency index $f_{s\_char}$ and $DR_{min}$ as a determination result by aliasing determiner 212 are plotted.

FIG. 7 illustrates an example in which each extended Doppler frequency index $f_{es\_cfar}$ calculated when target Doppler frequency ftarget indicated on the horizontal axis is varied in the range from larger than or equal to −fr/2 to less than fr/2 is converted into Doppler frequency $f_{target\_est}$ and is plotted on the vertical axis.

Note that, when each extended Doppler frequency index $f_{es\_cfar}$ is converted into Doppler frequency $f_{target\_est}$, the conversion can be performed by using Doppler frequency interval $\Delta_r$ in FFT processing in Doppler analyzer 210. That is, $f_{target\_est} = f_{es\_cfar} \times \Delta_f$ may be used.

It can be confirmed from the results of FIG. 7 that target Doppler frequency ftarget can be correctly detected in the range from larger than or equal to −fr/2 to less than fr/2, that is, in the range from larger than or equal to −1/(2Tr) to less than 1/(2Tr), by detecting Doppler frequency $f_{target\_est}$ by using extended Doppler frequency index $f_{es\_cfar}$.

As described above, in radar apparatus 10 in the present embodiment, reception antenna 202 receives a reflected wave signal that is a radar transmission signal code-multiplexed and transmitted based on one or some of code sequences among a plurality of orthogonal code sequences and reflected by a target, and aliasing determiner 212 performs aliasing determination in a Doppler frequency domain of the reflected wave signal based on, among the plurality of orthogonal code sequences, another orthogonal code sequence or other orthogonal code sequences different from the one or some of the orthogonal code sequences, which is/are used for code multiplexing transmission. For example, in a MIMO radar using code multiplexing transmission, radar apparatus 10 performs code multiplexing transmission by using an orthogonal code sequence with a code length capable of generating orthogonal codes larger than the number of code multiplexing transmissions.

With this configuration, radar apparatus 10 can perform, for example, Doppler aliasing determination for a reception signal (for example, the output of Doppler analyzer 210 for each code element of a code-multiplexed signal) by using an orthogonal code unused for code multiplexing transmission. For example, radar apparatus 10 can perform the aliasing determination in a Doppler range that is larger by a factor of a code length of an orthogonal code sequence than a Doppler analysis range in Doppler analyzer 210. Thus, according to the present embodiment, radar apparatus 10 can expand a Doppler range detectable without ambiguity to a Doppler range equivalent to that at the time of transmission with one antenna.

Further, for example, radar apparatus 10 can suppress mutual interference between code-multiplexed signals to approximately a noise level by performing Doppler phase correction including aliasing during code demultiplexing based on a determination result of Doppler aliasing so that deterioration of radar detection performance can be suppressed and code multiplexing transmission by a MIMO radar can be performed.

Thus, according to the present embodiment, even in a case where a Doppler variation associated with movement of a target or radar apparatus 10 is included, for example, radar apparatus 10 is capable of improving target detection accuracy in a wider Doppler frequency range by suppressing the occurrence of mutual interference between code-multiplexed signals and causing a Doppler range detectable without ambiguity to be a Doppler range equivalent to that at the time of transmission with one antenna.

Embodiment 2

In Embodiment 1, a case in which when radar apparatus 10 repeatedly transmits chirp pulses Nc times as radar transmission signals, the center frequencies of the chirp signals are made constant (for example, see FIG. 2) has been described. However, the center frequencies of the chirp signals are not necessarily constant.

In the present embodiment, a case where the center frequencies of chirp signals are variably configured will be described.

[Configuration of Radar Apparatus]

Figure 8:
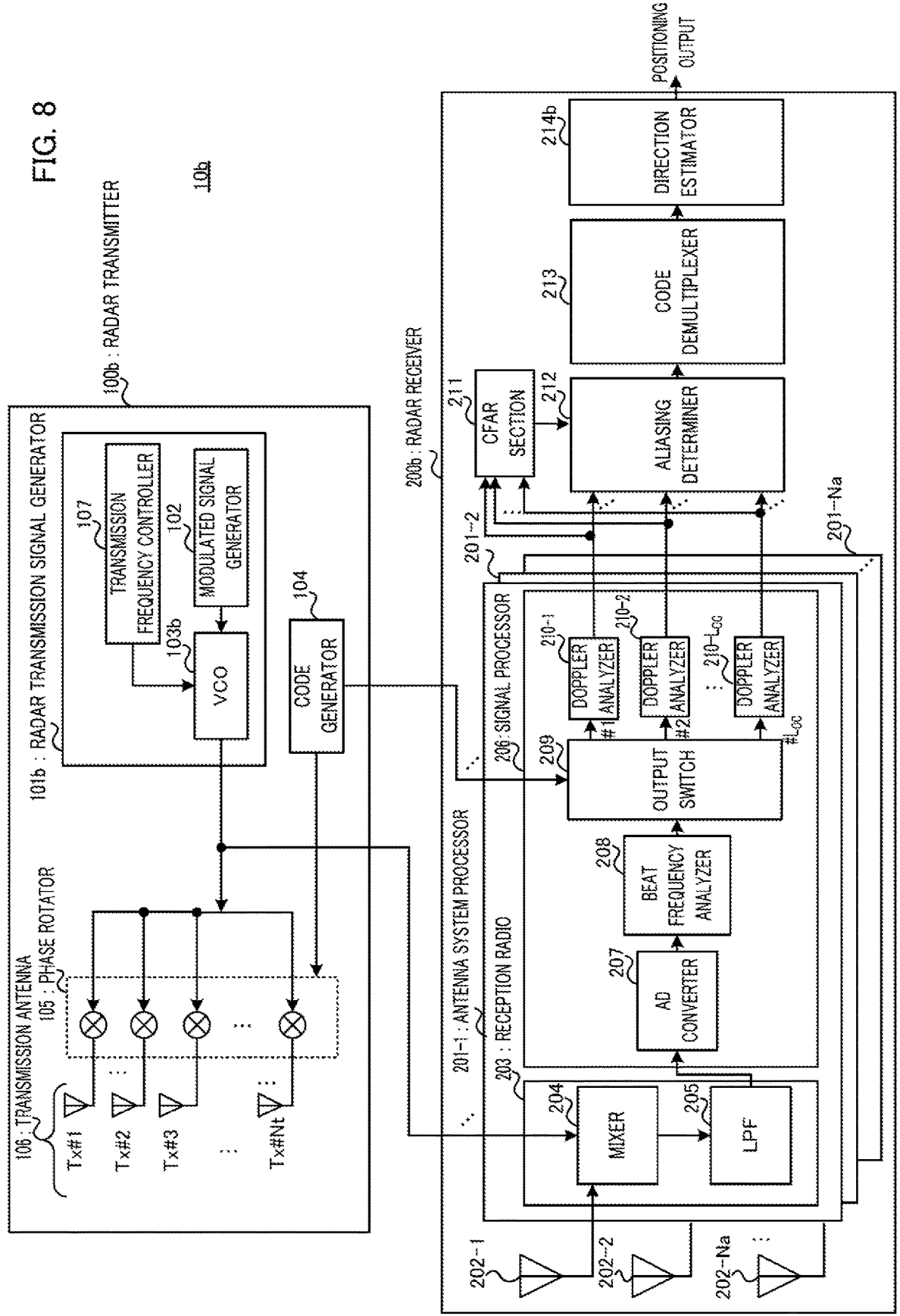
FIG. 8 is a block diagram illustrating a configuration example of a radar apparatus according to Embodiment 2.

FIG. 8 is a block diagram illustrating a configuration example of radar apparatus 10b according to the present embodiment. Note that, in FIG. 8, the same configurations as those Embodiment 1 (FIG. 1) are denoted with the same reference signs, and descriptions thereof will be omitted.

Hereinafter, for example, radar apparatus 10b transmits radar transmission signals such that center frequencies fc of chirp signals are changed by Δf (for example, increased in a case where Δf>0 and decreased in a case where Δf<0) for each transmission period Tr.

Radar transmission signal generator 101b in radar transmitter 100b includes modulated signal generator 102, VCO 103b, and transmission frequency controller 107.

For example, modulated signal generator 102 periodically generates sawtooth-shaped modulated signals for VCO control. Here, the transmission period is Tr.

Transmission frequency controller 107 controls center frequency fc of a frequency-modulated signal (chirp signal) outputted from VCO 103b at transmission period Tr. For example, transmission frequency controller 107 may change center frequency fc of a frequency-modulated signal by Δf for each transmission period Tr.

VCO 103b outputs frequency-modulated signals to phase rotator 105 and radar receiver 200 (for example, mixer 204) based on the output of transmission frequency controller 107 and the output of modulated signal generator 102.

Figure 9:
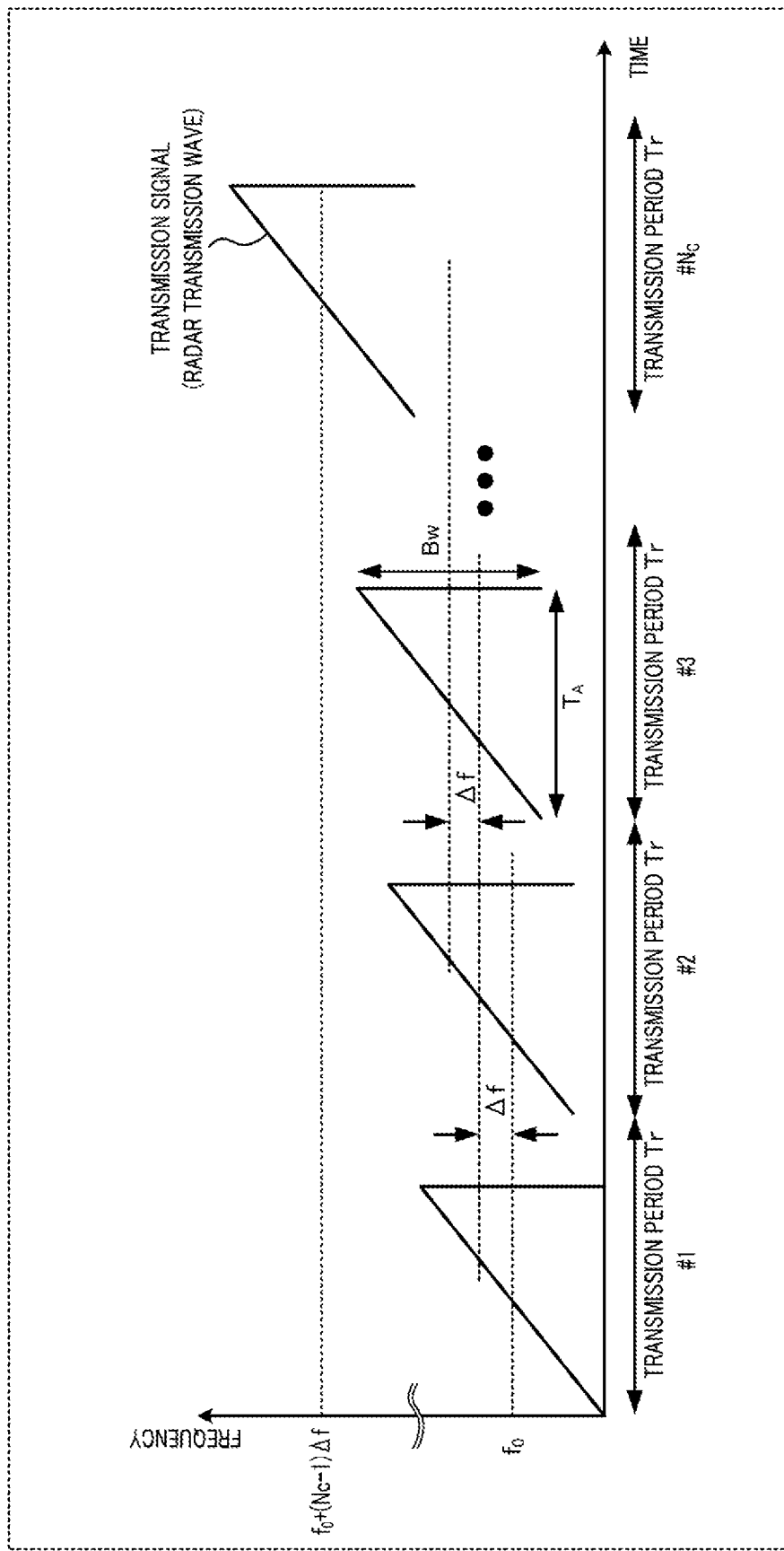
FIG. 9 illustrates examples of a transmission signal and a reflected wave signal in a case where a chirp pulse is used.

FIG. 9 illustrates an example of frequency-modulated signals for which frequency modulation has been performed (hereinafter referred to as chirp signals).

In FIG. 9, for example, VCO 103b outputs a chirp signal having center frequency fc(1) of $f_0$ at first transmission period Tr #1. Further, as illustrated in FIG. 9, VCO 103b outputs a chirp signal having center frequency fc(2) of $f_0+\Delta f$ at second transmission period Tr #2. In the same manner, in FIG. 9, VCO 103b outputs a chirp signal having center frequency fc(m) of $f_0+(m-1)\Delta f$ at m-th transmission period Tr #m. Thus, VCO 103b changes the center frequency of a chirp signal by Δf for each transmit period Tr.

That is, in FIG. 9, center frequency $fc(N_c)$ of the chirp signal in Ne-th transmission period Tr #$N_c$ is $f_0+\Delta f \times (Nc-1)$.

Note that, as the respective chirp signals, chirp signals having the same frequency-modulation bandwidth Bw in time width $T_A$ of a range gate may be used, for example. Further, in the example illustrated in FIG. 9, a case where Δf>0 (in other words, a case where center frequency fc increases) is illustrated, but the same also applies to a case where Δf<0 (in other words, a case where center frequency fc decreases).

Other operations in radar transmitter 100b illustrated in FIG. 8 may be the same as those in Embodiment 1.

Next, an operation example of radar receiver 200b of radar apparatus 10b will be described.

In radar receiver 200b, processing performed by each antenna system processor 201 on signals received by reception antenna 202, and operations of CFAR section 211, aliasing determiner 212, and code demultiplexer 213 subsequent thereto are the same as the operations in Embodiment 1. Further, in radar receiver 200b, direction estimation processing using the output of code demultiplexer 213 in direction estimator 214b is also the same as the operation in Embodiment 1.

In radar receiver 200b, for example, conversion processing with respect to Doppler velocity information of a target in direction estimator 214b differs from that in Embodiment 1.

Note that, distance information R(fb) is the same as that in Embodiment 1, and radar receiver 200b may output distance information R(fb) by using beat frequency index (or distance index) fb based on equation 8, for example.

For example, direction estimator 214b may calculate Doppler frequency index $f_{es\_cfar}$ in accordance with equation 37 based on Doppler frequency index $f_{s\_cfar}$ and $DR_{min}$ that is a determination result of aliasing determiner 212.

[51]

$$f_{es\_cfar} = f_{s\_cfar} + DR_{min} \times Ncode \quad \text{(Equation 37)}$$

Doppler frequency index $f_{es\_cfar}$ corresponds, for example, to the Doppler index in a case where the FFT size of Doppler analyzer 210 is extended to Loc×Ncode. Hereinafter, $f_{es\_cfar}$ is referred to as "extended Doppler frequency index".

Note that, the Doppler range is assumed to be up to $\pm 1/(2 \times Tr)$, and the range of extended Doppler frequency index $f_{es\_cfar}$ corresponding to the above Doppler range is $-\text{Loc} \times Ncode/2 \leq f_{es\_cfar} < \text{Loc} \times Ncode/2$. Accordingly, as a result of calculation of equation 37, $f_{es\_cfar} + \text{Loc} \times Ncode$ is $f_{es\_cfar}$ in a case where $f_{es\_cfar} < -\text{Loc} \times Ncode/2$, and further $f_{es\_cfar} - \text{Loc} \times Ncode$ is $f_{es\_cfar}$ in a case where $f_{es\_cfar} \geq \text{Loc} \times Ncode/2$.

Further, for example, direction estimator 214b may output Doppler velocity information $v_d$ of a target, which is detected in the below-described way, by using, extended Doppler frequency index $f_{es\_cfar}$ and distance index $f_{b\_cfar}$.

For example, in a case where radar transmission signals for which center frequencies fc of chirp signals are changed by Δf for each transmission period Tr are used, center frequencies fc of the chirp signals change for each transmission period Tr even when the relative velocity of a target is zero. Accordingly, a reception signal of radar apparatus 10b includes phase rotation associated with a change in the center frequencies of chirp signals for each transmission period Tr.

Center frequency fc at m-th transmission period Tr with respect to target distance $R_{target}$ is changed by (m−1)Δf when the center frequency at first transmission period Tr is used as a reference, and phase rotation amount Δη (m, $R_{target}$) associated therewith is indicated by equation 38-1 in view of reflected-wave arrival time ($2R_{target}/C_0$) from target distance $R_{target}$. Note that, following equation 38-1 represents the relative phase rotation amount in a case where the phase of first transmission period Tr is used as a reference.

[52]

$$\Delta\eta(m, R_{target}) = 2\pi(m-1)\Delta f \times \left(\frac{2R_{target}}{C_0}\right) \quad \text{(Equation 38-1)}$$

$C_0$ indicates the velocity of light. Accordingly, the output of each of Loc Doppler analyzers 210 of radar apparatus 10b includes phase rotation associated with a change in the center frequencies of chirp signals for each transmission period Tr.

Accordingly, as indicated by equation 38-2, direction estimator 214b calculates Doppler velocity information $v_d$ ($f_{es\_cfar}$, $f_{b\_cfar}$) based on a conversion equation in view of Δf that is the amount of change in center frequencies fc of chirp signals for each transmission period Tr.

The first term in equation 38-2 corresponds to equation 36 and is a relative Doppler velocity component represented by Doppler frequency $f_{es\_cfar}$. The second term in equation 38-2 is a Doppler velocity component that is generated by changing center frequency fc of a chirp signal by Δf for each transmission period Tr. For example, as indicated by equation 38-2, direction estimator 214b can calculate true relative Doppler velocity $v_d(f_{es\_cfar}, f_{b\_cfar})$ of a target by removing the Doppler component in the second term from the first term. Here, given equation 8, $R(f_{b\_cfar})$ is distance information $R(f_{b\_cfar})$ using beat frequency index $f_{b\_cfar}$.

[53]

$$v_d(f_{es\_cfar}, f_{b\_cfar}) = \frac{C_0}{2f_0}\left(\frac{f_{es\_cfar}}{Loc \times Ncode \times T_r} - \frac{\Delta f \times 2R(f_{b\_cfar})}{T_r \times C_0}\right)$$

(Equation 38-2)

Note that, the Doppler range of a target is assumed to be up to $\pm 1/(2 \times Tr)$ so that in a case where $v_d$ is $v_d < -C_0/(4f_0 Tr)$, direction estimator 214b may output detected Doppler velocity information va of a target in accordance with following equation 39.

[54]

$$v_d(f_{es\_cfar}, f_{b\_cfar}) = \frac{C_0}{2f_0}\left(\frac{f_{es\_cfar} + Loc \times Ncode}{Loc \times Ncode \times T_r} - \frac{\Delta f \times 2R(f_{b\_cfar})}{T_r \times C_0}\right)$$

(Equation 39)

Further, in the same manner, the Doppler range of a target is assumed to be up to $\pm 1/(2 \times Tr)$ so that in a case where $v_d$ is $v_d > C_0/(4f_0 Tr)$, direction estimator 214b may output detected Doppler velocity information $v_d$ of a target in accordance with following equation 40.

[55]

$$v_d(f_{es\_cfar}, f_{b\_cfar}) = \frac{C_0}{2f_0}\left(\frac{f_{es\_cfar} - Loc \times Ncode}{Loc \times Ncode \times T_r} - \frac{\Delta f \times 2R(f_{b\_cfar})}{T_r \times C_0}\right)$$

(Equation 40)

As described above, in the present embodiment, in radar apparatus 10b, center frequency fc of a chirp signal changes based on transmission period Tr of a radar transmission signal. For example, radar apparatus 10b transmits radar transmission signals such that center frequencies fc of chirp signals are changed by Δf (for example, increased in a case where Δf>0 and decreased in a case where Δf<0) for each transmission period Tr. Even in this case, radar apparatus 10b (for example, MIMO radar) can apply code multiplexing transmission. Further, as in Embodiment 1, radar apparatus 10b can perform Doppler aliasing determination by using the output (in other words, a reception signal) of Doppler analyzer 210 for each code element of a code-multiplexed signal, and an unused orthogonal code.

Further, in the same manner as in Embodiment 1, radar apparatus 10b is capable of setting a Doppler range detectable without ambiguity to ±1/(Tr) and suppressing mutual interference between code-multiplexed signals to approximately a noise level by performing Doppler phase correction including aliasing during code demultiplexing. Thus, the present embodiment makes it possible to suppress deterioration of radar detection performance and perform code multiplexing transmission by a MIMO radar.

Further, in the present embodiment, for example, radar apparatus 10b transmits radar transmission signals such that center frequencies fc of chirp signals are changed by Δf for each transmission period Tr so that distance resolution can be improved by a change width of the center frequencies of chirp signals (see, for example, NPL 4). According to the present embodiment, since distance resolution can be improved by a change width of the center frequencies of chirp signals, the chirp sweep bandwidth (for example, Bw) can be reduced in comparison with transmission with a constant center frequency of chirp signals. The reduction in the chirp sweep bandwidth makes it possible to reduce, for example, transmission period Tr while improving distance resolution so that the Doppler range detectable without ambiguity can be further extended in code multiplexing transmission.

Variation 1 of Embodiment 2

The periods at which the center frequencies of chirp signals are changed are not limited to transmission periods Tr. In Variation 1, a case where the center frequencies of chirp signals are configured to vary for each transmission period (Loc×Tr) (hereinafter referred to as "code transmission period"), the number of which corresponds to code length Loc of one orthogonal code used for code multiplexing transmission, will be described. [Configuration of Radar Apparatus]

Figure 10:
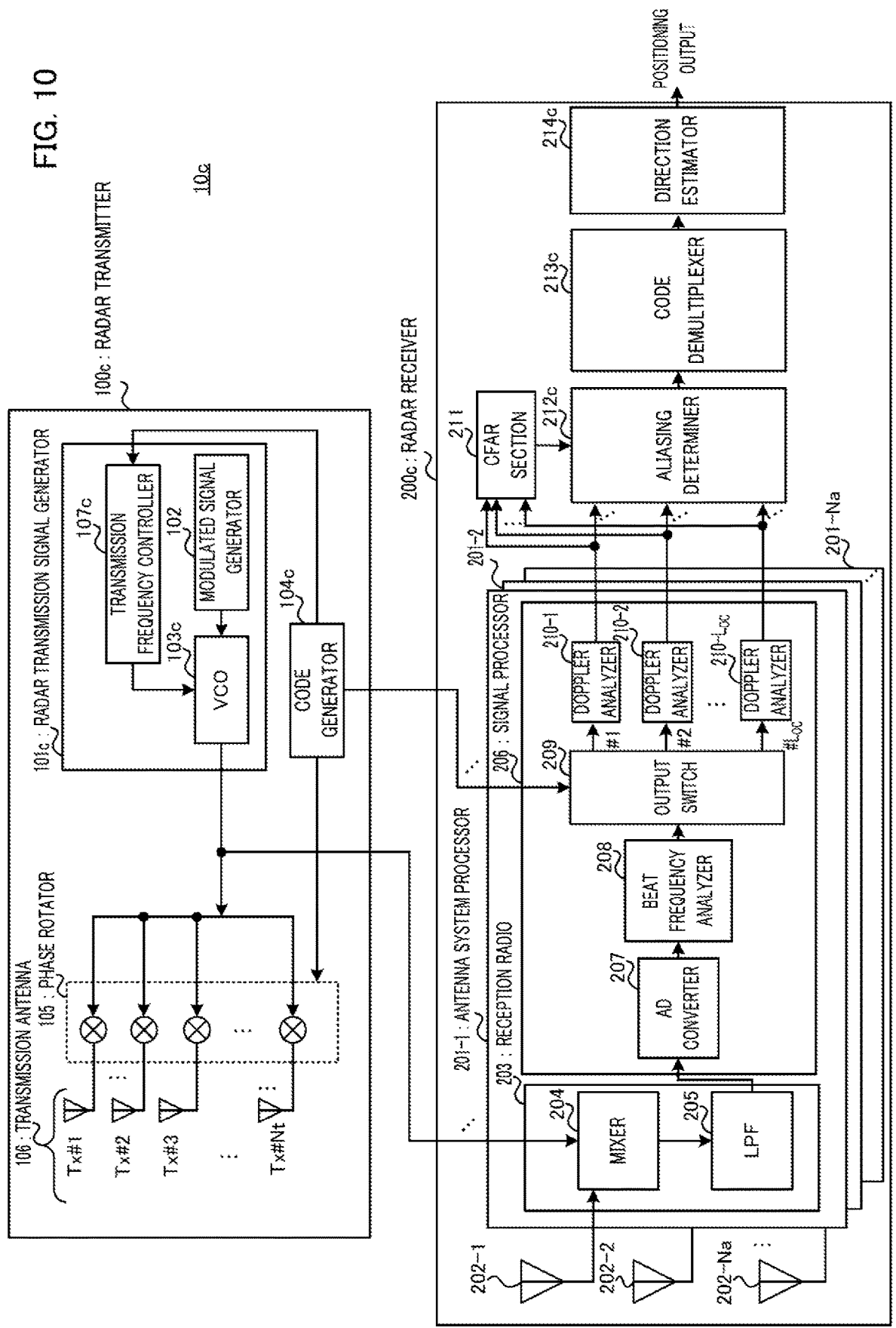
FIG. 10 is a block diagram illustrating a configuration example of a radar apparatus according to Variation 1 of Embodiment 2.

FIG. 10 is a block diagram illustrating a configuration example of radar apparatus 10c according to Variation 1. Note that, in FIG. 10, the same configurations as those Embodiment 1 (FIG. 1) or Embodiment 2 (FIG. 8) are denoted with the same reference signs, and descriptions thereof will be omitted.

In Variation 1, for example, radar apparatus 10c transmits radar transmission signals for which center frequencies fc of chirp signals are changed by Δf (for example, increased in a case where Δf>0 and decreased in a case where Δf<0) for each code transmission period (Loc×Tr).

Radar transmission signal generator 101c in radar transmitter 100c includes modulated signal generator 102, VCO 103c, and transmission frequency controller 107c.

For example, modulated signal generator 102 periodically generates sawtooth-shaped modulated signals for VCO control. Here, the transmission period is Tr.

Transmission frequency controller 107c controls, based on orthogonal code element index OC_INDEX outputted from code generator 104c, center frequencies fc of frequency-modulated signals (chirp signals) outputted from VCO 103c at code transmission periods (Loc×Tr).

For example, transmission frequency controller 107c may change center frequency fc of a frequency-modulated signal outputted from VCO 103c at transmission period Tr with OC_INDEX=1 by Δf for each transmission period Tr. In other words, transmission frequency controller 107c controls center frequency fc of a frequency-modulated signal outputted from VCO 103c at transmission period Tr with OC_INDEX #1 to be the same as center frequency fc at previous transmission period Tr. With this control, transmission frequency controller 107c can perform control such that center frequencies fc are changed by Δf for each code transmission period (Loc×Tr).

VCO 103c outputs frequency-modulated signals to phase rotator 105 and radar receiver 200 (for example, mixer 204) based on the output of transmission frequency controller 107c and the output of modulated signal generator 102.

Figure 11:
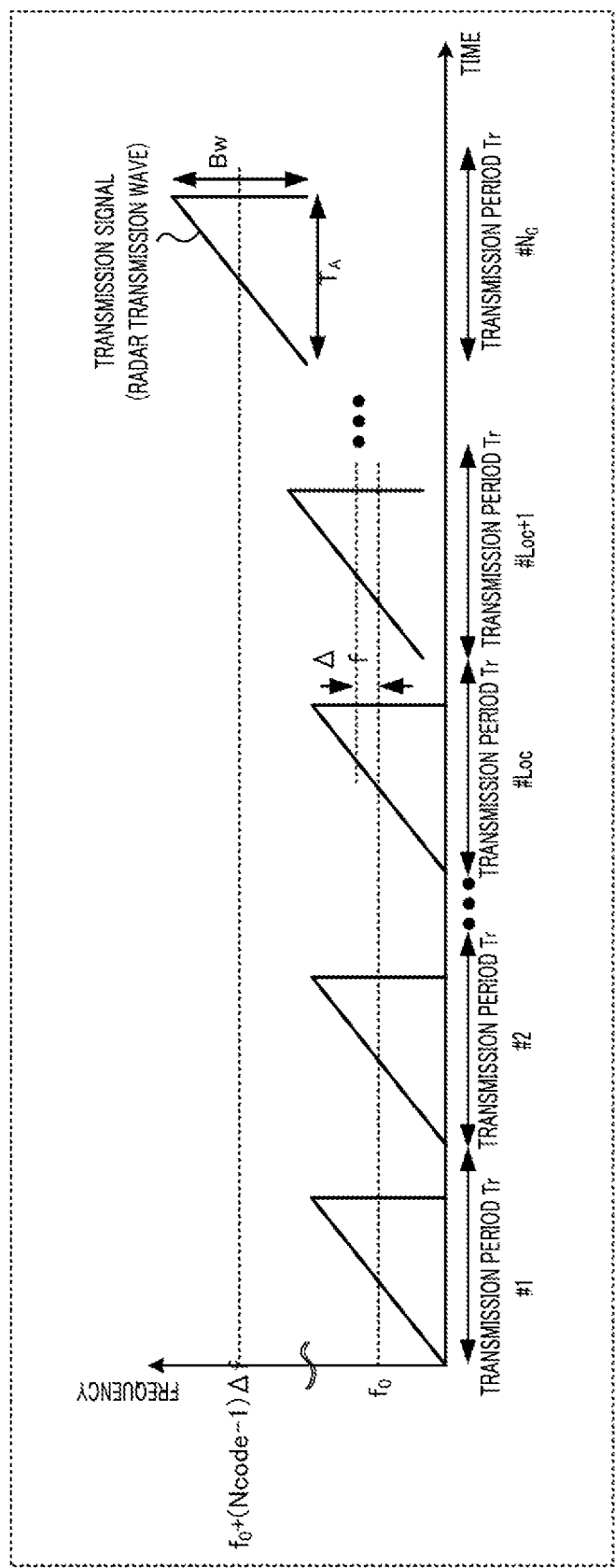
FIG. 11 illustrates examples of a transmission signal and a reflected wave signal in a case where a chirp pulse is used.

FIG. 11 illustrates an example of frequency-modulated signals for which frequency modulation has been performed (hereinafter referred to as chirp signals).

In FIG. 11, for example, VCO 103c outputs a chirp signal having center frequency fc(1) of $f_0$ at first transmission period Tr #1 (for example, OC_INDEX=1). Further, as illustrated in FIG. 11, VCO 103c outputs a chirp signal having center frequency fc(2) of $f_0$ at second transmission period Tr #2 (for example, OC_INDEX=2). In the same manner, VCO 103c outputs chirp signals having center frequencies fc(3) to fc(Loc) of $f_0$ at the third transmission period (for example, OC_INDEX=3) (not illustrated) to Loc-th transmission period Tr #Loc (for example, OC_INDEX=Loc), respectively.

VCO 103c outputs a chirp signal having center frequency fc(Loc+1) of $f_0+\Delta f$ at (Loc+1)-th transmission period Tr #(Loc+1). Further, VCO 103c outputs chirp signals having center frequencies fc(Loc+2) to fc(2Loc) of $f_0+\Delta f$ at (Loc+2)-th transmission period Tr #(Loc+2) to (2Loc)-th transmission period Tr #(2Loc), respectively.

In the same manner, VCO 103c outputs a chirp signal having center frequency fc(m) of $f_0+\text{floor}[(m-1)/\text{Loc}]\Delta f$ at m-th transmission period Tr #m.

That is, in FIG. 11, center frequency $fc(N_c)$ of the chirp signal in $N_c$-th transmission period Tr #$N_c$ is $f_0+(\text{Ncode}-1)\Delta f$. Here, Ncode=$N_c$/Loc.

Note that, as the respective chirp signals, chirp signals having the same frequency-modulation bandwidth Bw in time width $T_A$ of a range gate may be used, for example. Further, in the example illustrated in FIG. 11, a case where Δf>0 (in other words, a case where center frequency fc increases) is illustrated, but the same also applies to a case where Δf<0 (in other words, a case where center frequency fc decreases).

Other operation in radar transmitter 100c illustrated in FIG. 10 may be the same as those in Embodiment 1.

Next, an operation example of radar receiver 200c of radar apparatus 10c will be described.

In radar receiver 200c, processing performed by each antenna system processor 201 on signals received by reception antenna 202, and operation of CFAR section 211 subsequent thereto are the same as the operations in Embodiment 1. Further, in radar receiver 200c, direction estimation processing using the output of code demultiplexer 213 in direction estimator 214c is also the same as the operation in Embodiment 1.

In radar receiver 200c, for example, operation of aliasing determiner 212c, operation of code demultiplexer 213c, and conversion processing with respect to Doppler velocity information of a target in direction estimator 214c differ from those in Embodiment 1.

Hereinafter, an operation example of aliasing determiner 212c, which is different from that in Embodiment 1, will be described.

For example, in a case where radar transmission signals for which center frequencies fc of chirp signals are changed by Δf for each code transmission period (Loc×Tr) are used, center frequencies fc of the chirp signals change for each code transmission period (Loc×Tr) even when the relative velocity of a target is zero. Accordingly, the output of each of Loc Doppler analyzers 210 of radar apparatus 10c includes phase rotation associated with a change in the center frequencies of the chirp signals for each code transmission period (Loc× Tr).

That is, center frequency fc at m-th transmission period Tr with respect to target distance $R_{target}$ changes by floor[(m−1)/Loc]Δf when center frequency fc at first transmission period Tr is used as a reference. Accordingly, phase rotation amount $\Delta\eta(m, R_{target})$ associated with the change in the center frequencies is indicated by equation 40-1 in view of reflected-wave arrival time $(2R_{target}/C_0)$ from target distance $R_{target}$. Note that, equation 40-1 indicates the relative phase rotation amount in a case where the phase of first transmission period Tr is used as a reference.

[56]

$$\Delta\eta(m, R_{target}) = 2\pi \operatorname{floor}\left(\frac{m-1}{Loc}\right)\Delta f \times \left(\frac{2R_{target}}{C_0}\right) \quad \text{(Equation 40-1)}$$

$C_0$ indicates the velocity of light.

Since code transmission periods (Loc×Tr) in which center frequencies fc of chirp signals are changed by $\Delta f$ are caused to match periods for switching between Doppler analyzers 210 for each code element, each of Loc Doppler analyzers 210 performs Doppler analysis including phase rotation indicated by equation 40-1.

Accordingly, there is a difference that when correcting Doppler phase rotation due to a time difference of Doppler analysis among Loc Doppler analyzers 210, aliasing determiner 212c performs phase correction by using, in addition to Doppler phase correction vector $a(f_{s\_cfar})$ of equation 12, center frequency change correction vector $\xi(f_{b\_cfar})$ indicated in equation 40-2.

[57]

$$\xi(f_{b\_cfar}) = \left[1, \exp\left\{j2\pi\Delta f\frac{2R(f_{b\_cfar})}{C_0}\frac{1}{Loc}\right\},\right.$$
$$\exp\left\{j2\pi\Delta f\frac{2R(f_{b\_cfar})}{C_0}\frac{2}{Loc}\right\}, \ldots,$$
$$\left.\exp\left\{j2\pi\Delta f\frac{2R(f_{b\_cfar})}{C_0}\frac{Loc-1}{Loc}\right\}\right] \quad \text{(Equation 40-2)}$$

That is, aliasing determiner 212c uses, instead of $\alpha(f_{s\_cfar})$,

[58]

$\xi(f_{s\_cfar})\otimes\alpha(f_{s\_cfar})$.

Note that, given equation 8, $R(f_{b\_cfar})$ is distance information $R(f_{b\_cfar})$ using beat frequency index $f_{b\_cfar}$.

In equation 40-2, due to the change of $\Delta f$ in reflected-wave arrival time $(2R(f_{b\_cfar})/C_o)$ from $R(f_{b\_cfar})$, the phase rotation amount is $2\pi\Delta f\times(2R(f_{b\_cfar})/C_o)$ in each code transmission period (Loc×Tr) so that each phase rotation due to a time difference of Doppler analysis among Loc Doppler analyzers 210 is derived from (noc−1)/Loc times for noc-th Doppler analyzer 210 when first Doppler analyzer 210 is used as a reference. Note that, noc=1, . . . , Loc.

The periods at which center frequencies fc of chirp signals are changed by $\Delta f$ are caused to be code transmission periods (Loc×Tr) and therefore match the periods for switching between Doppler analyzers 210 for each code element. Accordingly, aliasing determiner 212c can easily perform phase correction (using the center frequency change correction vector of equation 40-2 in addition to Doppler phase correction vector $\alpha(f_{s\_cfar})$) in demultiplexing processing of a code-multiplexed signal by using an unused code.

For the reason described above, aliasing determiner 212c may calculate received power $DeMulUnCode_{nuc}(f_{b\_cfar}, f_{s\_cfar}, DR)$ after code demultiplexing using unused orthogonal code $UnCode_{nuc}$ as in equation 41 instead of equation 12.

[59]

$$DeMulUnCode_{nuc}(f_{b\_cfar}, f_{s\_cfar}, DR) = \sum_{z=1}^{Na}|(UnCode_{nuc})^* \cdot \quad \text{(Equation 41)}$$
$$\{\beta(DR)\otimes\xi(f_{s\_cfar})\otimes\alpha(f_{s\_cfar})VFTALL_z(f_{b\_cfar}, f_{s\_cfar})\}^T|^2.$$

Equation 41 differs from equation 12 in terms of using

[60]

$\xi(f_{s\_cfar})\otimes\alpha(f_{s\_cfar})$ instead of $\alpha(f_{s\_cfar})$ in equation 12. Here, nuc=1, . . . , $N_{allcode}-N_{CM}$. Further, DR is the index indicating a Doppler aliasing range, and takes an integer value in the range of DR=ceil[−Loc/2], ceil[−Loc/2]+1, . . . , 0, . . . , ceil[Loc/2]−1.

Further, aliasing determiner 212c may also use equation 42 instead of equation 29.

[61]

$$DeMulUnCode_{nuc}(f_{b\_cfar}, f_{s\_cfar}, DR) = \quad \text{(Equation 42)}$$
$$\sum_{z=1}^{Na}|(\beta(DR)\otimes UnCode_{nuc})^* \cdot \{\xi(f_{s\_cfar})\otimes\alpha(f_{s\_cfar})\otimes$$
$$VFTALL_z(f_{b\_cfar}, f_{s\_cfar})\}^T|^2$$

Next, an operation example of code demultiplexer 213c, which differs from that in Embodiment 1, will be described. For the same reason as that in the description of the operation example of aliasing determiner 212c described above, code demultiplexer 213c also uses $DR_{min}$, which is a result of aliasing determination in aliasing determiner 212c, to perform code demultiplexing processing on Doppler components $VFTALL_z(f_{b\_cfar}, f_{s\_cfar})$ that are the outputs of Doppler analyzers 210 corresponding to distance indexes $f_{b\_cfar}$ and Doppler frequency indexes $f_{s\_cfar}$ extracted in CFAR section 211 by using equation 43 instead of equation 30.

[62]

$$DeMUL_z^{ncm}(f_{b\_cfar}, f_{s\_cfar})=(Code_{ncm})^* \cdot \{\beta(DR_{min})\otimes\xi$$
$$(f_{s\_cfar})\otimes\alpha(f_{s\_cfar})\otimes VFTALL_z(f_{b\_cfar}, f_{s\_cfar})\}^T \quad \text{(Equation 43)}$$

Equation 43 differs from equation 30 in terms of using

[63]

$\xi(f_{s\_cfar})\otimes\alpha(f_{s\_cfar})$ instead of $\alpha(f_{s\_cfar})$ in equation 30.

Further, code demultiplexer 213c may also use aliasing determination result $DR_{min}$ in aliasing determiner 212c to perform demultiplexing processing of a code-multiplexed signal on Doppler components $VFTALL_z(f_{b\_cfar}, f_{s\_cfar})$ that are the outputs of Doppler analyzers 210 corresponding to distance indexes $f_{b\_cfar}$ and Doppler frequency indexes $f_{s\_cfar}$ extracted in CFAR section 211 by using equation 44 instead of equation 31.

[64]

$$DeMUL_z^{ncm}(f_{b\_cfar}, f_{s\_cfar})=(\beta(DR_{min})\otimes Code_{ncm})^* \cdot \{\xi$$
$$(f_{s\_cfar})\otimes\alpha(f_{s\_cfar})\otimes VFTALL_z(f_{b\_cfar}, f_{s\_cfar})\}^T \quad \text{(Equation 44)}$$

In equation 44, the term

[65]

$$\beta(DR) \otimes Code_{ncm}$$

does not depend on index $f_s$ of a Doppler component so that it is possible to reduce the arithmetic amount by pre-tabulation.

As described above, the periods at which center frequencies fc of chirp signals are changed by $\Delta f$ are caused to match code transmission periods (Loc×Tr) and therefore can be caused to match the periods for switching between Doppler analyzers 210 for each code element, and phase correction in code demultiplexing processing can be easily performed.

Next, an operation example of direction estimator 214c, which is different from that in Embodiment 1, will be described.

For example, direction estimator 214c may calculate Doppler frequency index $f_{es\_cfar}$ in accordance with following equation 45 based on Doppler frequency index $f_{s\_cfar}$ and $DR_{min}$ that is a determination result in aliasing determiner 212c.

[66]

$$f_{es\_cfar} = f_{s\_cfar} + DR_{min} \times Ncode \quad \text{(Equation 45)}$$

Doppler frequency index $f_{es\_cfar}$ corresponds, for example, to the Doppler index in a case where the FFT size of Doppler analyzer 210 is extended to Loc×Ncode. Hereinafter, $f_{es\_cfar}$ is referred to as "extended Doppler frequency index".

Note that, the Doppler range is assumed to be up to $\pm 1/(2 \times Tr)$, and the range of extended Doppler frequency index $f_{es\_cfar}$ corresponding to the above Doppler range is $-Loc \times Ncode/2 \leq f_{es\_cfar} < Loc \times Ncode/2$. Accordingly, as a result of calculation of equation 45, $f_{es\_cfar} + Loc \times Ncode$ is $f_{es\_cfar}$ in a case where $f_{es\_cfar} < -Loc \times Ncode/2$, and further $f_{es\_cfar} - Loc \times Ncode$ is $f_{es\_cfar}$ in a case where $f_{es\_cfar} > Loc \times Ncode/2$.

In radar transmission signals for which center frequencies fc of chirp signals are changed by $\Delta f$ for each code transmission period (Loc×Tr), center frequencies fc of the chirp signals change for each code transmission period (Loc×Tr) even when the relative velocity of a target is zero. Accordingly, the radar transmission signals include phase rotation associated with a change in the center frequencies of chirp signals for each code transmission period (Loc×Tr).

Center frequency fc at m-th transmission period Tr with respect to target distance $R_{target}$ changes by floor[(m−1)/Loc]$\Delta f$. Accordingly, phase rotation amount $\Delta\eta(m, R_{target})$ associated with a change in center frequencies fc is indicated by equation 46 in view of reflected-wave arrival time ($2R_{target}/C_0$) from target distance $R_{target}$.

[67]

$$\Delta\eta(m, R_{target}) = 2\pi \text{ floor}\left(\frac{m-1}{Loc}\right)\Delta f \times \left(\frac{2R_{target}}{C_0}\right) \quad \text{(Equation 46)}$$

Note that, equation 46 indicates the relative phase rotation amount in a case where the phase of first transmission period Tr is used as a reference. Co indicates the velocity of light.

Accordingly, direction estimator 214c may output detected Doppler velocity information $v_d$ ($f_{es\_cfar}, f_{b\_cfar}$) of a target in accordance with equation 47 by using, for example, extended Doppler frequency index $f_{es\_cfar}$ and distance index $f_{b\_cfar}$. The first term in equation 47 corresponds to equation 36 and is a relative Doppler velocity component indicated by Doppler frequency $f_{es\_cfar}$. Further, the second term in equation 47 is a Doppler velocity component that is generated by changing center frequencies fc of chirp signals by $\Delta f$ for each code transmission period (Loc×Tr).

Direction estimator 214c can calculate true relative Doppler velocity $v_d$ ($f_{es\_cfar}, f_{b\_cfar}$) of a target by removing the Doppler component of the second item from the first item in equation 47.

[68]

$$v_d(f_{es\_cfar}, f_{b\_cfar}) = \quad \text{(Equation 47)}$$
$$\frac{C_0}{2f_0}\left(\frac{f_{es\_cfar}}{Loc \times Ncode \times T_r} - \frac{\Delta f \times 2R(f_{b\_cfar})}{Loc \times T_r \times C_0}\right)$$

Here, given equation 8, $R(f_{b\_cfar})$ is distance information $R(f_{b\_cfar})$ using beat frequency index $f_{b\_cfar}$.

As indicated in equation 47, direction estimator 214c calculates Doppler velocity information $v_d$ based on a conversion equation in view of $\Delta f$ that is the amount of change in center frequencies fc of chirp signals for each code transmission period (Loc×Tr).

Note that, the Doppler range of a target is assumed to be up to $+1/(2 \times Tr)$ so that in a case where $v_d$ is $v_d < -C0/(4f_0 Tr)$, direction estimator 214c may output detected Doppler velocity information va of a target in accordance with following equation 48.

[69]

$$v_d(f_{es\_cfar}, f_{b\_cfar}) = \quad \text{(Equation 48)}$$
$$\frac{C_0}{2f_0}\left(\frac{f_{es\_cfar} + Loc \times Ncode}{Loc \times Ncode \times T_r} - \frac{\Delta f \times 2R(f_{b\_cfar})}{Loc \times T_r \times C_0}\right)$$

Further, in the same manner, the Doppler range of a target is assumed to be up to $\pm 1/(2 \times Tr)$ so that in a case where $v_d$ is $v_d > C_0/(4f_0 Tr)$, direction estimator 214c may output detected Doppler velocity information $v_d$ of a target in accordance with following equation 49.

[70]

$$v_d(f_{es\_cfar}, f_{b\_cfar}) = \quad \text{(Equation 49)}$$
$$\frac{C_0}{2f_0}\left(\frac{f_{es\_cfar} - Loc \times Ncode}{Loc \times Ncode \times T_r} - \frac{\Delta f \times 2R(f_{b\_cfar})}{Loc \times T_r \times C_0}\right)$$

As described above, in Variation 1, in radar apparatus 10c, center frequency fc of a chirp signal changes based on transmission periods (Loc×Tr) of one orthogonal code sequence. For example, radar apparatus 10c transmits radar transmission signals such that center frequencies fc of chirp signals are changed by $\Delta f$ (for example, increased in a case where $\Delta f > 0$ and decreased in a case where $\Delta f < 0$) for each code transmission period (Loc ×Tr). Even in this case, radar apparatus 10c (for example, MIMO radar) can apply code multiplexing transmission. Further, as in Embodiment 1, radar apparatus 10c can perform Doppler aliasing determination by using the output (in other words, a reception signal) of Doppler analyzer 210 for each code element of a code-multiplexed signal, and an unused orthogonal code.

Further, according to Variation 1, in the same manner as in Embodiment 1, radar apparatus 10c is capable of setting a Doppler range detectable without ambiguity to ±1/(Tr) and suppressing mutual interference between code-multiplexed signals to approximately a noise level by performing Doppler phase correction including aliasing during code demultiplexing. Thus, Variation 1 makes it possible to suppress deterioration of radar detection performance and perform code multiplexing transmission by a MIMO radar.

Further, according to Variation 1, in a case where the periods at which center frequencies fc of chirp signals are changed by Δf are caused to be a plurality of transmission periods Tr, for example, the periods at which center frequencies fc of chirp signals are changed are caused to match code transmission periods (Loc×Tr) to thereby also match the periods for switching between Doppler analyzers 210 for each code element so that demultiplexing processing of a code-multiplexed signal using an unused code in aliasing determiner 212c and phase correction in code demultiplexing processing in code demultiplexer 213c can be easily performed.

Further, in Variation 1, radar apparatus 10c transmits, for example, radar transmission signals such that center frequencies fc of chirp signals are changed by Δf for each code transmission period (Loc×Tr) so that the change width of the center frequencies of the chirp signals is Δf×Ncode and distance resolution is $0.5C_0/(\Delta f \times \text{Ncode})$.

Thus, according to Variation 1, increasing Δf×Ncode makes it possible to improve distance resolution by a change width of the center frequencies of chirp signals so that the chirp sweep bandwidth (for example, Bw) can be reduced in comparison with transmission with a constant center frequency of chirp signals. The reduction in the chirp sweep bandwidth makes it possible to reduce, for example, transmission period Tr while improving distance resolution so that the Doppler range detectable without ambiguity can further be extended in code multiplexing transmission.

Note that, in Variation 1 of Embodiment 2, a case where radar transmission signals for which center frequencies fc of chirp signals are changed by Δf for each code transmission period (Loc×Tr) are used has been described, but radar transmission signals for which center frequencies fc of chirp signals are changed by Δf for each (divisor of Loc×Tr) may also be used. Note that, in a case where one among divisors of Loc is used, center frequencies fc are changed by Δf for each Tr in the same manner as in Embodiment 2.

In a case where radar transmission signals for which center frequencies fc of chirp signals are changed by Δf for each transmission period, the number of which is divisor ε of Loc, that is, for each of ε transmission periods (ε×Tr), are used, center frequencies fc of chirp signals by an amount corresponding to Δf×Loc/ε for each code transmission period (Loc×Tr) change. Thus, Δf in equations 47, 48, and 49 is replaced by Δf×Loc/ε. Further, equation 50 is used for center frequency change correction vector $\xi(f_{b\_cfar})$.

[71]

$$\xi(f_{b\_cfar}) = \left[ 1, \exp\left\{ j2\pi\Delta f \frac{2R(f_{b\_cfar})}{C_0} \frac{(1-\text{floor}(1/\varepsilon))}{\varepsilon} \right\}, \right.$$
$$\exp\left\{ j2\pi\Delta f \frac{2R(f_{b\_cfar})}{C_0} \frac{(2-\text{floor}(2/\varepsilon))}{\varepsilon} \right\}, \ldots ,$$
$$\left. \exp\left\{ j2\pi\Delta f \frac{2R(f_{b\_cfar})}{C_0} \frac{(Loc-1-\text{floor}((Loc-1)/\varepsilon))}{\varepsilon} \right\} \right]$$

(Equation 50)

With the above, the same effect as in Variation 1 described above can be obtained. Here, ε indicates a divisor of Loc.

Note that, although Variation 1 of Embodiment 2 can be implemented in combination with Embodiment 1, the code multiplexing method as described in Embodiment 1 may not be applied.

For example, of $N_{allcode}$ orthogonal codes included in code sequences with code length Loc, code generator 104c causes code multiplexing number $N_{CM}$ to be equal to number $N_{allcode}$ of orthogonal codes. Phase rotator 105 performs code multiplexing by using all of $N_{allcode}$ orthogonal codes included in code sequences with code length Loc, and outputs radar transmission signals for which center frequencies fc of chirp signals are changed by Δf for each code transmission period (Loc×Tr).

Thus, by increasing Δf×Ncode, radar apparatus 10c can improve distance resolution by a change width of the center frequencies of chirp signals so that the chirp sweep bandwidth (for example, Bw) can be reduced in comparison with transmission with a constant center frequency of chirp signals. Accordingly, by the reduction in the chirp sweep bandwidth, radar apparatus 10c can, for example, improve distance resolution and reduce transmission period Tr.

Note that, in a case where radar apparatus c of Variation 1 of Embodiment 2 is not combined with Embodiment 1, radar apparatus c is configured such that aliasing determiner 212 of radar apparatus 10 is not applied so that the Doppler frequency range becomes ±1/(2Loc×Tr). However, since the chirp sweep bandwidth is reduced to less than or equal to 1/Loc by increasing Δf×Ncode so that distance resolution can be improved and transmission period Tr can be reduced to less than or equal to Tr/Loc.

Accordingly, radar apparatus 10c of Variation 1 of Embodiment 2 makes it possible to obtain the effect of extending the Doppler range detectable without ambiguity even in the conventional code multiplexing transmission by using radar transmission signals for which center frequencies fc of chirp signals are changed by Δf for each code transmission period (Loc×Tr).

Variation 2 of Embodiment 2

The method of controlling center frequency fc of a frequency-modulated signal (chirp signal) is not limited to the methods according to Embodiment 2 (FIG. 9) and Variation 1 (FIG. 11). In Variation 2, another method of controlling center frequency fc of a frequency-modulated signal (chirp signal) will be described.

[Configuration of Radar Apparatus]

Figure 12:
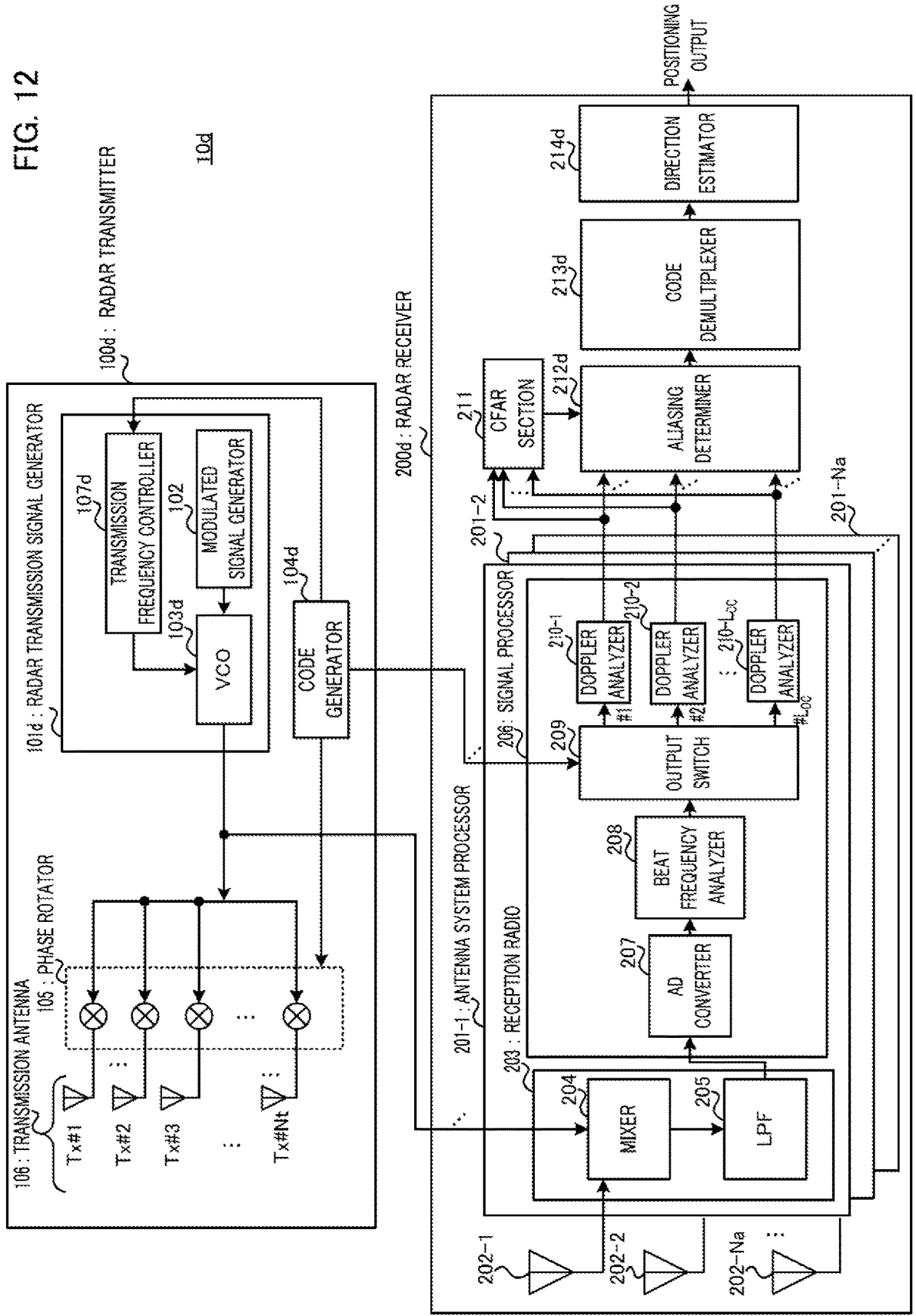
FIG. 12 is a block diagram illustrating a configuration example of a radar apparatus according to Variation 2 of Embodiment 2.

FIG. 12 is a block diagram illustrating a configuration example of radar apparatus 10d according to Variation 2. Note that, in FIG. 12, the same configurations as those Embodiment 1 (FIG. 1) or Embodiment 2 (FIG. 8) are denoted with the same reference signs, and descriptions thereof will be omitted.

In Variation 2, for example, radar apparatus 10d periodically changes center frequencies fc of chirp signals over a plurality of transmission periods within code transmission periods (Loc×Tr). In this case, radar apparatus 10d causes the timings, at which center frequencies fc of chirp signals are changed in a round, to match the code transmission periods (Loc×Tr), thereby allowing aliasing determination processing by aliasing determiner 212d or code demultiplexing processing by code demultiplexer 213d (details thereof will be described later).

Radar transmission signal generator 101d of radar transmitter 100d includes modulated signal generator 102, VCO 103d, and transmission frequency controller 107d.

For example, modulated signal generator 102 periodically generates sawtooth-shaped modulated signals for VCO control. Here, the transmission period is Tr.

Transmission frequency controller 107d controls, based on orthogonal code element index OC_INDEX outputted from code generator 104d, center frequency fc of a frequency-modulated signal (chirp signal) outputted from VCO 103d at transmission period Tr.

For example, transmission frequency controller 107d configures center frequency fc of a frequency-modulated signal outputted from VCO 103d to $f_0$ at transmission period Tr with OC_INDEX=1. Further, transmission frequency controller 107d configures center frequency fc of a frequency-modulated signal outputted from VCO 103d to $f_0+\Delta f$ at transmission period Tr with OC_INDEX=2. In the same manner, transmission frequency controller 107d configures center frequencies fc of frequency-modulated signals outputted from VCO 103d to $(f_0+2\Delta f)$ to $(f_0+(Loc-1)\Delta f)$ at transmission periods Tr with OC_INDEX =3 to Loc, respectively.

With this control, transmission frequency controller 107d can perform control such that center frequencies fc of chirp signals periodically change over each code transmission period (Loc×Tr), for example.

VCO 103d outputs frequency-modulated signals to phase rotator 105 and radar receiver 200 (for example, mixer 204) based on the output of transmission frequency controller 107d and the output of modulated signal generator 102.

Figure 13:
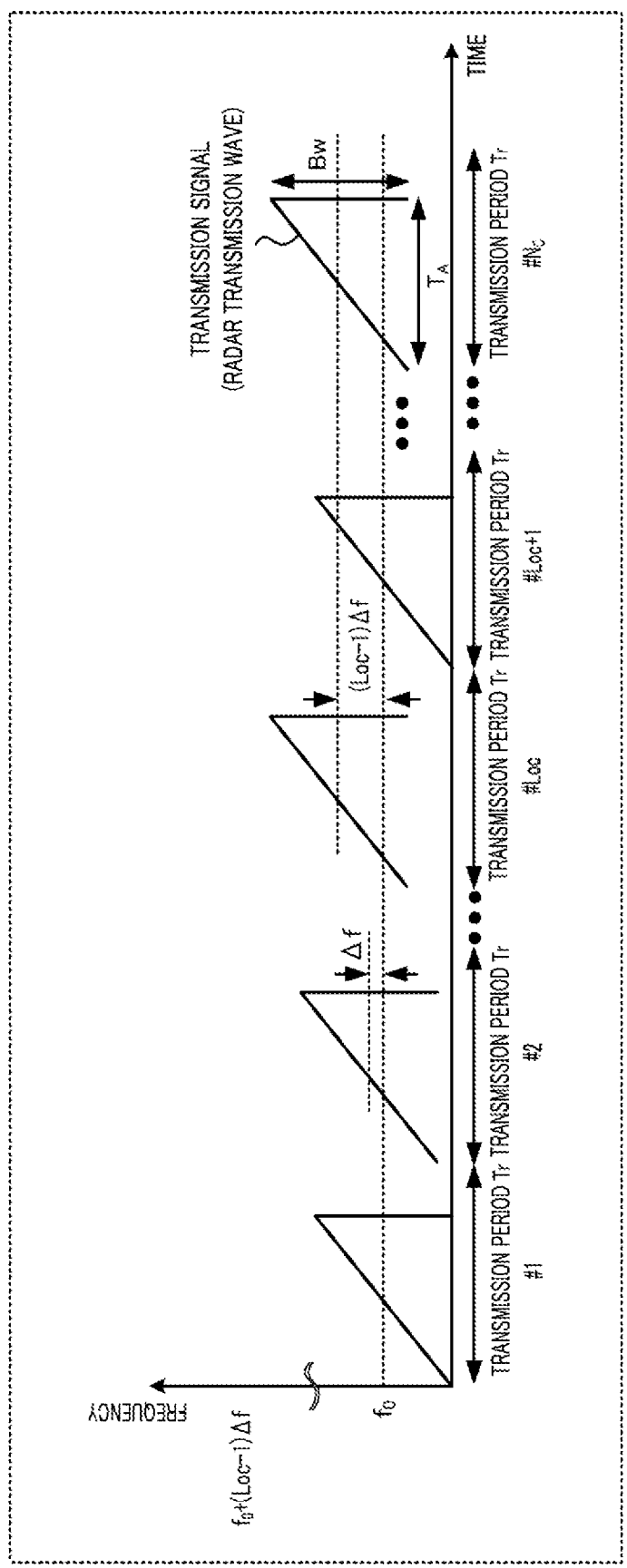
FIG. 13 illustrates examples of a transmission signal and a reflected wave signal in a case where a chirp pulse is used.

FIG. 13 illustrates an example of frequency-modulated signals for which frequency modulation has been performed (hereinafter referred to as chirp signals).

In FIG. 13, for example, VCO 103d outputs a chirp signal having center frequency fc(1) of $f_0$ at first transmission period Tr #1. Further, for example, VCO 103d outputs a chirp signal having center frequency fc(2) of $f_0+\Delta f$ at second transmission period Tr #2. In the same manner, VCO 103d outputs chirp signals having center frequencies fc(3) to fc(Loc) of $(f_0+2\Delta f)$ to $(f_0+(Loc-1)\Delta f)$ at third transmission period Tr #3 to Loc-th transmission period Tr #Loc, respectively.

Further, VCO 103d outputs a chirp signal having center frequency fc(Loc+1) of $f_0$ at (Loc+1)-th transmission period Tr #(Loc+1). In the same manner, VCO 103d outputs chirp signals having center frequencies fc(Loc+2) to fc(2Loc) of $(f_0+\Delta f)$ to $(f_0+(Loc-1)\Delta f)$ at (Loc+2)-th transmission period Tr #(Loc+2) to (2Loc)-th transmission period Tr #(2Loc), respectively.

In the same manner, VCO 103d outputs a chirp signal having center frequency fc(m) of $f_0+\text{mod}(m-1, \text{Loc})\Delta f$ at m-th transmission period Tr #m.

That is, in FIG. 13, center frequency fc($N_c$) of the chirp signal at $N_c$-th transmission period Tr #$N_c$ is $f_0+(Loc-1)\Delta f$.

As described above, in FIG. 13, center frequencies fc of chirp signals change in a round in a transmission period of a radar transmission signal, where the transmission period is a divisor multiple of a code length of each of a plurality of code sequences (for example, orthogonal codes).

Note that, the respective chirp signals may be, for example, chirp signals having the same frequency-modulation bandwidth Bw in time width $T_A$ of a range gate. Further, in the example illustrated in FIG. 13, a case where $\Delta f>0$ (in other words, a case where center frequency fc increases) is illustrated, but the same also applies to a case where $\Delta f<0$ (in other words, a case where center frequency fc decreases).

Other operations in radar transmitter 100d illustrated in FIG. 12 may be the same as those in Embodiment 1.

Next, an operation example of radar receiver 200d of radar apparatus 10d will be described.

In radar receiver 200d, processing performed by each antenna system processor 201 on signals received by reception antenna 202 and operation of CFAR section 211 subsequent thereto are the same as the operations in Embodiment 1. Further, in radar receiver 200d, direction estimation processing using the output of code demultiplexer 213d in direction estimator 214d is also the same as the operation in Embodiment 1.

In radar receiver 200d, for example, operation of aliasing determiner 212d and operation of code demultiplexer 213d differ from those in Embodiment 1.

Hereinafter, an operation example of aliasing determiner 212d, which is different from that in Embodiment 1, will be described.

For example, in a case where radar transmission signals for which center frequencies fc of chirp signals are changed by $f_0, f_0+\Delta f, \ldots, f_0+(Loc-1)\Delta f$ for each transmission period Tr are used at each code transmission period (Loc×Tr), radar reflected waves when chirp signals for which center frequencies fc are $f_0, f_0+\Delta f, \ldots, f_0+(Loc-1)\Delta f$, respectively, are transmitted are inputted as reception signals into first, second, . . . , Loc-th Doppler analyzers 210.

Accordingly, the center frequencies of radar reflected waves to be inputted into Loc Doppler analyzers 210, respectively, are the same.

On the other hand, since the center frequencies of chirp signals differ among Loc Doppler analyzers 210, radar receiver 200d performs phase correction by using center frequency change correction vector $\zeta(f_{b\_cfar})$ indicated by equation 51 in addition to Doppler phase correction vector $\alpha(f_{s\_cfar})$ used for aliasing determiner 212 in Embodiment 1 for correcting phase rotation due to a time difference in Doppler analysis among Loc Doppler analyzers 210.

[72]

$$\zeta(f_{b\_cfar}) = \quad \text{(Equation 51)}$$
$$\left[1, \exp\left[-j2\pi\Delta f \frac{2R(f_{b\_cfar})}{C_0}\right], \exp\left[-j2\pi(2\Delta f)\frac{2R(f_{b\_cfar})}{C_0}\right], \ldots, \exp\left[-j2\pi(Loc-1)\Delta f \frac{2R(f_{b\_cfar})}{C_0}\right]\right]$$

That is, equation 51 uses

[73]

$\zeta(f_{s\_cfar}) \otimes \alpha(f_{s\_cfar})$ instead of $\alpha(f_{s\_cfar})$.

Here, given equation 8, $R(f_{b\_cfar})$ is distance estimation value $R(f_{b\_cfar})$ using beat frequency index $f_{b\_cfar}$. Equation 51 is derived as follows. In a case where the center frequency of a transmission chirp signal for first Doppler analyzer 210 is used as a reference, the center frequencies of transmission chirp signals for second to Loc-th Doppler analyzers 210 are different from each other by $\Delta f, \ldots, (Loc-1)\Delta f$, respectively. Accordingly, phase rotation amounts in reflected-wave arrival time $(2R(f_{b\_cfar})/C_o)$ from $R(f_{b\_cfar})$ are different from each other.

That is, when the output of first Doppler analyzer 210 is used as a phase reference, the phase rotation amount for noc-th Doppler analyzer 210 is $2\pi(noc-1)\Delta f \times (2R(f_{b\_cfar})/C_o)$. Center frequency change correction vector $\zeta(f_{b\_cfar})$ indicated in equation 51 is derived so as to compensate for such a phase rotation. Here, noc=1, . . . , Loc.

Thus, in a case where center frequencies fc of chirp signals are periodically changed over a plurality of chirp transmission periods within code transmission periods (Loc×Tr), the periods for switching between Doppler analyzers 210 for each code element match the timings at which center frequencies fc of chirp signals are changed in a round. Accordingly, aliasing determiner 212d can easily perform phase correction in demultiplexing processing of a code-multiplexed signal by using an unused code.

As described above, aliasing determiner 212d may calculate received power DeMulUnCode$_{nuc}$(f$_{b\_cfar}$, f$_{s\_cfar}$, DR) after code demultiplexing using unused orthogonal code UnCode$_{nuc}$ as in equation 52 instead of equation 12.

[74]

$$DeMulUnCode_{nuc}(f_{b\_cfar}, f_{s\_cfar}, DR) = \sum_{z=1}^{Na} |(UnCode_{nuc})^* \cdot \{\beta(DR) \otimes \zeta(f_{s\_cfar}) \otimes \alpha(f_{s\_cfar}) \otimes VFTALL_z(f_{b\_cfar}, f_{s\_cfar})\}^T|^2$$

(Equation 52)

Equation 52 uses

[75]

$$\zeta(f_{s\_cfar}) \otimes \alpha(f_{s\_cfar})$$

instead of $\alpha(f_{s\_cfar})$ in equation 12. Here, nuc=1, . . . , N$_{allcode}$−N$_{CM}$. Further, DR is the index indicating the Doppler aliasing range, and takes an integer value in the range of DR=ceil[−Loc/2], ceil[−Loc/2]+1, . . . , 0, . . . , ceil[Loc/2]−1.

Further, equation 53 may be used instead of equation 29.

[76]

$$DeMulUnCode_{nuc}(f_{b\_cfar}, f_{s\_cfar}, DR) = \sum_{z=1}^{Na} |(\beta(DR) \otimes UnCode_{nuc})^* \cdot \{\zeta(f_{s\_cfar}) \otimes \alpha(f_{s\_cfar}) \otimes VFTALL_z(f_{b\_cfar}, f_{s\_cfar})\}^T|^2.$$

(Equation 53)

Next, an operation example of code demultiplexer 213d in Variation 2 of Embodiment 2 will be described. For the same reason as that in the description of the operation example of aliasing determiner 212d in Variation 2 of Embodiment 2 described above, code demultiplexer 213d uses DR$_{min}$, which is a result of aliasing determination in aliasing determiner 212d, to perform code demultiplexing processing on Doppler components VFTALL$_z$(f$_{b\_cfar}$, f$_{s\_cfar}$) that are the outputs of Doppler analyzers 210 corresponding to distance indexes f$_{b\_cfar}$ and Doppler frequency indexes f$_{s\_cfar}$ extracted in CFAR section 211 by using equation 54 instead of equation 30.

[77]

$$DeMUL_z^{ncm}(f_{b\_cfar}, f_{s\_cfar}) = (Code_{ncm})^* \cdot \{\beta(DR\min) \otimes \zeta(f_{s\_cfar}) \otimes \alpha(f_{s\_cfar}) \otimes VFTALL_z(f_{b\_cfar}, f_{s\_cfar})\}^T$$

(Equation 54)

Equation 54 is an example in which

[78]

$$\zeta(f_{s\_cfar}) \otimes \alpha(f_{s\_cfar})$$

is used instead of a (f$_{s\_cfar}$) in equation 30.

Further, code demultiplexer 213d may also use aliasing determination result DR$_{min}$ in aliasing determiner 212d to perform demultiplexing processing of a code-multiplexed signal on Doppler components VFTALL$_z$(f$_{b\_cfar}$, f$_{s\_cfar}$) that are the outputs of Doppler analyzers 210 corresponding to distance indexes f$_{b\_cfar}$ and Doppler frequency indexes f$_{s\_cfar}$ extracted in CFAR section 211 by using equation 55 instead of equation 31.

[79]

$$DeMUL_z^{ncm}(f_{b\_cfar}, f_{s\_cfar}) = (\beta(DR\min) \otimes Code_{ncm})^* \cdot \{\zeta(f_{s\_cfar}) \otimes \alpha(f_{s\_cfar}) \otimes VFTALL_z(f_{b\_cfar}, f_{s\_cfar})\}^T$$

(Equation 55)

Note that, in equation 55, the term

[80]

$$\beta(DR) \otimes Code_{ncm}$$

does not depend on index f$_s$ of a Doppler component so that it is possible to reduce the arithmetic amount in code demultiplexer 213d by pre-tabulation.

As described above, by periodically changing center frequencies fc of chirp signals over a plurality of chirp transmission periods within code transmission periods (Loc×Tr), code demultiplexer 213d can cause the periods for switching between Doppler analyzers 210 for each code element to match the timings at which center frequencies fc of chirp signals are changed in a round and can easily perform phase correction in demultiplexing processing of a code-multiplexed signal.

Next, an operation example of direction estimator 214d in Variation 2 of Embodiment 2 will be described.

For example, direction estimator 214d may calculate Doppler frequency index f$_{es\_cfar}$ in accordance with equation 56 based on Doppler frequency index f$_{s\_cfar}$ and DR$_{min}$ that is a determination result of aliasing determiner 212d.

[81]

$$f_{es\_cfar} = f_{s\_cfar} + DR_{min} \times Ncode$$

(Equation 56)

Note that, Doppler frequency index f$_{es\_cfar}$ corresponds, for example, to the Doppler index in a case where the FFT size of Doppler analyzer 210 is extended to Loc×Ncode. Hereinafter, f$_{es\_cfar}$ is referred to as "extended Doppler frequency index". Note that, the Doppler range is assumed to be up to ±1/(2×Tr), and the range of extended Doppler frequency index f$_{es\_cfar}$ corresponding to the above Doppler range is −Loc×Ncode/2≤f$_{es\_cfar}$<Loc×Ncode/2. Thus, as a result of calculation of equation 56, f$_{es\_cfar}$+Loc×Ncode is f$_{es\_cfar}$ in a case where f$_{es\_cfar}$<−Loc×Ncode/2, and further f$_{es\_cfar}$−Loc×Ncode is f$_{es\_cfar}$ in a case where f$_{es\_cfar}$≥Loc×Ncode/2.

Note that, for example, direction estimator 214d may use extended Doppler frequency index f$_{es\_cfar}$ to output Doppler velocity information of a target detected by using equation 57.

[82]

$$v_d(f_{es\_cfar}) = \frac{C_0}{2f_0}\left(\frac{f_{es\_cfar}}{Loc \times Ncode \times T_r}\right) \quad \text{(Equation 57)}$$

As described above, in Variation 2, radar apparatus 10d periodically changes center frequencies fc of chirp signals over a plurality of transmission periods. In this case, radar apparatus 10d causes the timings, at which center frequencies fc of chirp signals are changed in a round, to match the code transmission periods (Loc×Tr). Note that, radar apparatus 10d (for example, MIMO radar) may apply code multiplexing transmission. Further, as in Embodiment 1, radar apparatus 10d can perform Doppler aliasing determination by using the output (in other words, a reception signal) of Doppler analyzer 210 for each code element of a code-multiplexed signal, and an unused orthogonal code.

Further, according to Variation 2, in the same manner as in Embodiment 1, radar apparatus 10d is capable of setting the Doppler range detectable without ambiguity to ±1/(Tr) and suppressing mutual interference between code-multiplexed signals to approximately a noise level by performing Doppler phase correction including aliasing during code demultiplexing. Thus, Variation 2 makes it possible to suppress deterioration of radar detection performance and perform code multiplexing transmission by a MIMO radar.

Further, according to Variation 2, the timings at which center frequencies fc of chirp signals are changed in a round are caused to be the code transmission periods (Loc×Tr) and therefore match the periods for switching between Doppler analyzers 210 for each code element (that is, the transmission periods of codes used for code multiplexing) so that demultiplexing processing of a code-multiplexed signal using an unused code in aliasing determiner 212d and phase correction in code demultiplexing processing in code demultiplexer 213d can be easily performed.

Note that, according to Variation 2, the timings at which center frequencies fc of chirp signals are changed in a round are caused to be the code transmission period (Loc×Tr), but may be caused to be (divisor of Loc×Tr). In a case where the timings at which center frequencies fc of chirp signals are changed in a round are the periods with (divisor & of Loc×Tr), that is, & transmission periods (ε×Tr), equation 58 may be used as center frequency change correction vector $\zeta(f_{b\_cfar})$.

[83]

$$\zeta(f_{b\_cfar}) = \quad \text{(Equation 58)}$$
$$\left[1, \exp\left[-j2\pi\text{mod}(1,\varepsilon)\Delta f \frac{2R(f_{b\_cfar})}{C_0}\right],\right.$$
$$\exp\left[-j2\pi\text{mod}(2,\varepsilon)\Delta f \frac{2R(f_{b\_cfar})}{C_0}\right], \ldots,$$
$$\left.\exp\left[-j2\pi\text{mod}(Loc-1,\varepsilon)\Delta f \frac{2R(f_{b\_cfar})}{C_0}\right]\right]$$

With the above, the same effect as in Variation 1 described above can be obtained. Here, ε indicates a divisor of Loc and ε>1.

Note that, according to Variation 2, radar transmission signals are used for which center frequencies fc of chirp signals are changed by an integer multiple of Δf, such as $f_0$, $f_0+\Delta f$, ..., $f_0+(Loc-1)\Delta f$, for each transmission period Tr at code transmission periods (Loc ×Tr). However, the present disclosure is not limited thereto, and center frequencies fc may be changed by any frequency.

For example, radar transmission signals may be used for which center frequencies fc of chirp signals are changed by $f_0$, $f_0+\Delta f_1$, $f_0+\Delta f_2$, ..., $f_0+\Delta f_{Loc-1}$ for each transmission period Tr at code transmission periods (Loc×Tr). Here, $\Delta f_1$, $\Delta f_2$, ..., $\Delta f_{Loc-1}$ are variable frequency values of center frequencies fc of chirp signals in respective transmission periods Tr at code transmission periods (Loc×Tr). In this case, equation 59 is used as center frequency change correction vector $\zeta(f_{b\_cfar})$.

[84]

$$\zeta(f_{b\_cfar}) = \left[1, \exp\left[-j2\pi\Delta f_1 \frac{2R(f_{b\_cfar})}{C_0}, \right.\right. \quad \text{(Equation 59)}$$
$$\exp\left[-j2\pi\Delta f_2 \frac{2R(f_{b\_cfar})}{C_0}\right], \ldots, \exp\left[-j2\pi\Delta f_{Loc-1} \frac{2R(f_{b\_cfar})}{C_0}\right]\right]$$

With the above, the same effect as in Variation 1 described above can be obtained.

An exemplary embodiment according to the present disclosure has been described above.

(Other Variation 1)

The transmission antenna of the radar apparatus described above may have a sub-array configuration. For example, the radar apparatus may perform Doppler multiplex transmission in which sub-array beamforming (sub-array BF) and code multiplexing transmission are used in combination.

Transmission directional gain can be improved by using a combination of some transmission antennas as a sub-array to narrow the beam width of a transmission directional beam pattern. This narrows the detectable angular range, but increases the detectable distance range. Further, variable control of beam directions can be performed by causing a beam weight factor for generating directional beams to be variable.

Figure 14:
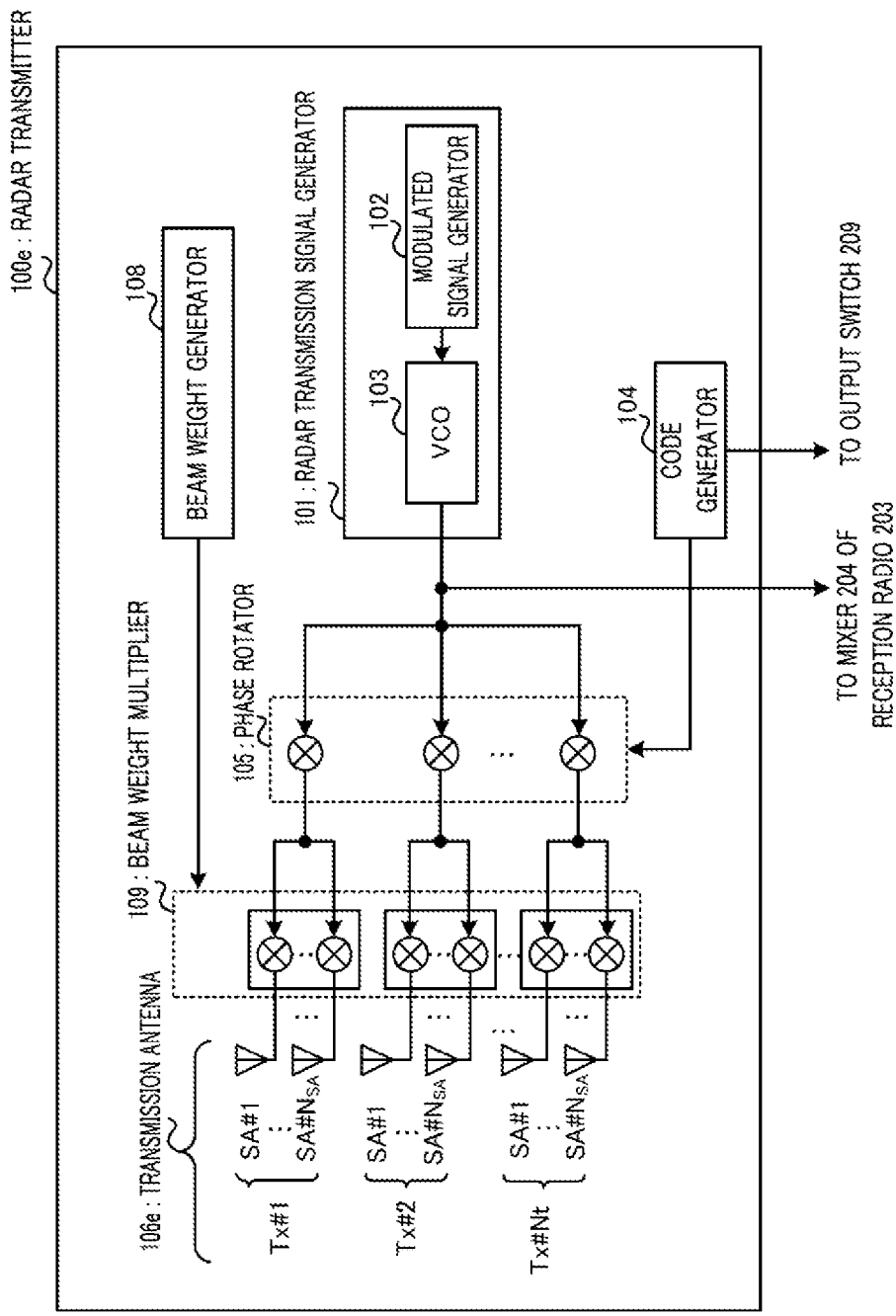
FIG. 14 illustrates a configuration example of a radar transmitter according to other Variation 1.

FIG. 14 is a block diagram illustrating a configuration example of radar transmitter 100e according to the present variation. Note that, in FIG. 14, configurations that perform the same operations as those in radar transmitter 100 illustrated in FIG. 1 are denoted with the same reference signs and descriptions thereof will be omitted. Further, the radar receiver according to the present variation has the same basic configuration as that of radar receiver 200 illustrated in FIG. 1, for example, and therefore will be described with reference to FIG. 1.

Radar transmitter 100e illustrated in FIG. 14 includes, on a side of the output of phase rotator 105, a plurality of transmission antennas 106e for which transmission phase control can be performed.

For example, sub-arrays SA #1 to SA #$N_{SA}$ (for example, Nt sub-arrays) each of which uses $N_{SA}$ transmission antennas 106e are configured for the respective outputs of Nt phase rotators 105. Note that, the sub-array configuration of transmission antennas 106e is not limited to that in the example illustrated in FIG. 14. For example, the number (in other words, $N_{SA}$) of transmission antennas included in a sub-array for the output of each phase rotator 105 may not be the same and may differ among phase rotators 105. Here, $N_{SA}$ is an integer larger than or equal to one. Note that, in a case where $N_{SA}=1$, the same configuration as in FIG. 1 is provided.

In FIG. 14, beam weight generator 108 generates a beam weight for directing the main beam direction of transmission beams in a predetermined direction by using sub-arrays. For example, the transmission beam direction in a case where sub-arrays each using $N_{SA}$ transmission antennas are arranged along a straight line at element spacing ds is represented by $\theta_{TxBF}$. In this case, for example, beam weight generator 108 generates beam weight $W_{Tx}$(Index_TxSubArray, $\theta_{TxBF}$) as in following equation 60.

[85]

$$W_{Tx}(\text{Index\_TxSubArray}, \theta_{TxBF}) = \begin{bmatrix} 1 \\ \exp(j2\pi d_{SA}\sin\theta_{TxBF}/\lambda) \\ \vdots \\ \exp[j2\pi(\text{Index\_TxSubArray}-1)d_{SA}\sin\theta_{TxBF}/\lambda] \end{bmatrix} \quad \text{(Equation 60)}$$

Here, Index_TxSubArray indicates the element index of a sub-array, and Index_TxSubArray=1, ..., $N_{SA}$. Further, $\lambda$ indicates the wavelength of a radar transmission signal, and $d_{SA}$ indicates the sub-array antenna spacing.

Each beam weight multiplier 109 multiplies the output of corresponding phase rotator 105 by beam weight factor $W_{Tx}$(Index_TxSubArray, $\theta_{TxBF}$) inputted from beam weight generator 108. Transmission signals obtained by the multiplication by beam weight $W_{Tx}$(Index_TxSubArray, $\theta_{TxBF}$) are transmitted from $N_{SA}$ sub-array antennas. Here, Index_TxSubArray=1, ..., $N_{SA}$.

With respect to subsequent operations, for example, the same effect as in Embodiment 1 or 2 can be obtained by replacing transmission antennas 106 (for example, Tx #1 to Nt) in Embodiment 1 with transmission antennas 106e (for example, transmission sub-array antennas Tx #1 to Nt) illustrated in FIG. 14 and performing the same operations.

With the operation described above, radar transmitter 100e can transmit code-multiplexed radar transmission signals such that transmission directional beams can be directed in a predetermined direction by using sub-arrays. Thus, it is possible to improve transmission directional gain in a predetermined direction and extend the detectable distance range. Further, radar transmitter 100e can perform variable control of beam direction by variably configuring a beam weight factor for generating transmission directional beams.

Figure 15:
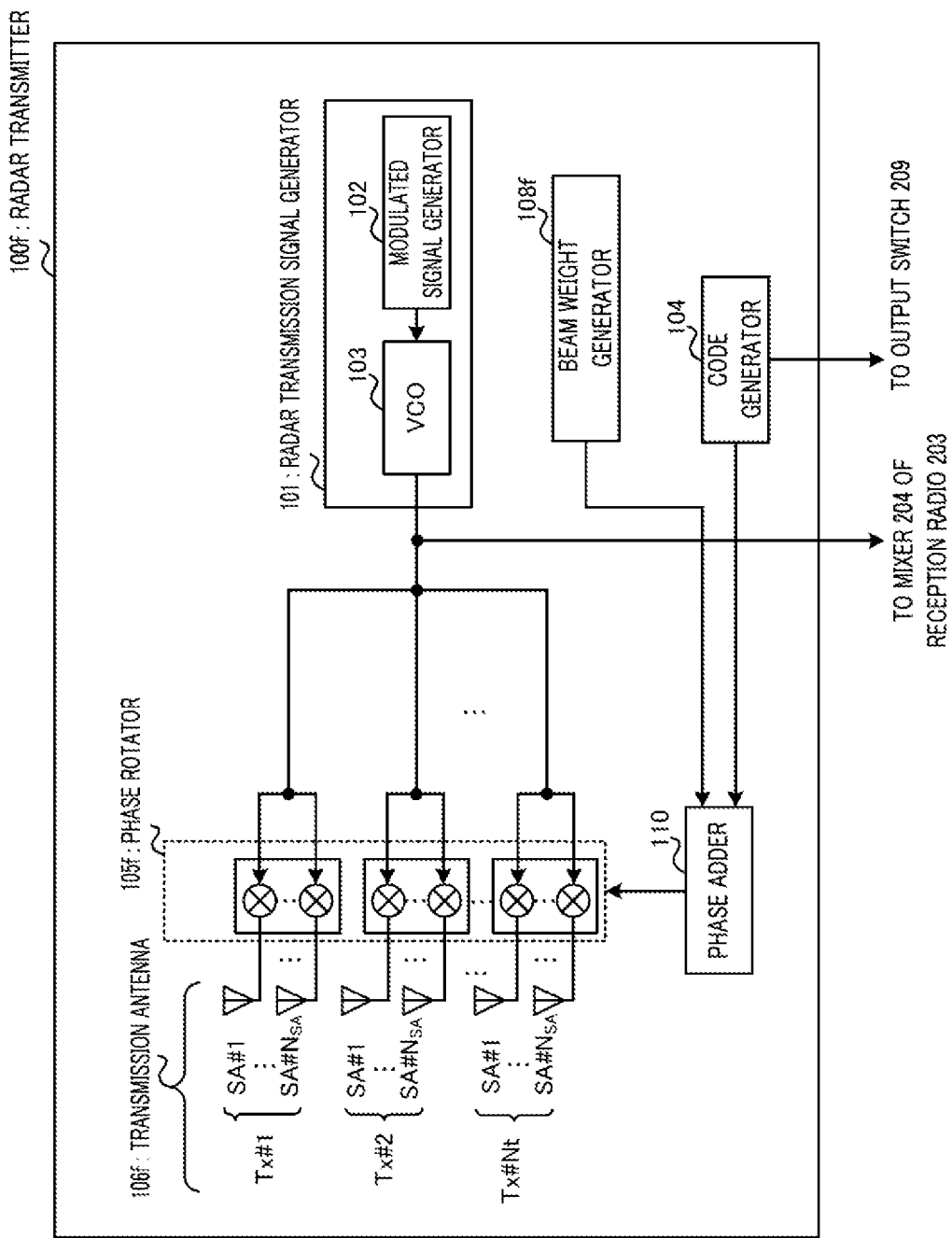
FIG. 15 illustrates a configuration example of a radar transmitter according to other Variation 1.

Note that, although FIG. 14 indicates a configuration in which phase rotation by phase rotator 105 and beam weight multiplication by beam weight multiplier 109 are separately performed, the present disclosure is not limited to the above configuration. For example, it may also be configured such that phase rotation corresponding to the beam weight multiplication by beam weight multiplier 109 is included in phase rotator 105. FIG. 15 is a block diagram illustrating a configuration example of radar transmitter 100f having the above-mentioned configuration.

In radar transmitter 100f illustrated in FIG. 15, phase adder 110 adds phase rotation for each of sub-arrays SA #1 to SA #$N_{SA}$ outputted from beam weight generator 108f and a phase rotation amount outputted from code generator 104, and outputs the result to phase rotator 105f.

For example, phase adder 110 adds phase rotation amount $\psi_{ncm}(m)$, which is outputted from code generator 104 for each transmission period Tr and is applied to ncm-th transmission antenna Tx #ncm, and phase rotation angle ($W_{Tx}$(Index_TxSubArray, $\theta_{TxBF}$)) for each of sub-arrays SA #1 to SA #NsA forming nem-th transmission antenna Tx #ncm, which is outputted from beam weight generator 108f. Then, phase adder 110 outputs the added value ($\psi_{ncm}(m)$+angle ($W_{Tx}$ (Index_TxSubArray, $\theta_{TxBF}$)) to $N_{SA}$ phase rotators 105f (for example, phase shifters) connected to transmission antenna Tx #ncm.

Each phase rotator 105f applies, based on the output from phase adder 110, phase rotation to chirp signals outputted from radar transmission signal generator 101 for each transmission period Tr. Here, ncm=1, ..., $N_{CM}$, and m=1, ..., $N_c$.

Note that, the configuration for performing sub-array transmission described in the present variation is not limited to the configuration of Embodiment 1 (for example, FIG. 1), for example, but is also applicable to other variations or embodiments (for example, FIG. 4, 8, 10 or 12). For example, the configuration of radar transmitter 100e or 100f illustrated in FIGS. 14 and 15 may be applied to radar apparatuses 10a, 10b, 10c, and 10d.

(Other Variation 2)

In the embodiments described above, a case where Walsh-Hadamard codes are used as the codes generated in code generators 104, 104c, and 104d has been described, but the codes are not limited to Walsh-Hadamard codes and may be other codes.

For example, orthogonal M-sequence codes or pseudo-orthogonal codes may be used as orthogonal codes generated in code generators 104, 104c, and 104d. Hereinafter, operation examples in a case where orthogonal M-sequence codes and pseudo-orthogonal codes are used will be described.

<Orthogonal M-Sequence Code>

The orthogonal M-sequence code is, for example, a code sequence in which code elements are added after a sequence generated from an M sequence such that the number of code elements "1" and the number of code elements "−1" are the same (in other words, in equilibrium) (for example, see NPL 5). Further, since codes including the above-described code elements and codes in which every code element is "1" are in an orthogonal relation to each other, a case where orthogonal M-sequence codes also include codes in which every code element is 1 will be described below.

As an example, an orthogonal M-sequence code with a code length of 4 includes the following codes.

| $OMS_4(1) = [1$ | 1 | −1 | −1] |
| $OMS_4(2) = [−1$ | 1 | 1 | −1] |
| $OMS_4(3) = [1$ | −1 | 1 | −1] |
| $OMS_4(4) = [1$ | 1 | 1 | 1] |

Here, the orthogonal M-sequence code with code length Loc is indicated as $OMS_{Loc}$(nomc), where nomc represents the code index included in the orthogonal M-sequence code with code length Loc, and nomc=1, ..., Loc.

For example, $OMS_4(1)$ and $OMS_4(2)$ are a set of codes with identical odd-numbered code elements and code-inverted even-numbered code elements. For example, in a case where the number ($N_{allcode}-N_{CM}$) of unused orthogonal codes is larger than or equal to two, code generator 104, 104c or 104d may select codes such that a set of codes having a relation as in $OMS_4(1)$ and $OMS_4(2)$ is not included in the unused orthogonal codes. Such code selection allows, for example, Doppler frequency aliasing determination in aliasing determiner 212 of radar receiver 200.

In the same manner, $OMS_4(3)$ and $OMS_4(4)$ are a set of codes with identical odd-numbered code elements and code-inverted even-numbered code elements. For example, in a case where the number ($N_{allcode}-N_{CM}$) of unused orthogonal codes is larger than or equal to two, code generator 104, 104c or 104d may select codes such that a set of codes having a relation as in $OMS_4(3)$ and $OMS_4(4)$ is not included in the unused orthogonal codes. Such code selection allows, for example, Doppler frequency aliasing determination in aliasing determiner 212 of radar receiver 200.

Note that, the code length of an orthogonal M-sequence code is not limited to code length Loc=4, but may be any other code length. For example, an orthogonal M-sequence code with code length Loc=8 includes the following codes.

|  |  |  |  |  |  |  |  |  |
|---|---|---|---|---|---|---|---|---|
| $OMS_4(1)$ = [−1 | 1 | −1 | −1 | 1 | 1 | 1 | −1] |
| $OMS_4(2)$ = [ 1 | −1 | 1 | −1 | −1 | 1 | 1 | −1] |
| $OMS_4(3)$ = [ 1 | 1 | −1 | 1 | −1 | −1 | 1 | −1] |
| $OMS_4(4)$ = [ 1 | 1 | 1 | −1 | 1 | −1 | −1 | −1] |
| $OMS_4(5)$ = [−1 | 1 | 1 | 1 | −1 | 1 | −1 | −1] |
| $OMS_4(6)$ = [−1 | −1 | 1 | 1 | 1 | −1 | 1 | −1] |
| $OMS_4(7)$ = [ 1 | −1 | −1 | 1 | 1 | 1 | −1 | −1] |
| $OMS_4(8)$ − [ 1 | 1 | 1 | 1 | 1 | 1 | 1 | 1]. |

For example, code length Loc of code number Ncm of orthogonal M-sequence codes may be indicated by following equation 61.

[86]

$$Loc \geq 2^{ceil[log2(N_{CM}+1)]} \quad \text{(Equation 61)}$$

Here, ceil[x] is an operator (ceiling function) that outputs the minimum integer larger than or equal to real number x.

For example, code generator 104, 104c or 104d configures, as codes for code multiplexing transmission, Ncm orthogonal codes among $N_{allcode}$ (Loc) codes included in orthogonal M-sequence codes with code length Loc. For example, in the case of orthogonal M-sequence codes, the relation of $N_{allcode}(Loc)=Loc$ holds. For example, since orthogonal M-sequence codes with code length Loc=4, 8, or 16 include 4, 8, or 16 orthogonal codes, respectively, $N_{allcode}(4)=4$, $N_{allcode}(8)=8$, and $N_{allcode}(16)=16$.

<Pseudo-Orthogonal Code>

For example, in Embodiment 1, in a case where an orthogonal code is used in code demultiplexer 213 (for example, FIG. 1), code demultiplexer 213 demultiplexes a code-multiplexed signal by using orthogonal code $Code_{ncm}$ used for code multiplexing transmission. On the other hand, a case where a pseudo-orthogonal code is used differs from the case where an orthogonal code is used in that code demultiplexer 213 demultiplexes a code-multiplexed signal by using inversion code "$InvCode_{ncm}$" for code demultiplexing in contrast to orthogonal code $Code_{ncm}$ used for code multiplexing transmission.

Further, for example, in Embodiment 1, in a case where an orthogonal code is used in aliasing determiner 212 (for example, FIG. 1), aliasing determiner 212 performs aliasing determination by using unused orthogonal code $UnCode_{nuc}$. On the other hand, a case where a pseudo-orthogonal code is used differs from the case where an orthogonal code is used in that aliasing determiner 212 performs aliasing determination by using inversion code "InvUnCodenuc" for demultiplaxing unused pseudo-orthogonal code $UnCode_{nuc}$, for example.

Note that, inversion code $InvCode_{ncm}$ is a code derived from a pseudo-orthogonal code.

Hereinafter, operations of aliasing determiner 212 and code demultiplexer 213 according to the present variation, which differ from those in Embodiment 1, will be described as an example.

For example, code generator 104 configures, as codes for code multiplexing transmission, $N_{CM}$ pseudo-orthogonal codes among $N_{allcode}$ pseudo-orthogonal codes included in pseudo-orthogonal code sequences with code length Loc (in other words, code sequences in an orthogonal relation to the corresponding inversion codes).

For example, code multiplexing number Ncm is less than the number $N_{allcode}$ of pseudo-orthogonal codes, and $N_{CM}<N_{allcode}$. In other words, code length Loc of a pseudo-orthogonal code is larger than code multiplexing number $N_{CM}$. For example, Ncm pseudo-orthogonal codes with code length Loc are represented by $Code_{ncm}=[OC_{ncm}(1), OC_{ncm}(2), \ldots OC_{ncm}(Loc)]$.

Note that, code length Loc of the pseudo-orthogonal code is not limited to a power of two, but may be any code length. Accordingly, for example, code length Loc of a pseudo-orthogonal code may be a value obtained by adding one to code multiplexing number $N_{CM}$ ($Loc=N_{CM}+1$). In this case, for example, $N_{allcode}=N_{CM}+1$, and a pseudo-orthogonal code sequence with code length $Loc=N_{allcode}$ may be generated.

Hereinafter, a case where one or some of Walsh-Hadamard codes with code length Loc

[87]

$$2^{ceil[log2(N_{CM}+1)]}$$

is/are used for generating pseudo-orthogonal code sequences of number Ncm of codes will be described as an example, although the method of generating pseudo-orthogonal code sequences is not limited thereto.

As an example, a case where code multiplexing number $N_{CM}=4$ and one or some of Walsh-Hadamard codes with a code length of 8 is/are used for generating a pseudo-orthogonal matrix with code length Loc=5 with $N_{allcode}=N_{CM}+1=5$ will be described.

For example, code generator 104 may generate following pseudo-orthogonal codes $PWH_5(1)$ to $PWH_5(5)$ by using 5 (=Loc) code elements of Walsh-Hadamard codes with a code length of 8 (for example, each first code element to each fifth code element: $WH_8(1)$ to $WH_8(5)$).

|  |  |  |  |  |  |
|---|---|---|---|---|---|
| $PWH_5(1)$ = [1 | 1 | 1 | 1 | 1] |
| $PWH_5(2)$ = [1 | −1 | 1 | −1 | 1] |
| $PWH_5(3)$ = [1 | 1 | −1 | −1 | 1] |
| $PWH_5(4)$ = [1 | −1 | −1 | 1 | 1] |
| $PWH_5(5)$ = [1 | 1 | 1 | 1 | −1] |

For example, inversion code matrix "InvPOC" with respect to code matrix "POC" with pseudo-orthogonal codes $PWH_5(1)$ to $PWH_5(5)$ as row elements may be derived according to following equation 62.

[88]

$$InvPOC = POC^H(POC^H POC)^{-1} \quad \text{(Equation 62)}$$

where character superscript H is a complex conjugate transpose operator.

For example, POC formed of pseudo-orthogonal codes $PWH_5(1)$ to $PWH_5(5)$ described above is a code matrix indicated by following equation 63.

[89]
$$POC = \begin{pmatrix} PWH_5(1) \\ PWH_5(2) \\ PWH_5(3) \\ PWH_5(4) \\ PWH_5(5) \end{pmatrix} = \begin{pmatrix} 1 & 1 & 1 & 1 & 1 \\ 1 & -1 & 1 & -1 & 1 \\ 1 & 1 & -1 & -1 & 1 \\ 1 & -1 & -1 & 1 & 1 \\ 1 & 1 & 1 & 1 & -1 \end{pmatrix} \quad \text{(Equation 63)}$$

Further, inversion code matrix InvPOC with respect to code matrix POC indicated by equation 63 is calculated as in following equation 64, for example.

[90]
$$InvPOC = \frac{1}{4}\begin{pmatrix} -1 & 1 & 1 & 1 & 2 \\ 1 & -1 & 1 & -1 & 0 \\ 1 & 1 & -1 & -1 & 0 \\ 1 & -1 & -1 & 1 & 0 \\ 2 & 0 & 0 & 0 & -2 \end{pmatrix} = \begin{pmatrix} InvPWH_5(1) \\ InvPWH_5(2) \\ InvPWH_5(3) \\ InvPWH_5(4) \\ InvPWH_5(5) \end{pmatrix} \quad \text{(Equation 64)}$$

Note that, each row of inversion code matrix InvPOC is indicated as inversion codes $InvPWH_5(1)$ to $InvPWH_5(5)$.

Here, pseudo-orthogonal code $PWH_5$ (npoc1) and inversion code $InvPWH_5$ (npoc2) have a relation as in following equation 65.

[91]
$$InvPWH_{Loc}(npoc2)^H \cdot PWH_{Loc}(npoc1) = \begin{cases} 1, & \text{if } npoc1 = npoc2 \\ 0, & \text{if } npoc1 \neq npoc2 \end{cases} \quad \text{(Equation 65)}$$

where npoc represents the code index included in a pseudo-orthogonal code or an inversion code. For example, npoc1=1, ..., Loc, and npoc2=1, ..., Loc. Further, npoc1 indicates, for example, code index npoc1 of pseudo-orthogonal code $PWH_5$, and npoc2 indicates, for example, code index npoc2 of inversion code $InvPWH_5$.

For example, codes for code multiplexing transmission with code multiplexing number $N_{CM}=4$ with respect to pseudo-orthogonal code $PWH_5$(npoc) generated in code generator 104 are referred to as $Code_1=PWH_5(1)$, $Code_2=PWH_5(2)$, $Code_3=PWH_5(3)$, and $Code_4=PWH_5(4)$. In this case, an unused pseudo-orthogonal code is $UnCode_1=PWH_5(5)$, and an inversion code with respect to unused pseudo-orthogonal code $UnCode_1$ is $InvUnCode_1=InvPWH_5(5)$.

For example, in a case where the number $(N_{allcode}-N_{CM})$ of unused pseudo-orthogonal codes is larger than or equal to two, code generator 104 may select codes such that, among inversion codes with respect to pseudo-orthogonal codes with code length Loc, a set of codes in which the odd-numbered code elements are identical between the inversion codes and the even-numbered code elements are code-inverted between the inversion codes is not included in the unused pseudo-orthogonal codes. Such unused pseudo-orthogonal code selection makes it possible to improve Doppler frequency aliasing determination accuracy in aliasing determiner 212 of radar receiver 200.

Note that, among inversion codes with respect to pseudo-orthogonal codes with code length Loc, a set of codes in which the odd-numbered code elements are identical between the inversion codes and the even-numbered code elements are code-inverted between the inversion codes has a relation in which the odd-numbered code elements are identical between the codes and the even-numbered code elements are code-inverted between the codes. For this reason, in a case where the number $(N_{allcode}-N_{CM})$ of unused pseudo-orthogonal codes is larger than or equal to two, code generator 104 may select codes such that, among pseudo-orthogonal codes with code length Loc, a set of codes in which the odd-numbered code elements are identical between the codes and the even-numbered code elements are code-inverted between the codes is not included in the unused pseudo-orthogonal codes. Such unused pseudo-orthogonal code selection makes it possible to improve Doppler frequency aliasing determination accuracy in aliasing determiner 212 of radar receiver 200.

As another example, a case where code multiplexing number $N_{CM}=4$ and one or some of Walsh-Hadamard codes with a code length of 8 is/are used for generating a pseudo-orthogonal matrix with code length Loc=6 with $N_{allcode}=N_{CM}+2=6$ will be described.

For example, code generator 104 may generate following pseudo-orthogonal codes $PWH_6(1)$ to $PWH_6(6)$ by using 6 (=Loc) code elements of Walsh-Hadamard codes with a code length of 8 (for example, each first code element to each sixth code element: $WH_8(1)$ to $WHR_8(6)$).

$PWH_6(1) = [1 \quad 1 \quad 1 \quad 1 \quad 1 \quad 1]$
$PWH_6(2) = [1 \quad -1 \quad 1 \quad -1 \quad 1 \quad -1]$
$PWH_6(3) = [1 \quad 1 \quad -1 \quad -1 \quad 1 \quad 1]$
$PWH_6(4) = [1 \quad -1 \quad -1 \quad 1 \quad 1 \quad -1]$
$PWH_6(5) = [1 \quad 1 \quad 1 \quad 1 \quad -1 \quad -1]$
$PWH_6(6) = [1 \quad -1 \quad 1 \quad -1 \quad -1 \quad 1]$ For example, inversion codes $InvPWH_6(1)$ to $InvPWH_6(6)$ with respect to pseudo-orthogonal codes $PWH_6(1)$ to $PWH_6(6)$ may be calculated as follows. Here, the inversion code with respect to pseudo-orthogonal code $PWH_6$(npoc) is $InvPWH_6$(npoc) where npoc=1, ..., Loc.

$InvPWH_6(1) = 0.25 \times [0 \quad 0 \quad 1 \quad 1 \quad 1 \quad 1]$
$InvPWH_6(2) = 0.25 \times [0 \quad 0 \quad 1 \quad -1 \quad 1 \quad -1]$
$InvPWH_6(3) = 0.25 \times [1 \quad 1 \quad -1 \quad -1 \quad 0 \quad 0]$
$InvPWH_6(4) = 0.25 \times [1 \quad -1 \quad -1 \quad 1 \quad 0 \quad 0]$
$InvPWH_6(5) = 0.25 \times [1 \quad 1 \quad 0 \quad 0 \quad -1 \quad -1]$
$InvPWH_6(6) = 0.25 \times [1 \quad -1 \quad 0 \quad 0 \quad -1 \quad 1]$.

Here, among inversion codes, $InvPWH_6(1)$ and $InvPWH_6(2)$ are a set of inversion codes in which the odd-numbered code elements are identical between the codes and the even-numbered code elements are code-inverted between the codes (except for those in which the code element is 0). Further, codes PWH6(1) and PWH6(2) corresponding to $InvPWH_6(1)$ and $InvPWH_6(2)$, respectively, are also a set of codes in which the odd-numbered code elements are identical between the codes and the even-numbered code elements are code-inverted between the codes.

In the same manner, each of a set of $InvPWH_6(3)$ and $InvPWH_6(4)$ and a set of $InvPWH_6(5)$ and $InvPWH_6(6)$ is also a set of inversion codes in the same relation to the set of $InvPWH_6(1)$ and $InvPWH_6(2)$. Further, with respect to the set of $InvPWH_6(3)$ and $InvPWH_6(4)$ and the set of $InvPWH_6(5)$ and $InvPWH_6(6)$, each set of codes corresponding to the set of $InvPWH_6(1)$ and $InvPWH_6(2)$, that is, each of a set of $PWH_6(3)$ and $PWH_6(4)$ and a set of $PWH_6(5)$ and $PWH_6(6)$ is also a set of codes in the same relation to the set of $PWH_6(1)$ and $PWH_6(2)$.

For example, in a case where the number $(N_{allcode} - N_{CM})$ of unused pseudo-orthogonal codes is larger than or equal to two, radar apparatus 10 may select codes such that pseudo-orthogonal codes corresponding to a set of inversion codes in such a relation are not included in the unused pseudo-orthogonal codes.

For example, a combination of codes for code multiplexing transmission (Code), $Code_2$, $Code_3$, and $Code_4$) may be, for example, a combination of $Code_1=PWH_6$ (1), $Code_2=PWH_6$ (3), $Code_3=PWH_6$ (5), and $Code_4=PWH_6$ (6). In this case, unused pseudo-orthogonal codes are, for example, $UnCode_1=PWH_6$ (2) and $UnCode_2=PWH_6$ (4). Note that, combinations of codes for code multiplexing transmission and unused pseudo-orthogonal codes are not limited thereto.

Next, an operation example of aliasing determiner 212 in a case where a pseudo-orthogonal code is used will be described.

Aliasing determiner 212 performs aliasing determination by using inversion codes corresponding to $(N_{allcode} - N_{CM})$ unused pseudo-orthogonal codes among pseudo-orthogonal codes with code length Loc, for example. The same operation as in Embodiment 1 is performed except that aliasing determiner 212 uses a pseudo-orthogonal code instead of an orthogonal code.

For example, aliasing determiner 212 corrects a phase change in Doppler components including aliasing based on the output of Doppler analyzer 210 in each antenna system processor 201 and calculates received power $DeMulUnCode_{nuc}(f_{b\_cfar}, f_{s\_cfar}, DR)$ after code demultiplexing using inversion code $InvUnCode_{nuc}$ corresponding to unused pseudo-orthogonal code $UnCode_{nuc}$ in accordance with following equation 66 instead of equation 12.

[92]

(Equation 66)

$$DeMulUnCode_{nuc}(f_{b\_cfar}, f_{s\_cfar}, DR) = \sum_{z=1}^{Na} |(InvUnCode_{nuc})^* \cdot \{\beta(DR) \otimes \alpha(f_{s\_cfar}) \otimes VFTALL_z(f_{b\_cfar}, f_{s\_cfar})\}^T|^2$$

In equation 66, the sum of the received powers after code demultiplexing using inversion code $InvUnCode_{nuc}$ corresponding to unused pseudo-orthogonal code $UnCode_{nuc}$ is calculated with respect to the outputs of Doppler analyzers 210 in all of antenna system processors 201 so that aliasing determination accuracy can be improved even in a case where the reception signal level is low. However, instead of equation 66, the received power after code demultiplexing using an inversion code corresponding to an unused pseudo-orthogonal code may be calculated with respect to the output(s) of Doppler analyzer(s) 210 in one or some of antenna system processors 201. Even in this case, it is possible to reduce the arithmetic processing amount while maintaining aliasing determination accuracy, for example, as long as the reception signal level is sufficiently high.

Note that, in equation 53, nuc=1, . . . , $N_{allcode}$–$N_{CM}$. Further, DR is the index indicating a Doppler aliasing range and, for example, takes an integer value in the range of DR=ceil[−Loc/2], ceil[−Loc/2]+1, . . . , 0, . . . , ceil[Loc/2]−1.

Further, in the same manner, a calculation equation for received power $DeMulUnCode_{nuc}(f_{b\_cfar}, f_{s\_cfar}, DR)$ after code demultiplexing using inversion code $InvUnCode_{nuc}$ corresponding to unused pseudo-orthogonal code $UnCode_{nuc}$ may be modified as in following equation 67 instead of equation 29.

[93]

[93]

(Equation 67)

$$DeMulUnCode_{nuc}(f_{b\_cfar}, f_{s\_cfar}, DR) = \sum_{z=1}^{Na} |(\beta(DR) \otimes InvUnCode_{nuc})^* \cdot \{\alpha(f_{s\_cfar}) \otimes VFTALL_z(f_{b\_cfar}, f_{s\_cfar})\}^T|^2$$

Next, an operation example of code demultiplexer 213 in a case where a pseudo-orthogonal code is used will be described.

Code demultiplexer 213 performs demultiplexing processing of a code-multiplexed signal based on a result of aliasing determination in aliasing determiner 212. For example, in demultiplexing processing of a code-multiplexed signal, code demultiplexer 213 code-demultiplexes a code-multiplexed signal by inversion code $InvCode_{ncm}$ corresponding to pseudo-orthogonal code $Code_{ncm}$ used for code multiplexing transmission.

For example, as in equation 68 instead of equation 30, code demultiplexer 213 performs, based on aliasing phase correction vector $\beta(DR_{min})$ using $DR_{min}$ that is a result of aliasing determination in aliasing determiner 212, code demultiplexing processing on Doppler components $VFTALL_z(f_{b\_cfar}, f_{s\_cfar})$ that are the outputs of Doppler analyzers 210 corresponding to distance indexes $f_{b\_cfar}$ and Doppler frequency indexes $f_{s\_cfar}$ extracted in CFAR section 211.

[94]

$$DeMUL_z^{ncm}(f_{b\_cfar}, f_{s\_cfar}) = (InvCode_{ncm})^* \cdot \{\beta(DR_{min}) \otimes \alpha(f_{s\_cfar}) \otimes VFTALL_z(f_{b\_cfar}, f_{s\_cfar})\}^T$$ (Equation 68)

Here, $DeMul_z^{ncm}(f_{b\_cfar}, f_{s\_cfar})$ is an output (for example, code demultiplexing result) resulting from code demultiplexing of a code-multiplexed signal by using inversion code $InvCode_{ncm}$ corresponding to pseudo-orthogonal code $Code_{ncm}$ with respect to the output of distance index $f_{b\_cfar}$ and Doppler frequency index $f_{s\_cfar}$ of Doppler analyzer 210 in z-th antenna system processor 201. Note that, z=1, . . . , Na, and ncm=1, . . . , $N_{CM}$.

Note that, code demultiplexer 213 may use following equation 69 instead of equation 68.

[95]

$$DeMUL_z^{ncm}(f_{b\_cfar}, f_{s\_cfar}) = (\beta(DR_{min}) \otimes InvCode_{ncm})^* \cdot \{\alpha(f_{s\_cfar}) \otimes VFTALL_z(f_{b\_cfar}, f_{s\_cfar})\}^T$$ (Equation 69)

In equation 69, the term

[96]

$\beta(DR) \otimes InvCode_{ncm}$ (where $DR=DR_{min}$ in equation 69) does not depend on index (for example, Doppler frequency index) $f_s$ of a Doppler component so that it is possible to reduce the arithmetic amount in code demultiplexer 213, for example, by pre-tabulation.

The operations of code generator 104, aliasing determiner 212, and code demultiplexer 213 which use an inversion code corresponding to a pseudo-orthogonal code as described above make it possible to obtain the same effect as in Embodiment 1 even in a case where a pseudo-orthogonal code is used.

Note that, the configuration using the codes described in the present variation is not limited to, for example, the configuration of Embodiment 1 (for example, FIG. 1), but can also be applied to other variations or embodiments (for example, FIG. 4, 8, 10 or 12). For example, the codes (for example, orthogonal M-sequence codes or pseudo-orthogonal codes) in the present variation may be applied instead of Walsh-Hadamard codes in radar apparatuses 10a, 10b, 10c and 10d.

(Other Variation 3)

For example, an operation of aliasing determiner 212 in a case where there is a plurality of targets having substantially equal reception levels for the same distance index $f_{b\_cfar}$, and the intervals of Doppler peaks of the plurality of targets match the intervals of Doppler aliasing will be described.

Here, since the Doppler frequencies may differ among a plurality of targets, the relative moving velocities between the targets and radar apparatus 10 may differ. Accordingly, radar apparatus 10 continuously performs radar observation so that even in a case where it is difficult to determine aliasing in radar positioning output at a certain point in time, it may be highly likely that the distance between the plurality of targets is differently measured in radar positioning output at a subsequent point in time.

Further, in order to more reliably demultiplex signals corresponding to the plurality of targets, for example, in a case where radar apparatus 10 continuously performs radar positioning, radar apparatus 10 may variably configure at least one of transmission period Tr and the code length of an orthogonal code (or a pseudo-orthogonal code) generated in code generator 104 for each radar positioning (for example, each of Nc transmission periods (Nc×Tr)).

For example, radar apparatus 10 may perform code multiplexing transmission by switching between code lengths of orthogonal codes (or pseudo-orthogonal codes) generated in code generator 104 for each radar positioning.

For example, Loc=$N_{CM}$+δ and radar apparatus 10 variably configures δ for each radar positioning so that the intervals of Doppler aliasing can be changed. At this time, for example, radar apparatus 10 may perform transmission by using an orthogonal code in a case where Loc is a power of two, and may perform transmission by using a pseudo-orthogonal code in a case where Loc is not a power of two. For example, δ may be periodically variably configured so as to be 1, 2, 1, 2, . . . for each radar positioning.

Alternatively, for example, radar apparatus 10 may perform code multiplexing transmission by switching between following (a) and (b) for each radar positioning to thereby switch between the code lengths and code types of codes for code multiplexing transmission. Thus, the intervals of Doppler aliasing can be changed.

(a): Code generator 104 uses, among Walsh-Hadamard codes or orthogonal M-sequence codes with a code length of

[97]

$$Loc=2^{ceil[log2(NCM+1)]},$$

Ncm orthogonal codes for code multiplexing transmission.

(b): Code generator 104 uses, among pseudo-orthogonal codes with code length Loc =$N_{CM}$+δ, $N_{CM}$ pseudo-orthogonal codes for code multiplexing transmission, where δ which is

[98]

$$Loc \neq 2^{ceil[log2(NCM+1)]}$$

is used.

Thus, for example, even in a case where the reception levels of Doppler peaks of a plurality of targets are subtantially equal and the intervals of the Doppler peaks match the intervals of Doppler aliasing in the same distance index $f_{b\_cfar}$, the possibility that the intervals of Doppler aliasing are different in other radar positioning (for example, a subsequent radar positioning) can be further increased. Thus, radar apparatus 10 can more reliably demultiplex signals corresponding to the plurality of targets.

Further, radar apparatus 10 can obtain an equivalent effect by, for example, variably configuring transmission period Tr for each radar positioning, which results in a change in the intervals of Doppler aliasing.

Note that, the configuration described in the present variation is, for example, not limited to the configuration of Embodiment 1 (for example, FIG. 1), but can also be applied to other variations or embodiments (for example, FIG. 4, 8, 10 or 12). For example, at least one configuration of transmission period Tr and code length Loc in the present variation may be applied in radar apparatuses 10a, 10b, 10c and 10d.

Other Variations 1 to 3 have been Described Above.

In a radar apparatus according to an exemplary embodiment of the present disclosure, a radar transmitter and a radar receiver may be individually disposed at physically remote places. Further, in a radar receiver according to an exemplary embodiment of the present disclosure, a direction estimator and other components may be individually disposed at physically remote places.

The radar apparatus according to an exemplary embodiment of the present disclosure includes, for example, a central processing unit (CPU), a storage medium such as a read only memory (ROM) that stores a control program, and a work memory such as a random access memory (RAM), which are not illustrated. In this case, the functions of the sections described above are implemented by the CPU executing the control program. However, the hardware configuration of the radar apparatus is not limited to that in this example. For example, the functional sections of the radar apparatus may be implemented as an integrated circuit (IC). Each functional section may be formed as an individual chip, or some or all of them may be formed into a single chip.

Various embodiments have been described with reference to the drawings hereinabove. Obviously, the present disclosure is not limited thereto examples. Obviously, a person skilled in the art would arrive variations and modification examples within a scope described in claims, and it is understood that these variations and modifications are within the technical scope of the present disclosure. Each constituent element of the above-mentioned embodiments may be combined optionally without departing from the spirit of the disclosure.

The expressions "section", "-er", "-or", and "-ar" used in the above-described embodiments may be replaced with other expressions such as "circuitry", "device", "unit", or "module".

The above embodiments have been described with an example of a configuration using hardware, but the present disclosure can be realized by software in cooperation with hardware.

Each functional block used in the description of each embodiment described above is typically realized by an LSI, which is an integrated circuit. The integrated circuit controls each functional block used in the description of the above embodiments and may include an input terminal and an output terminal. The LSI may be individually formed as chips, or one chip may be formed so as to include a part or all of the functional blocks. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

<Summary of the Present Disclosure>

A radar apparatus according to an exemplary embodiment of the present disclosure includes: signal generation circuitry, which, in operation, generates a baseband signal; code generation circuitry, which, in operation, generates a plurality of code sequences; phase rotation circuitry, which, in operation, adds phase rotation based on one or some of the plurality of code sequences to the baseband signal and generates a plurality of transmission signals that has been code-multiplexed; and a plurality of transmission antennas that transmits the plurality of transmission signals, respectively. A code length of each of the plurality of code sequences is larger than a code multiplexing number with respect to the plurality of transmission signals.

In an exemplary embodiment of the present disclosure, each of the plurality of code sequences is an orthogonal code sequence, and the code length is a power of two.

In an exemplary embodiment of the present disclosure, each of the plurality of code sequences is a pseudo-orthogonal code sequence, and the code length is a value obtained by adding one to the code multiplexing number.

In an exemplary embodiment of the present disclosure, in a first code sequence and a second code sequence included in the plurality of code sequences, either odd-numbered code elements are identical and even-numbered code elements are inverted, or even-numbered code elements are identical and odd-numbered code elements are inverted, and
  one of the first code sequence and the second code sequence is included in, among the plurality of code sequences, another code sequence or other code sequences different from the one or some of the plurality of code sequences.

In an exemplary embodiment of the present disclosure, each of the plurality of transmission antennas transmits a transmission signal to which phase rotation is added. The phase rotation varies for each positioning by the radar apparatus.

In an exemplary embodiment of the present disclosure, the code length of each of the plurality of code sequences varies for each positioning by the radar apparatus.

In an exemplary embodiment of the present disclosure, a transmission period of each of the plurality of transmission signals varies for each positioning by the radar apparatus.

In an exemplary embodiment of the present disclosure, each of the plurality of transmission antennas has a sub-array configuration.

A radar apparatus according to an exemplary embodiment of the present disclosure includes: signal generation circuitry, which, in operation, generates a baseband signal; code generation circuitry, which, in operation, generates a plurality of code sequences; phase rotation circuitry, which, in operation, adds phase rotation based on one or some of the plurality of code sequences to the baseband signal and generates a plurality of transmission signals that has been code-multiplexed; and a plurality of transmission antennas that transmits the plurality of transmission signals, respectively. Each of the plurality of transmission signals is a chirp signal, and a center frequency of the chirp signal changes for each transmission period of the plurality of transmission signals or for each transmission period of the plurality of code sequences.

A radar apparatus according to an exemplary embodiment of the present disclosure includes: signal generation circuitry, which, in operation, generates a baseband signal; code generation circuitry, which, in operation, generates a plurality of code sequences; phase rotation circuitry, which, in operation, adds phase rotation based on one or some of the plurality of code sequences to the baseband signal and generates a plurality of transmission signals that has been code-multiplexed; and a plurality of transmission antennas that transmits the plurality of transmission signals, respectively. Each of the plurality of transmission signals is a chirp signal, and a center frequency of the chirp signal changes in a round in a transmission period of each of the plurality of transmission signals, where the transmission period is a divisor multiple of a code length of each of the plurality of code sequences.

A radar apparatus according to an exemplary embodiment of the present disclosure includes: a reception antenna, which, in operation, receives a reflected wave signal that is a transmission signal code-multiplexed and transmitted based on one or some of a plurality of code sequences and reflected by a target; and reception circuitry, which, in operation, performs aliasing determination in a Doppler frequency domain of the reflected wave signal based on, among the plurality of code sequences, another code sequence or other code sequences different from the one or some of the plurality of code sequences.

In an exemplary embodiment of the present disclosure, the reception circuitry, which, in operation, performs the aliasing determination in a range that is larger by a factor of a code length of each of the plurality of code sequences than a Doppler analysis range with respect to the reflected wave signal.

In an exemplary embodiment of the present disclosure, the reception circuitry, which, in operation, performs, based on a result of the aliasing determination and the one or some of the plurality of code sequences, code demultiplexing processing on the reflected wave signal.

The disclosure of Japanese Patent Application No. 2019-208153, filed on Nov. 18, 2019, including the specification, drawings and abstract, is incorporated herein by reference in its entirety.

INDUSTRIAL APPLICABILITY

The present disclosure is suitable as a radar apparatus that detects a wide-angle range.

REFERENCE SIGNS LIST 10, 10a, 10b, 10c, 10d Radar apparatus
100, 100b, 100c, 100d, 100e, 100f Radar transmitter 101, 101b, 101c, 101d Radar transmission signal generator
102 Modulated signal generator
103, 103b, 103c, 103d VCO
104, 104c, 104d Code generator
105, 105f Phase rotator
106, 106e, 106f Transmission antenna
107, 107c, 107d Transmission frequency controller
108, 108f Beam weight generator
109 Beam weight multiplier
110 Phase adder
200, 200a, 200b, 200c, 200d Radar receiver
201 Antenna system processor
202 Reception antenna
203 Reception radio
204 Mixer
205 LPF
206 Signal processor
207 AD converter
208 Beat frequency analyzer
209 Output switch
210 Doppler analyzer
211 CFAR section
212, 212a, 212c, 212d Aliasing determiner
213, 213a, 213c, 213d Code demultiplexer
214, 214b, 214c, 214d Direction estimator
215 Phase corrector

The invention claimed is:

1. A radar apparatus, comprising:
signal generation circuitry, which, in operation, generates a baseband signal;
code generation circuitry, which, in operation, generates a plurality of code sequences;
phase rotation circuitry, which, in operation, adds phase rotation based on used code sequences among the plurality of code sequences to the baseband signal and generates a plurality of transmission signals that has been code-multiplexed; and
a plurality of transmission antennas, which, in operation, transmits the plurality of transmission signals, respectively, wherein
a code length of each of the plurality of code sequences is larger than a code multiplexing number with respect to the plurality of transmission signals,
the plurality of code sequences includes the used code sequences and unused code sequences, the used code sequences are one or more pairs and the unused code sequences are two or more code sequences,
each pair of the used code sequences are a set of codes in which odd-numbered code elements are identical between the used code sequences in each pair and even-numbered code elements are code-inverted between the used code sequences in each pair, or a set of codes in which the even-numbered code elements are identical between the used code sequences in each pair and the odd-numbered code elements are code-inverted between used code sequences in each pair, and
the unused code sequences differ from the used code sequences.

2. The radar apparatus according to claim 1, wherein each of the plurality of code sequences is an orthogonal code sequence, and the code length is a power of two.

3. The radar apparatus according to claim 1, wherein each of the plurality of transmission antennas transmits a transmission signal to which phase rotation is added, the phase rotation varying for each positioning by the radar apparatus.

4. The radar apparatus according to claim 1, wherein the code length of each of the plurality of code sequences varies for each positioning by the radar apparatus.

5. The radar apparatus according to claim 1, wherein a transmission period of each of the plurality of transmission signals varies for each positioning by the radar apparatus.

6. The radar apparatus according to claim 1, wherein each of the plurality of transmission antennas has a sub-array configuration.

7. A radar apparatus, comprising:
signal generation circuitry, which, in operation, generates a baseband signal;
code generation circuitry, which, in operation, generates a plurality of code sequences;
phase rotation circuitry, which, in operation, adds phase rotation based on one or some of the plurality of code sequences to the baseband signal and generates a plurality of transmission signals that has been code-multiplexed; and
a plurality of transmission antennas, which, in operation, transmits the plurality of transmission signals, respectively, wherein
a code length of each of the plurality of code sequences is larger than a code multiplexing number with respect to the plurality of transmission signals, and
each of the plurality of code sequences is a pseudo-orthogonal code sequence, and the code length is a value obtained by adding one to the code multiplexing number.

8. A radar signal generation method, comprising:
generating a baseband signal;
generating a plurality of code sequences;
adding phase rotation based on used code sequences among the plurality of code sequences to the baseband signal and generates a plurality of transmission signals that has been code-multiplexed; and
transmitting, by a plurality of transmission antennas, the plurality of transmission signals, respectively, wherein
a code length of each of the plurality of code sequences is larger than a code multiplexing number with respect to the plurality of transmission signals,
the plurality of code sequences includes the used code sequences and unused code sequences, the used code sequences are one or more pairs and the unused code sequences are two or more code sequences,
each pair of the used code sequences are a set of codes in which odd-numbered code elements are identical between the used code sequences in each pair and even-numbered code elements are code-inverted between the used code sequences in each pair, or a set of codes in which the even-numbered code elements are identical between the used code sequences in each pair and the odd-numbered code elements are code-inverted between used code sequences in each pair, and
the unused code sequences differ from the used code sequences.

9. The radar signal generation method according to claim 8, wherein each of the plurality of code sequences is an orthogonal code sequence, and the code length is a power of two.

10. The radar signal generation method according to claim 8, wherein each of the plurality of transmission antennas transmits a transmission signal to which phase rotation is added, the phase rotation varying for each positioning by a radar apparatus performing the radar signal generation method.

11. The radar signal generation method according to claim 8, wherein the code length of each of the plurality of code sequences varies for each positioning by the radar apparatus performing the radar signal generation method.

12. The radar signal generation method according to claim 8, wherein a transmission period of each of the plurality of transmission signals varies for each positioning by the radar apparatus performing the radar signal generation method.

13. The radar signal generation method according to claim 8, wherein each of the plurality of transmission antennas has a sub-array configuration.

14. A radar signal generation method, comprising:
generating a baseband signal;
generating a plurality of code sequences;
adding phase rotation based on one or some of the plurality of code sequences to the baseband signal and generates a plurality of transmission signals that has been code-multiplexed; and
transmitting the plurality of transmission signals, respectively, wherein
a code length of each of the plurality of code sequences is larger than a code multiplexing number with respect to the plurality of transmission signals, and
each of the plurality of code sequences is a pseudo-orthogonal code sequence, and the code length is a value obtained by adding one to the code multiplexing number.

* * * * *